United States Patent
Holtzman et al.

(10) Patent No.: US 8,245,031 B2
(45) Date of Patent: Aug. 14, 2012

(54) CONTENT CONTROL METHOD USING CERTIFICATE REVOCATION LISTS

(75) Inventors: Michael Holtzman, Cupertino, CA (US); Ron Barzilai, Kfar-Vradim (IL); Rotem Sela, Ma'alot (IL); Fabrice Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 996 days.

(21) Appl. No.: 11/557,006

(22) Filed: Nov. 6, 2006

(65) Prior Publication Data
US 2008/0010451 A1 Jan. 10, 2008

Related U.S. Application Data

(60) Provisional application No. 60/819,507, filed on Jul. 7, 2006.

(51) Int. Cl.
*H04L 9/32* (2006.01)
*H04L 29/06* (2006.01)
(52) U.S. Cl. ............................ 713/158; 713/175; 726/10
(58) Field of Classification Search .................. 713/158, 713/155, 156, 175, 168, 176; 726/10, 3, 726/5, 26–29
See application file for complete search history.

(56) References Cited

U.S. PATENT DOCUMENTS

| | | | |
|---|---|---|---|
| 4,575,621 A | 3/1986 | Dreifus | |
| 4,780,905 A | 10/1988 | Cruts et al. | |
| 5,052,040 A | 9/1991 | Preston et al. | |
| 5,237,609 A | 8/1993 | Kimura | |
| 5,473,692 A | 12/1995 | Davis | |
| 5,604,801 A | 2/1997 | Dolan et al. | |
| 5,684,742 A | 11/1997 | Bublitz et al. | |
| 5,687,235 A | 11/1997 | Perlman et al. | |
| 5,857,020 A | 1/1999 | Peterson, Jr. | |
| 5,903,651 A | 5/1999 | Kocher | |
| 5,930,167 A | 7/1999 | Lee et al. | |
| 5,949,877 A | 9/1999 | Traw et al. | |
| 6,026,402 A | 2/2000 | Vossen et al. | |
| 6,038,551 A | 3/2000 | Barlow et al. | |
| 6,073,242 A | 6/2000 | Hardy et al. | |
| 6,094,724 A | 7/2000 | Benhammou et al. | |
| 6,134,550 A | 10/2000 | Van Oorschot et al. | |

(Continued)

FOREIGN PATENT DOCUMENTS

EP 0 330 404 A2 8/1989

(Continued)

OTHER PUBLICATIONS

Office Action for U.S. Appl. No. 11/557,049, dated Dec. 17, 2009, 31 pages.

(Continued)

*Primary Examiner* — Zachary A Davis
(74) *Attorney, Agent, or Firm* — Brinks Hofer Gilson & Lione

(57) ABSTRACT

Host devices present both the host certificate and the pertinent certificate revocation lists to the memory device for authentication so that the memory device need not obtain the list on its own. Processing of the certificate revocation list and searching for the certificate identification may be performed concurrently by the memory device. The certificate revocation lists for authenticating host devices to memory devices may be stored in an unsecured area of the memory device for convenience of users.

16 Claims, 33 Drawing Sheets

U.S. PATENT DOCUMENTS

| | | |
|---|---|---|
| 6,189,097 B1 | 2/2001 | Tycksen, Jr. et al. |
| 6,343,291 B1 | 1/2002 | Goldman |
| 6,351,813 B1 | 2/2002 | Mooney et al. |
| 6,456,528 B1 | 9/2002 | Chen |
| 6,470,449 B1 | 10/2002 | Blandford |
| 6,481,632 B2 | 11/2002 | Wentker et al. |
| 6,513,116 B1 | 1/2003 | Valente |
| 6,564,314 B1 | 5/2003 | May et al. |
| 6,584,495 B1 | 6/2003 | Bisset et al. |
| 6,694,436 B1 | 2/2004 | Audebert |
| 6,714,921 B2 | 3/2004 | Pirolli et al. |
| 6,779,113 B1 | 8/2004 | Guthery |
| 6,816,900 B1 | 11/2004 | Vogel et al. |
| 6,865,555 B2 | 3/2005 | Novak |
| 6,880,084 B1 | 4/2005 | Brittenham et al. |
| 6,938,162 B1 | 8/2005 | Nagai et al. |
| 6,970,891 B1 | 11/2005 | Deo et al. |
| 6,988,175 B2 | 1/2006 | Lasser |
| 7,010,809 B2 * | 3/2006 | Hori et al. ............ 726/26 |
| 7,036,020 B2 | 4/2006 | Thibadeau |
| 7,051,157 B2 | 5/2006 | James |
| 7,073,063 B2 | 7/2006 | Peinado |
| 7,073,073 B1 | 7/2006 | Nonaka et al. |
| 7,111,173 B1 | 9/2006 | Scheidt |
| 7,124,170 B1 | 10/2006 | Sibert |
| 7,124,301 B1 | 10/2006 | Uchida |
| 7,215,771 B1 | 5/2007 | Hamlin |
| 7,219,227 B2 * | 5/2007 | Hori et al. ............ 713/158 |
| 7,225,341 B2 | 5/2007 | Yoshino et al. |
| 7,269,741 B2 | 9/2007 | Matsui et al. |
| 7,296,160 B2 | 11/2007 | Hiltgen |
| 7,322,042 B2 | 1/2008 | Srinivasan et al. |
| 7,350,204 B2 | 3/2008 | Lambert et al. |
| 7,363,365 B2 * | 4/2008 | Ocko et al. ............ 709/223 |
| 7,373,506 B2 * | 5/2008 | Asano et al. ............ 713/168 |
| 7,426,747 B2 | 9/2008 | Thibadeau |
| 7,434,069 B2 | 10/2008 | Nessler |
| 7,437,574 B2 | 10/2008 | Ronkka et al. |
| 7,478,248 B2 | 1/2009 | Ziv et al. |
| 7,484,090 B2 * | 1/2009 | Ohmori et al. ............ 713/158 |
| 7,493,656 B2 | 2/2009 | Goodwill et al. |
| 7,506,128 B2 | 3/2009 | Deo et al. |
| 7,523,072 B2 | 4/2009 | Stefik et al. |
| 7,526,785 B1 | 4/2009 | Pearson et al. |
| 7,546,334 B2 * | 6/2009 | Redlich et al. ............ 709/201 |
| 7,546,630 B2 | 6/2009 | Tabi |
| 7,783,884 B2 * | 8/2010 | Nakano et al. ............ 713/175 |
| 7,917,964 B2 * | 3/2011 | Takashima et al. ............ 726/30 |
| 2002/0023219 A1 | 2/2002 | Treffers et al. |
| 2002/0029340 A1 | 3/2002 | Pensak et al. |
| 2002/0065730 A1 | 5/2002 | Nii |
| 2002/0136410 A1 | 9/2002 | Hanna |
| 2002/0138729 A1 | 9/2002 | Miettinen et al. |
| 2002/0184217 A1 | 12/2002 | Bisbee et al. |
| 2002/0199001 A1 | 12/2002 | Wenocur et al. |
| 2003/0023867 A1 | 1/2003 | Thibadeau |
| 2003/0028699 A1 | 2/2003 | Holtzman et al. |
| 2003/0056114 A1 | 3/2003 | Goland |
| 2003/0061504 A1 | 3/2003 | Sprigg et al. |
| 2003/0149854 A1 | 8/2003 | Yoshino et al. |
| 2003/0172280 A1 | 9/2003 | Scheidt et al. |
| 2003/0188117 A1 | 10/2003 | Yoshino et al. |
| 2003/0196028 A1 | 10/2003 | Maeda et al. |
| 2003/0200402 A1 | 10/2003 | Willman et al. |
| 2003/0212888 A1 | 11/2003 | Wildish et al. |
| 2003/0212895 A1 | 11/2003 | Kisliakov |
| 2003/0217011 A1 | 11/2003 | Peinado et al. |
| 2004/0015694 A1 | 1/2004 | De Treville |
| 2004/0026496 A1 | 2/2004 | Zuili |
| 2004/0039911 A1 | 2/2004 | Oka et al. |
| 2004/0044625 A1 | 3/2004 | Sakamura et al. |
| 2004/0059946 A1 | 3/2004 | Price |
| 2004/0064618 A1 | 4/2004 | Farrell et al. |
| 2004/0083370 A1 | 4/2004 | de Jong |
| 2004/0103288 A1 | 5/2004 | Ziv et al. |
| 2004/0132437 A1 | 7/2004 | Ohmori et al. |
| 2004/0139021 A1 | 7/2004 | Reed et al. |
| 2004/0193606 A1 | 9/2004 | Arai et al. |
| 2004/0247129 A1 | 12/2004 | Patariu et al. |
| 2005/0015415 A1 | 1/2005 | Garimella et al. |
| 2005/0018472 A1 | 1/2005 | Lim |
| 2005/0022025 A1 | 1/2005 | Hug |
| 2005/0049931 A1 | 3/2005 | Wisnudel et al. |
| 2005/0154875 A1 | 7/2005 | Chao |
| 2005/0160281 A1 | 7/2005 | Thibadeau |
| 2005/0180209 A1 | 8/2005 | Lasser |
| 2005/0193025 A1 | 9/2005 | Mosek |
| 2005/0209716 A1 | 9/2005 | Buhr et al. |
| 2005/0210241 A1 * | 9/2005 | Lee et al. ............ 713/158 |
| 2005/0256838 A1 | 11/2005 | Lasser |
| 2005/0262361 A1 | 11/2005 | Thibadeau |
| 2005/0289354 A1 | 12/2005 | Borthakur et al. |
| 2006/0036873 A1 | 2/2006 | Ho et al. |
| 2006/0095793 A1 | 5/2006 | Hall |
| 2006/0107047 A1 | 5/2006 | Bar-El |
| 2006/0112241 A1 | 5/2006 | Weiss et al. |
| 2006/0120314 A1 | 6/2006 | Krantz et al. |
| 2006/0126422 A1 | 6/2006 | Takagi et al. |
| 2006/0129824 A1 | 6/2006 | Hoff et al. |
| 2006/0161725 A1 | 7/2006 | Lee et al. |
| 2006/0195907 A1 | 8/2006 | Delfs et al. |
| 2006/0232826 A1 | 10/2006 | Bar-El |
| 2006/0242068 A1 | 10/2006 | Jogand-Coulomb et al. |
| 2006/0262928 A1 | 11/2006 | Bar-El et al. |
| 2006/0272027 A1 | 11/2006 | Noble |
| 2007/0050849 A1 | 3/2007 | Takashima |
| 2007/0061502 A1 | 3/2007 | Lasser et al. |
| 2007/0143555 A1 | 6/2007 | Nemiroff et al. |
| 2007/0180210 A1 | 8/2007 | Thibadeau |
| 2008/0072060 A1 | 3/2008 | Cannon et al. |
| 2009/0125730 A1 | 5/2009 | Pagan |

FOREIGN PATENT DOCUMENTS

| | | |
|---|---|---|
| EP | 0 919 904 A2 | 6/1999 |
| EP | 1 117 206 | 7/2001 |
| EP | 1 209 657 A1 | 5/2002 |
| EP | 1 361 527 | 11/2003 |
| EP | 1 365 306 A2 | 11/2003 |
| EP | 1 467 312 A1 | 10/2004 |
| EP | 1 594 250 | 11/2005 |
| GB | 2 391 082 A | 1/2004 |
| JP | 09-298537 | 11/1997 |
| JP | 10-327147 | 12/1998 |
| JP | 11-039437 | 2/1999 |
| JP | 2002-288453 A | 4/2002 |
| JP | 2003-233594 | 8/2003 |
| JP | 2003-316651 | 11/2003 |
| JP | 2003-337632 | 11/2003 |
| JP | 2003-345742 | 12/2003 |
| JP | 2004-266652 | 9/2004 |
| JP | 2005-124097 | 5/2005 |
| JP | 2006-085647 | 3/2006 |
| KR | 2004-0063071 A | 7/2004 |
| WO | WO 98/07255 | 2/1998 |
| WO | WO 00/42491 | 7/2000 |
| WO | WO 02/01368 A2 | 1/2002 |
| WO | WO 02/42912 A1 | 5/2002 |
| WO | WO 02/063847 | 8/2002 |
| WO | WO 02/096016 | 11/2002 |
| WO | WO 03/107589 | 12/2003 |
| WO | WO 2004/034202 | 4/2004 |
| WO | WO 2004/086228 A1 | 10/2004 |
| WO | WO 2004/112036 A1 | 12/2004 |
| WO | WO 2005104431 A1 * | 11/2005 |
| WO | WO 2006/069194 | 6/2006 |
| WO | WO 2006/069274 | 6/2006 |
| WO | WO 2006/069311 | 6/2006 |
| WO | WO 2006/069312 | 6/2006 |

OTHER PUBLICATIONS

Kocher, P., "On Certificate Revocation and Validation", Lecture Notes in Computer Science, Springer Berlin Heidelberg, 1998.
Random Number Generator, Seed. In Webster's New World™ Computer Dictionary. Wiley Publishing, Inc., 2003.
Office Action for U.S. Appl. No. 11/313,538, 27 pages, Nov. 20, 2008.

Office Action for U.S. Appl. No. 11/313,538, dated Jan. 13, 2010, 33 pages.
Office Action for U.S. Appl. No. 11/314,052, dated Feb. 18, 2010, 13 pages.
Office Action for U.S. Appl. No. 11/314,410, dated Mar. 5, 2010, 17 pages.
Office Action for U.S. Appl. No. 11/314,411, dated Feb. 25, 2010, 28 pages.
Office Action for U.S. Appl. No. 11/557,010, dated Feb. 16, 2010, 13 pages.
Office Action for U.S. Appl. No. 11/557,052, dated Mar. 9, 2010, 9 pages.
Buhse, "Implications of Digital Rights Management for Online Music—A Business Perspective," T. Sander (Ed.), Security and Privacy in Digital Rights Management, ACM CCS-8 Workshop DRM 2001, LNCS 2320, pp. 201-212.
Dialog OneSearch, Jun. 26, 2006, 5 pages, http://www.dialog.com/dwpi/.
Dialog OneSearch, Jun. 2006, 50 pages, http://www.dialog.com/dwpi/.
Dialog OneSearch, Sep. 12, 2006, 56 pages, http://www.dialog.com/dwpi/.
Dialog OneSearch, Sep. 15, 2006, 55 pages, http://www.dialog.com/dwpi/.
Hinarejos et al., "Revocation scheme for PMI based upon the tracing of certificates chains," Computational Science and its Applications—ICCSA 2006, International Conference, Proceedings (Lecture Notes in Computer Science, vol. 3983), pp. 1098-1106.
Housley et al., "Internet X.509 Public Key Infrastructure Certificate and CRL Profile," Network Working Group, RFC 2459, The Internet Society, Jan. 1999, 137 pages.
International Telecommunication Union, "Series X: Data Networks, Open System Communications and Security (Information Technology—Open systems interconnection—The directory: public-key and attribute certificate frameworks)," ITU-T, X.509, Aug. 2005, pp. 1-7 and 9-170.
Oasis, "Web Services Security X.509 Certificate Token Profile," OASIS Standard 200401, Mar. 15, 2004, 16 pages.
Orlowski, "Everything you ever wanted to know about CPRM, but ZDNet wouldn't tell you . . . ", The Register, Jan. 10, 2001, 6 pages. http://theregister.co.uk/2001/01/10/everything_you_ever_wanted/print.html.
Ortiz, "An Introduction to Java Card Technology—Part 1," May 29, 2003, 17 pages. http://developers.sun.com/techtopics/mobility/javacard/articles/javacard1/.
RSA Laboratories, "PKCS#1: RSA Encryption Standard," An RSA Laboratories Technical Note, Version 1.5, Revised Nov. 1, 1993, 17 pages.
Sandhu et al., "Access Control: Principles and Practice," IEEE Communications Magazine, IEEE Service Center, New York, NY, vol. 32, No. 9, Sep. 1, 1994, pp. 40-48 (2-5).
EPO/ISA, "Invitation to Pay Additional Fees," for International Application No. PCT/US2005/046478 mailed Jul. 11, 2006, 5 pages.
EPO/ISA, "Notification of Transmittal of the International Search Report and the Written Opinion of the International Searching Authority, or the Declaration" for International Application No. PCT/US2005/046478 mailed Sep. 25, 2006, 14 pages.
EPO/ISA, "Notification of Transmittal of the International Search Report and the Written Opinion of the International Searching Authority, or the Declaration" for International Application No. PCT/US2005/046793 mailed Jun. 7, 2006, 9 pages.
EPO/ISA, "Notification of Transmittal of the International Search Report and the Written Opinion of the International Searching Authority, or the Declaration" for International Application No. PCT/US2005/046795 mailed Jun. 7, 2006, 9 pages.
EPO/ISA, "Invitation to Pay Additional Fees," for International Application No. PCT/US2005/046689 mailed Jul. 11, 2006, 5 pages.
EPO/ISA, "Notification of Transmittal of the International Search Report and the Written Opinion of the International Searching Authority, or the Declaration" for International Application No. PCT/US2005/046689 mailed Sep. 6, 2006, 16 pages.
International Search Report and Written Opinion for PCT/US2007/015301, dated Jan. 10, 2008, 12 pages.
International Search Report and Written Opinion for PCT/US2007/015304, dated Mar. 25, 2008, 12 pages.
International Search Report and Written Opinion from PCT Application Serial No. PCT/US2007/015430, dated Jan. 17, 2008, 11 pages.
International Search Report and Written Opinion for PCT/US2007/015432, dated Jan. 17, 2008, 13 pages.
Donnan, R.A., "Transmission Synchronizing Method", IBM Technical Disclsosure Bulletin, vol. 11, No. 11, pp. 1570, Apr. 1969.
Kikuchi, H. et al., "Performance Evaluation of Public-Key Certificate Revocation System with Balanced Hash Tree", Parallel Processing, 1999 International Workshop on Aizu-Wakamatsu, pp. 204-209, 1999.
Llloyd, S. et al., "Understanding Certification Path Construction", PKI Forum, pp. 1-14, Sep. 2002.
Thomas, T., "A Mandatory Access Control Mechanism for the Unix® File System", Proceedings of the Aerospace Computer Security Applications Conference, Orlando, Dec. 12-16, 1988, Washington, IEEE Comp. Soc. Press, US, pp. 173-177, Dec. 12, 1988.
Office Action for U.S. Appl. No. 11/557,056, dated Mar. 16, 2009, 25 pages.
Office Action for U.S. Appl. No. 11/313,538, dated Jun. 8, 2009, 29 pages.
Office Action for U.S. Appl. No. 11/314,052, dated May 12, 2009, 11 pages.
Office Action for U.S. Appl. No. 11/314,410, dated May 13, 2009, 15 pages.
Office Action for U.S. Appl. No. 11/314,411, dated Jun. 23, 2009, 36 pages.
International Search Report and Written Opinion for PCT/US2007/015431, dated Apr. 16, 2008, 14 pages.
US Office Action for U.S. Appl. No. 11/313,538 dated Apr. 9, 2008, 16 pages.
US Office Action for U.S. Appl. No. 11/313,870 dated Apr. 1, 2008, 13 pages.
US Office Action for U.S. Appl. No. 11/313,536 dated Apr. 14, 2008, 13 pages.
US Office Action for U.S. Appl. No. 11/314,055 dated Apr. 1, 2008, 16 pages.
US Office Action for U.S. Appl. No. 11/314,053 dated Feb. 7, 2008, 16 pages.
Van Maffaert, A. et al., "Digital Rights Management: DRM is a Key Enabler for the Future Growth of the Broadband Access Market, and the Telecom/Networking Marking in General", Alcatel Telecommunications Review, Alcatel, Paris Cedex, FR, Apr. 2003, 8 pages.
Office Action for U.S. Appl. No. 11/557,051, dated Sep. 29, 2009, 10 pages.
Office Action for U.S. Appl. No. 11/557,039, dated Oct. 13, 2009, 14 pages.
Office Action for U.S. Appl. No. 11/557,052, dated Sep. 29, 2009, 9 pages.
Office Action for U.S. Appl. No. 11/557,041, dated Oct. 13, 2009, 19 pages.
Office Action for U.S. Appl. No. 11/557,028, dated Nov. 10, 2009, 19 pages.
Office Action from U.S. Appl. No. 11/313,536, dated Oct. 17, 2007.
Office Action for U.S. Appl. No. 11/313,538, dated Oct. 29, 2007.
Office Action for U.S. Appl. No. 11/313,870, dated Oct. 29, 2007.
Office Action for U.S. Appl. No. 11/314,055, dated Oct. 29, 2007.
Office Action for U.S. Appl. No. 11/314,053, dated Nov. 9, 2007.
Office Action for U.S. Appl. No. 11/314,411, dated Jan. 4, 2011, 29 pages.
Office Action for U.S. Appl. No. 11/313,538, dated May 24, 2010, 34 pages.
Office Action for U.S. Appl. No. 11/314,052, dated Jun. 8, 2010, 13 pages.
Office Action for U.S. Appl. No. 11/557,028, dated May 24, 2010, 17 pages.
Office Action for U.S. Appl. No. 11/557,041, dated Jun. 9, 2010, 17 pages.
European Examination Report for European Patent Application Serial No. 05 855 098.9, dated Apr. 15, 2010, 6 pages.

European Examination Report for European Patent Application Serial No. 10 002 604.6, dated May 4, 2010, 6 pages.
Office Action for U.S. Appl. No. 11/557,049, dated Jul. 7, 2010, 29 pages.
Translation of Office Action for Chines Patent Application Serial No. 200780025287.1, dated Jun. 12, 2010, 5 pages.
Translation of Office Action for Chines Patent Application Serial No. 200780025765.9, dated Jul. 20, 2010, 4 pages.
Translation of Office Action for Chines Patent Application Serial No. 200780025785.6, dated Jun. 24, 2010, 4 pages.
Translation of Office Action for Chines Patent Application Serial No. 200780025848.8, dated Jul. 20, 2010, 1 page.
European Examination Report for European Patent Application Serial No. 05 855 274.6, dated Jun. 14, 2010, 4 pages.
Posey, Brien, "Understanding MS Windows File Associations", *Microsoft Technet. TechRepublic*, Sep. 1999, 11 pages.
Office Action for U.S. Appl. No. 11/314,052, dated Nov. 18, 2010, 14 pages.
Office Action for Chinese Patent Application Serial No. 200580048232.3, dated Dec. 1, 2011, 14 pages.
Office Action for Chinese Patent Application Serial No. 200780025287.1, dated Sep. 28, 2011, 10 pages.
Notification of Reasons for Refusal for Japanese Patent Application Serial No. 2009-518355, dated Oct. 25, 2011, 5 pages.
Notification of Reasons for Refusal for Japanese Patent Application Serial No. 2009-518357, dated Oct. 25, 2011, 4 pages.
Office Action for U.S. Appl. No. 12/338,738, dated May 13, 2011, 23 pages.
Office Action for Japanese Patent Application Serial No. 2007-548491, dated Mar. 22, 2011, 4 pages.
Office Action for Japanese Patent Application Serial No. 2007-548523, dated Mar. 22, 2011, 4 pages.
Office Action for Japanese Patent Application Serial No. 2010-049119, dated Mar. 22, 2011, 7 pages.
Office Action for Japanese Patent Application Serial No. 2010-548449, dated Mar. 22, 2011, 7 pages.
Office Action for U.S. Appl. No. 11/314,411, dated Jul. 29, 2011, 37 pages.
Notice of Allowance for U.S. Appl. No. 11/313,538, dated Aug. 17, 2011, 9 pages.
Office Action for U.S. Appl. No. 11/557,028, dated Aug. 15, 2011, 21 pages.
Office Action for Chinese Patent Application Serial No. 2007800257165.9 dated May 17, 2011, 11 pages.
Office Action for U.S. Appl. No. 11/557,041, dated Aug. 25, 2011, 14 pages.
Office Action for Chinese Patent Application Serial No. 200780025736.2, dated Jul. 13, 2011, 5 pages.
Examination Report for European Patent Application Serial No. 05855366.0, dated Aug. 17, 2011, 9 pages.
Office Action for European Patent Application Serial No. 10190137.9, dated Sep. 7, 2011, 6 pages.
Office Action for European Patent Application Serial No. 07835981.7, dated Aug. 24, 2011, 9 pages.
Office Action for U.S. Appl. No. 11/557,049, dated Oct. 21, 2011, 31 pages.
CardWerk, "ISO 7816-4: Inter-Industry Commands for Interchange, Section 3: Definitions," 2009, http://www.cardwerk.com/smartcards/smartcard_standard_ISO7816-4_3_definitions.aspx.
Office Action for U.S. Appl. No. 11/313,538, dated Feb. 10, 2011, 33 pages.
Office Action for U.S. Appl. No. 11/557,028, dated Feb. 22, 2011, 17 pages.
Office Action for U.S. Appl. No. 11/557,041, dated Feb. 4, 2011, 14 pages.
International Search Report and Written Opinion for PCT/US2010/057425, dated Mar. 17, 2011, 10 pages.
Office Action for U.S. Appl. No. 12/624,036, dated Apr. 1, 2011, 24 pages.
Office Action for U.S. Appl. No. 11/557,052, dated Apr. 27, 2011, 10 pages.
Office Action for U.S. Appl. No. 12/641,160, dated Jan. 5, 2012, 14 pages.
Notification of Reasons for Refusal for Japanese Patent Application Serial No. 2009-518323, dated Dec. 20, 2011, 7 pages.
Kikuchi, H. et al., "Performance Evaluation of Public-Key Certificate Revocation System with Balanced Hash Tree", *Parallel Processing, 1999. Proceedings. 1999 International Workshops*, Sep. 24, 1999, pp. 204-209.
Umezawa, K. et al., "Development and Evaluation of Certificate Verification System in Mobile Environment", *Computer Security Symposium 2005 (CSS2005)* vol. I of II, Japan, *Information Processing Society of Japan*, vol. 2005, No. 13, Oct. 26, 2005, pp. 121-127 (Abstract Only).
Office Action for U.S. Appl. No. 11/314,411, dated Feb. 29, 2012, 41 pages.
Notice of Allowance for U.S. Appl. No. 11/557,028, dated Feb. 3, 2012, 10 pages.
Office Action for U.S. Appl. No. 11/557,052, dated Jan. 30, 2012, 13 pages.
Office Action for U.S. Appl. No. 12/624,036, dated Jan. 18, 2012, 31 pages.
Decision of Rejection for Chinese Office Action Serial No. 200780025785.6, dated Jan. 18, 2012, 11 pages.
Decision of Refusal for Japanese Patent Application Serial No. 2009-518357, dated Feb. 14, 2012, 8 pages.
Office Action for Taiwanese Patent Application Serial No. 094145710, dated Jan. 10, 2012, 16 pages.
Office Action for U.S. Appl. No. 12/338,738, dated Apr. 11, 2012, 25 pages.
Office Action for U.S. Appl. No. 11/557,049, dated May 21, 2012, 31 pages.
Office Action for Japanese Patent Application Serial No. 2009-518324, dated May 29, 2012, 6 pages.
Office Action for Korean Patent Application Serial No. 10-2009-7026878, dated Apr. 27, 2012, 5 pages.
Office Action for Korean Patent Application Serial No. 10-2007-7016639, dated Apr. 27, 2012, 7 pages.

* cited by examiner

Login/Password Type

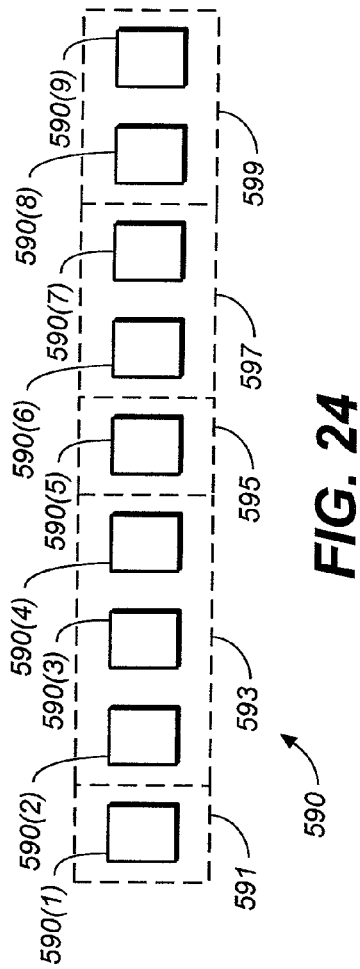

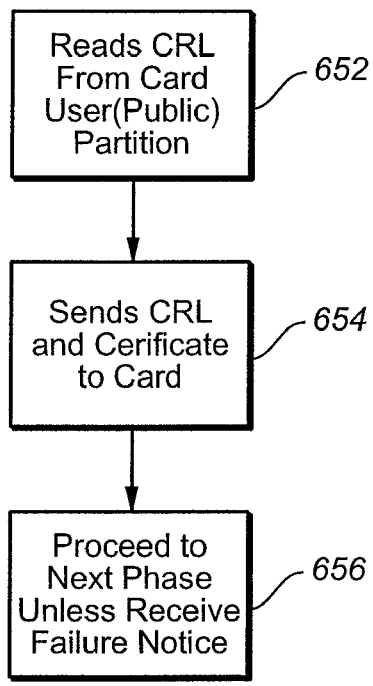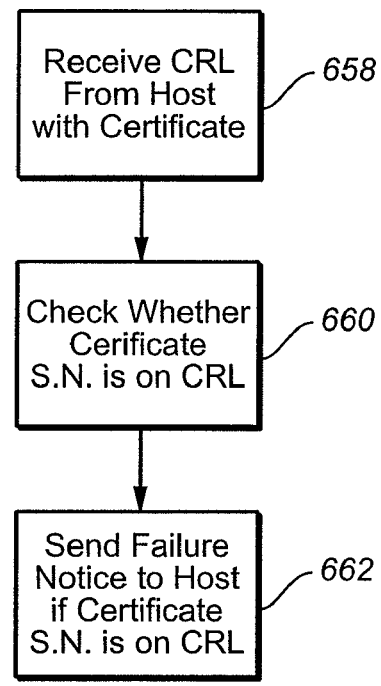
FIG. 30                          FIG. 31

CONTENT CONTROL METHOD USING CERTIFICATE REVOCATION LISTS

CROSS-REFERENCE TO RELATED APPLICATIONS

This application claims the benefit of U.S. Provisional Application No. U.S. 60/819,507 filed Jul. 7, 2006.

This application is related to U.S. application Ser. No. 11/313,870, filed Dec. 20, 2005; which application claims the benefit of U.S. Provisional Application No. 60/638,804, filed Dec. 21, 2004. This application is further related to U.S. patent application Ser. No. 11/314,411, filed Dec. 20, 2005; this application is further related to U.S. patent application Ser. No. 11/314,410, filed Dec. 20, 2005; this application is further related to U.S. patent application Ser. No. 11/313,536, filed Dec. 20, 2005; this application is further related to U.S. patent application Ser. No. 11/313,538, filed Dec. 20, 2005; this application is further related to U.S. patent application Ser. No. 11/314,055, filed Dec. 20, 2005; this application is further related to U.S. patent application Ser. No. 11/314,052, filed Dec. 20, 2005; this application is further related to U.S. patent application Ser. No. 11/314,053, filed Dec. 20, 2005.

The present application is related to U.S. application Ser. No. 11/557,028 of Holtzman et al., entitled "Content Control Method Using Certificate Chains," filed on Nov. 6, 2006, U.S. application Ser. No. 11/557,010 of Holtzman et al., entitled "Content Control System Using Certificate Chains," filed on Nov. 6, 2006, U.S. application Ser. No. 11/557,026 of Holtzman et al., entitled "Content Control System Using Certificate Revocation Lists," filed on Nov. 6, 2006, U.S. application Ser. No. 11/557,049 of Holtzman et al., entitled "Content Control Method Using Versatile Control Structure," filed on Nov. 6, 2006, U.S. application Ser. No. 11/557,056 of Holtzman et al, entitled "Content Control System Using Versatile Control Structure," filed on Nov. 6, 2006, U.S. application Ser. No. 11/557,052 of Holtzman et al., entitled "Method for Controlling Information Supplied From Memory Device," filed on Nov. 6, 2006, U.S. application Ser. No. 11/557,051 of Holtzman et al., entitled "System for Controlling Information Supplied From Memory Device," filed on Nov. 6, 2006, U.S. application Ser. No. 11/557,041 of Holtzman et al., entitled "Control Method Using Identity Objects," filed on Nov. 6, 2006, and U.S. application Ser. No. 11/557,039 of Holtzman et al., entitled "Control System Using Identity Objects," filed on Nov. 6, 2006.

The applications listed above are incorporated herein in their entirety by reference as if fully set forth herein.

BACKGROUND

This invention relates in general to memory systems, and in particular to a memory system with versatile content control features.

Storage devices such as flash memory cards have become the storage medium of choice for storing digital content such as photographs. Flash memory cards may also be used to distribute other types of media content. Moreover, an increasing variety of host devices such as computers, digital cameras, cellular telephones, personal digital assistants (PDAs) and media players such as MP3 players now have the capability of rendering the media content stored in flash memory cards. There is thus great potential for flash memory cards, as well as other types of mobile storage devices, to become a widely used vehicle for distributing digital content.

One of the key concerns to owners and distributors of digital content is that only authorized parties should be allowed to access the content, after the content has been distributed, either through downloads from networks such as the Internet, or through the distribution of content on storage devices. One of the ways to avoid unauthorized access is to use a system for establishing the identity of the party before content access is granted to the party. Systems such as the public key infrastructure (PKI) have been developed for this purpose. In a PKI system, a trusted authority known as a certificate authority (CA) issues certificates for proving the identity of persons and organizations. Parties such as organizations and persons who wish to establish proof of identity may register with the certificate authority with adequate evidence for proving their identity. After the identity of the party has been proven to the CA, the CA will issue a certificate to such party. The certificate typically includes the name of the CA that issued the certificate, the name of the party to whom the certificate is issued, a public key of the party, and the public key of the party signed (typically by encrypting a digest of the public key) by a private key of the CA.

The private key and the public key of the CA are related so that any data encrypted using the public key may be decrypted by means of the private key, and vice versa. The private key and the public key thus form a key pair. An explanation of the private and public key pair for cryptography is provided by in "PKCS#1 v2.1:RSA Cryptography Standard," dated Jun. 14, 2002, from RSA Security Inc. The public key of the CA is made publicly available. Therefore, when one party wishes to verify whether the certificate presented by another party is genuine, the verifying party may simply use the public key of the CA to decrypt the encrypted digest of the public key in the certificate using a decryption algorithm. The decryption algorithm is typically also identified in the certificate. If the decrypted digest of the public key in the certificate matches the digest of the unencrypted public key in the certificate, this proves that the public key in the certificate has not been tampered with and is genuine, based on trust in the CA and authenticity of the public key of the CA.

To verify the identity of a party, the verifying party typically will send a challenge (e.g. random number) and ask that the other party send his or her certificate as well as a response to the challenge (i.e. the random number encrypted with the private key of the other party). When the response and certificate are received, the verifying party first verifies whether the public key in the certificate is genuine by the process above. If the public key is verified to be genuine, the verifying party can then decrypt the response using the public key in the certificate, and compare the result to the random number sent originally. If they match, this means the other party does have the correct private key, and for that reason has proven his or her identity. If the public key in the certificate is not genuine, or if the decrypted response fails to match the challenge, authentication fails. Thus, a party wishing to prove his or her identity will need to possess both the certificate and the associated private key.

By means of the above mechanism, two parties who otherwise may not trust each other may establish trust by verifying the public key of the other party in the other party's certificate using the process described above. Recommendation X.509 from the International Telecommunication Union (ITU) Telecommunication Standardization Sector (ITU-T) is a standard that specifies certificate frameworks. More detailed information concerning certificates and their use can be found in this standard.

For convenience in administration, and in large organizations, it may be appropriate for a higher level CA, known as the root CA, to delegate the responsibility for issuing certificates to several lower level CAs. In a two level hierarchy, for example, the root CA at the top level issues certificates to the lower level CAs to certify that the public keys of these low level authorities are genuine. These lower level authorities, in turn, issue certificates to parties through the registration process described above. The verifying process starts from the top of the certificate chain. The verifying party will first use the public key of the root CA (known to be genuine) to first verify the genuineness of the public key of the lower level CA. Once the genuineness of the public key of the lower level CA has been verified, then the genuineness of the public key of the party to whom the lower level issued a certificate can be verified using the verified public key of the lower level CA. The certificates issued by the root CA and by the lower level CA then form a chain of two certificates of the party whose identity is being verified.

Certificate hierarchies may of course include more than two levels, where each CA except for the root CA at a lower level derives its authority from a higher level CA, and has a certificate containing its public key issued by the higher level CA. Therefore, in order to verify the genuineness of another party's public key, it may be necessary to trace the path or chain of certificates to the root CA. In other words, in order to establish one's identity, the party whose identity needs to be proven may need to produce the entire chain of certificates, all the way from its own certificate to the root CA certificate.

A certificate is issued for a certain validity period. However, the certificate may become invalid prior to the expiration of the validity period due to events, such as change of name, change of association with the certificate issuer, compromised or suspected compromise of the corresponding private key. Under such circumstances the certificate authority (CA) needs to revoke the certificate. The certificate authority publishes periodically a certificate revocation list, listing the serial numbers of all the certificates that have been revoked. In conventional certificate verification methods, the authenticating entity is expected to either possess or be able to retrieve certificate revocation lists from certificate authorities (CA) and check the serial numbers of the certificate presented for authentication against the list to determine whether the certificate presented has been revoked. Where the authenticating entity is a memory or storage device, the device on its own has not been used to retrieve certificate revocation lists from certificate authorities. As a result, the certificate presented for authentication cannot be verified by the memory or storage device. It is therefore desirable for an improved system to be provided which enables memory or storage devices to verify certificates without having to obtain certificate revocation lists.

SUMMARY

Memory devices have not been used to obtain certificate revocation lists on their own. Therefore, when the host device presents a certificate to the storage device for authentication without also presenting a certificate revocation list pertaining to the certificate, the storage device will be unable to ascertain whether the certificate presented by the host device is on the pertinent certificate revocation list or not. Thus one embodiment of the invention is based on the recognition that this problem can be avoided by a system where the host device presents, in addition to the certificate, also the certificate revocation list that pertains to the certificate. In this manner, the storage device is able to verify the genuineness of the certificate by checking the identification of the certificate such as its serial number in the certificate revocation list sent by the host device.

A certificate revocation list can be quite lengthy, if the list contains a large number of identifications of revoked certificates, such as their serial numbers. Thus in another embodiment, portions of the certificate revocation list are received by a device, and the device processes the portions sequentially. The device also searches for a reference to or identification of the certificate received from the host on the list where the processing and the searching occur concurrently. Since the processing and searching occur concurrently, the process of verifying the certificate becomes more efficient.

As noted above, storage devices have not been used to obtain certificate revocation lists, while host devices have been used to do so. Thus, in another embodiment, while the host device needs to present a certificate revocation list along with a certificate for authentication of the host device, there is no such need for the storage or memory device to do so, which will need only to present a certificate. It is then up to the host device to obtain the pertinent certificate revocation list for verifying the memory device certificate.

While it is possible for host devices to be used to freely obtain certificate revocation lists, many consumers may find it cumbersome to have to do so frequently, such as every time the consumer wishes to access encrypted content in the storage device. Thus in another embodiment, at least one certificate revocation list is stored in a public area of the memory; the memory also stores protected data or content a user or consumer may wish to access. In this manner, the consumer or user will not need to obtain from a certificate authority the certificate revocation list every time access to the content stored in the memory is desired. Instead, the consumer or user may simply retrieve the at least one certificate revocation list stored in the public area of the memory and then turn around and present the same certificate revocation list to the memory for authentication and content access. The public areas of many types of memories are typically managed by host devices, and not by the memories themselves.

All patents, patent applications, articles, books, specifications, standards, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 24 is a diagram of a certificate chain useful for illustrating one embodiment of the invention.

FIG. 25 is a table illustrating the information in a control sector that precedes the certificate buffer that is sent by the host for sending the last certificate to a memory device, showing an indication that the certificate is the last certificate in the certificate chain to illustrate another embodiment of the invention.

FIGS. 30 and 31 are flow charts illustrating processes carried out by a host device and a memory device respectively where a certificate revocation list stored in the memory device is retrieved by the host device to illustrate one more embodiment of the invention.

FIG. 32 is a diagram of a certificate revocation list showing the fields in the list to illustrate yet another embodiment of the invention.

The figures illustrate features in various embodiments of aspects of the invention. For simplicity in description, identical components are labeled by the same numerals in this application.

DETAILED DESCRIPTION OF EXEMPLARY EMBODIMENTS

Figure 1:
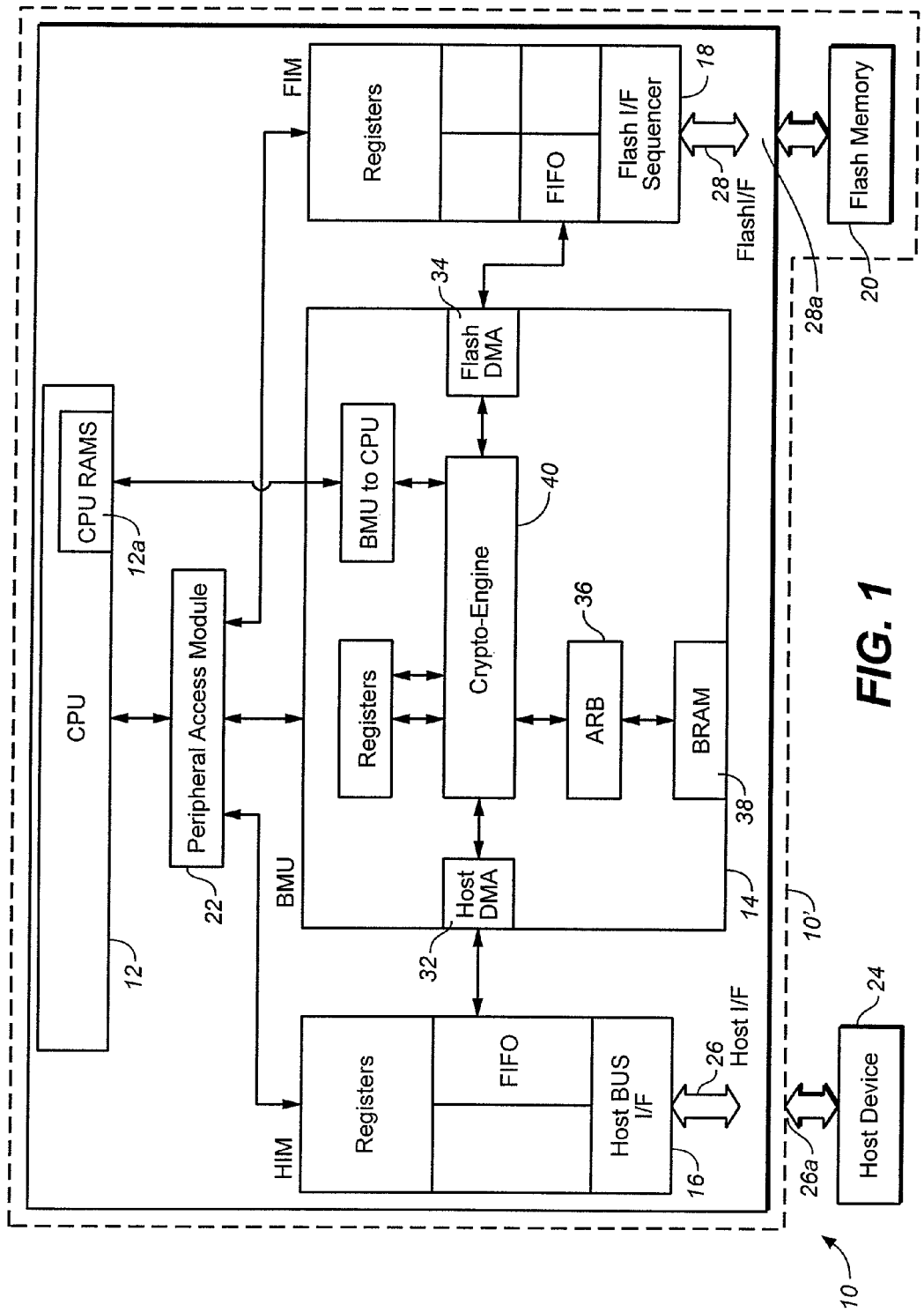
FIG. 1 is a block diagram of a memory system in communication with the host device useful for illustrating this invention.

An example memory system in which the various aspects of the present invention may be implemented is illustrated by the block diagram of FIG. 1. As shown in FIG. 1, the memory system 10 includes a central processing unit (CPU) 12, a buffer management unit (BMU) 14, a host interface module (HIM) 16 and a flash interface module (FIM) 18, a flash memory 20 and a peripheral access module (PAM) 22. Memory system 10 communicates with a host device 24 through a host interface bus 26 and port 26a. The flash memory 20 which may be of the NAND type, provides data storage for the host device 24, which may be a digital camera, a personal computer, a personal digital assistant (PDA), a digital media player such as a MP-3 player, a cellular telephone, a set top box or other digital device or appliance. The software code for CPU 12 may also be stored in flash memory 20. FIM 18 connects to the flash memory 20 through a flash interface bus 28 and port 28a. HIM 16 is suitable for connection to a host device. The peripheral access module 22 selects the appropriate controller module such as FIM, HIM and BMU for communication with the CPU 12. In one embodiment, all of the components of system 10 within the dotted line box may be enclosed in a single unit such as in memory card or stick 10' and preferably encapsulated. The memory system 10 is removably connected to host device 24, so that the content in system 10 can be accessed by each of many different host devices.

In the description below, memory system 10 is also referred to as memory device 10, or simply as memory device or device. While the invention is illustrated herein by reference to flash memories, the invention may also be applicable to other types of memories, such as magnetic disks, optical CDs, as well as all other types of rewriteable non-volatile memory systems.

The buffer management unit 14 includes a host direct memory access (HDMA) 32, a flash direct memory access (FDMA) 34, an arbiter 36, a buffer random access memory (BRAM) 38 and a crypto-engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to the BRAM 38. The HDMA 32 and FDMA 34 are responsible for data transported between the HIM 16, FIM 18 and BRAM 38 or the CPU random access memory (CPU RAM) 12a. The operation of the HDMA 32 and of the FDMA 34 are conventional and need not be described in detail herein. The BRAM 38 is used to store data passed between the host device 24 and flash memory 20. The HDMA 32 and FDMA 34 are responsible for transferring the data between HIM 16/FIM 18 and BRAM 38 or the CPU RAM 12a and for indicating sector completion.

In one embodiment, memory system 10 generates the key value(s) that are used for encryption and/or decryption, where this value(s) is preferably substantially not accessible to external devices such as host device 24. Alternatively, the key value may also be generated outside of the system 10, such as by a license server, and sent to system 10. Irrespective of how the key value is generated, once the key value is stored in system 10, only authenticated entities will be able to access the key value. However, encryption and decryption is typically done file by file, since the host device reads and writes data to memory system 10 in the form of files. Like many other types of storage devices, memory device 10 does not manage files. While memory 20 does store a file allocation table (FAT) where the logical addresses of the files are identified, the FAT is typically accessed and managed by the host device 24 and not by the controller 12. Therefore, in order to encrypt data in a particular file, the controller 12 has to rely on the host device to send the logical addresses of the data in the file in memory 20, so that the data of the particular file can be found and encrypted and/or decrypted by system 10 using the key value(s) available only to system 10.

To provide a handle for both the host device 24 and memory system 10 to refer to the same key(s) for cryptographically processing data in files, the host device provides a reference for each of the key values generated by or sent to system 10, where such reference may simply be a key ID. Thus, the host 24 associates each file that is cryptographically processed by system 10 with a key ID, and the system 10 associates each key value that is used to cryptographically process data with a key ID provided by the host. Thus, when the host requests that data be cryptographically processed, it will send the request along with a key ID along with the logical addresses of data to be fetched from or stored in memory 20 to system 10. System 10 generates or receives a key value and associates the key ID provided by the host 24 with such value, and performs the cryptographic processing. In this manner, no change needs to be made in the manner memory system 10 operates while allowing it to completely control the cryptographic processing using the key(s), including exclusive access to the key value(s). In other words, once the key value is stored in or generated by system 10, the system continues to allow the host 24 to manage the files by having exclusive control of FAT, while it maintains exclusive control for the management of the key value(s) used for cryptographic processing. The host device 24 has no part in the management of the key value(s) used for cryptographic processing of data, after the key value(s) are stored in memory system 10.

The key ID provided by the host 24 and the key value sent to or generated by the memory system form two attributes of a quantity referred to below as the "content encryption key" or CEK in one of the embodiments. While the host 24 may associate each key ID with one or more files, host 24 may also associate each key ID with unorganized data or data organized in any manner, and not limited to data organized into complete files.

In order for a user or application to gain access to protected content or area in system 10, it will need to be authenticated using a credential which is pre-registered with system 10. A credential is tied to the access rights granted to the particular user or application with such credential. In the pre-registration process, system 10 stores a record of the identity and credential of the user or application, and the access rights associated with such identity and credential determined by the user or application and provided through the host 24. After the pre-registration has been completed, when the user or application requests to write data to memory 20, it will need to provide through the host device its identity and credential, a key ID for encrypting the data, and the logical addresses where the encrypted data is to be stored. System 10 generates or receives a key value and associates this value with the key ID provided by the host device, and stores in its record or table for this user or application the key ID for the key value used to encrypt the data to be written. It then encrypts the data and stores the encrypted data at the addresses designated by the host as well as the key value it generated or received.

When a user or application requests to read encrypted data from memory 20, it will need to provide its identity and credential, the key ID for the key previously used to encrypt the requested data, and the logical addresses where the encrypted data is stored. System 10 will then match the user or application identity and credential provided by the host to those stored in its record. If they match, system 10 will then fetch from its memory the key value associated with the key ID provided by the user or application, decrypt the data stored at the addresses designated by the host device using the key value and send the decrypted data to the user or application.

By separating the authentication credentials from the management of keys used for cryptographic processing, it is then possible to share rights to access data without sharing credentials. Thus, a group of users or applications with different credentials can have access to the same keys for accessing the same data, while users outside this group have no access. While all users or applications within a group may have access to the same data, they may still have different rights. Thus, some may have read only access, while others may have write access only, while still others may have both. Since system 10 maintains a record of the users or application identities and credentials, the key IDs they have access to, and the associated access rights to each of the key IDs, it is possible for system 10 to add or delete key IDs and alter access rights associated with such key IDs for particular users or applications, to delegate access rights from one user or application to another, or even to delete or add records or tables for users or applications, all as controlled by a properly authenticated host device. The record stored may specify that a secure channel is needed for accessing certain keys. Authentication may be done using symmetric or asymmetric algorithms as well as passwords.

Especially important is the portability of the secured content in the memory system 10. In the embodiments where access to the key value is controlled by the memory system, when the memory system or a storage device incorporating the system is transferred from one external system to another, security of the content stored therein is maintained. Whether the key is generated by the memory system or originates from outside the memory system, external systems are not able to access such content in system 10 unless they have been authenticated in a manner completely controlled by the memory system. Even after being so authenticated, access is totally controlled by the memory system, and external systems can access only in a manner controlled according to preset records in the memory system. If a request does not comply with such records, the request will be denied.

Figure 2:
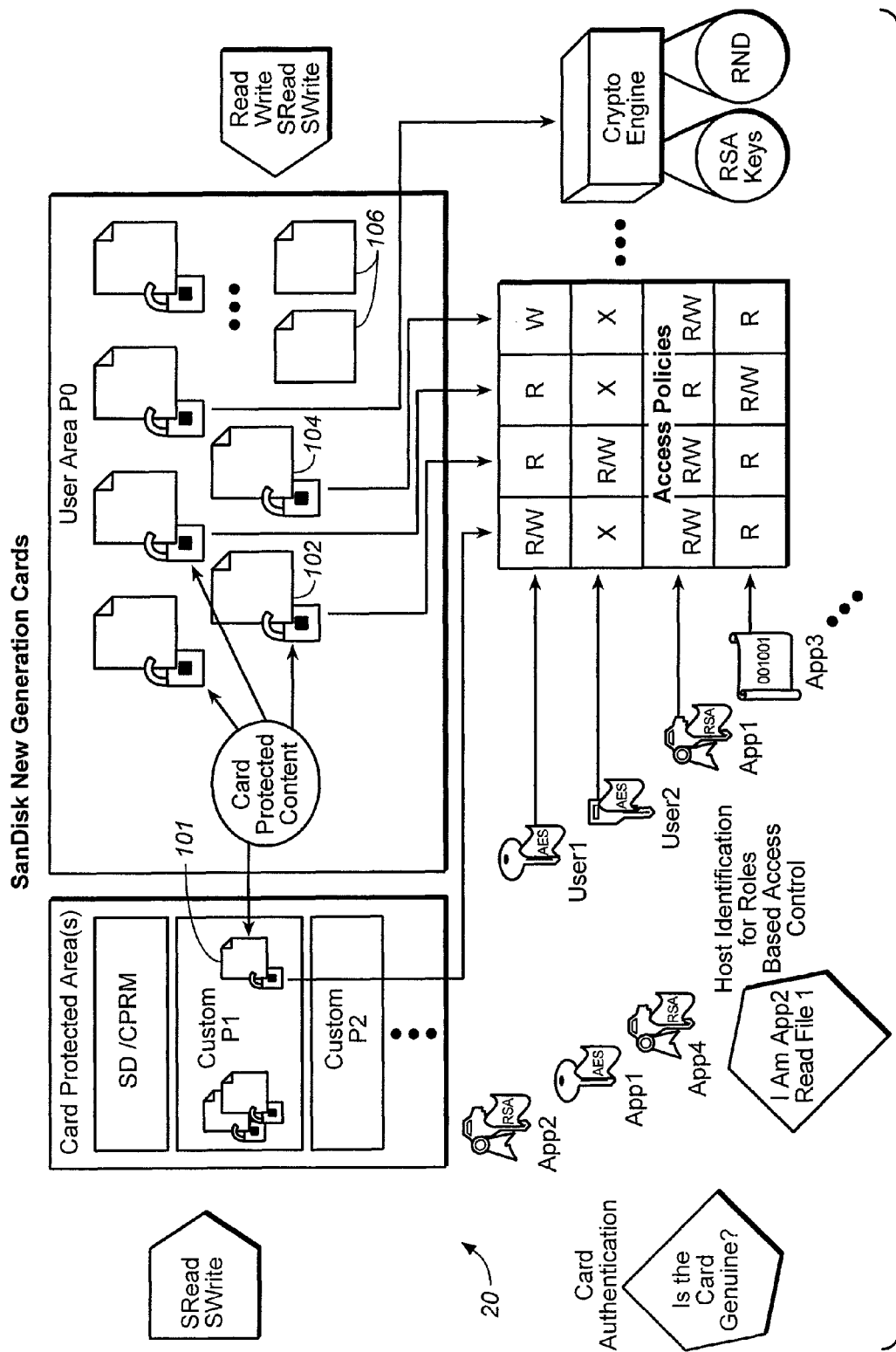
FIG. 2 is a schematic view of different partitions of a memory and of unencrypted and encrypted files stored in different partitions where access to certain partitions and the encrypted files is controlled by access policies and authentication procedures useful for illustrating different embodiments of the invention.

To provide greater flexibility in protecting content, it is envisioned that certain areas of the memory referred to below as partitions can be accessed only by properly authenticated users or applications. When combined with the above described features of key-based data encryption, system 10 provides greater data protection capability. As shown in FIG. 2, the flash memory 20 may have its storage capacity divided into a number of partitions: a user area or partition and custom partitions. The user area or partition P0 is accessible to all users and applications without authentication. While all bit values of data stored in the user area can be read or written to by any application or user, if the data read is encrypted, the user or application without authority to decrypt would not be able to access the information represented by the bit values stored in a user area. This is illustrated, for example, by files 102 and 104 stored in user area P0. Also stored in the user area are unencrypted files such as 106 which can be read and understood by all applications and users. Thus, symbolically, the files that are encrypted are shown with locks associated with them such as for files 102 and 104.

While an encrypted file in a user area P0 cannot be understood by unauthorized applications or users, such applications or users may still be able to delete or corrupt the file, which may be undesirable for some applications. For this purpose, memory 20 also includes protected custom partitions such as partitions P1 and P2 which cannot be accessed without prior authentication. The authentication process permitted in the embodiments in this application is explained below.

As also illustrated in FIG. 2, a variety of users or applications may access the files in memory 20. Thus users 1 and 2, and applications 1-4 (running on devices) are shown in FIG. 2. Before these entities are allowed to access protected content in memory 20, they are first authenticated by an authentication process in a manner explained below. In this process, the entity that is requesting access needs to be identified at the host side for role based access control. Thus, the entity requesting access first identifies itself by supplying information such as "I am application 2 and I wish to read file 1." Controller 12 then matches the identity, authentication information and request against the record stored in memory 20 or controller 12. If all requirements are met, access is then granted to such entity. As illustrated in FIG. 2, user 1 is allowed to read from and write to file 101 in partition P1, but can only read files 102 and 104 in addition to user 1 having unrestricted rights to read from and write to files 106 in P0. User 2, on the other hand, is not allowed access to file 101 and 104 but has read and write access to file 102. As indicated in FIG. 2, users 1 and 2 have the same login algorithm (AES) while applications 1 and 3 have different login algorithms (e.g. RSA and 001001) which are also different from those of users 1 and 2.

The Secure Storage Application (SSA) is a security application of the memory system 10, and illustrates an embodiment of the invention, which can be used to implement many of the above-identified features. SSA may be embodied as software or computer code with database stored in the memory 20 or a non-volatile memory (not shown) in CPU 12, and is read into RAM 12a and executed by CPU 12. The acronyms used in reference to the SSA are set forth in the table below:

| | Definitions, Acronyms & Abbreviations |
|---|---|
| ACR | Access Control Records |
| AGP | ACR Group |
| CBC | Chain Block Cipher |
| CEK | Content Encryption Key |
| ECB | Electronic Codebook |
| ACAM | ACR Attributes Management |
| PCR | Permissions Control Record |
| SSA | Secure Storage Application |
| Entity | Any thing that has real and individual existence (host side) that logs in the SSA and thus utilizes its functionalities. |

SSA System Description

Data security, integrity and access control are the major roles of the SSA. The data are files that would otherwise be stored plainly on a mass-storage device of some kind. The SSA system sits atop of the storage system and adds the security layer for the stored host files, and provides security functions through security data structures described below.

The main task of the SSA is to manage the different rights associated with the stored (and secured) content in the memory. The memory application needs to manage multiple users and content rights to multiple stored content. Host applications from their side, see drives and partitions that are visible to such applications, and file allocation tables (FATs) that manage and portray the locations of the stored files on the storage device.

In this case the storage device uses NAND flash chip divided to partitions, although other mobile storage devices may also be used and are within the scope of this invention. These partitions are continuous threads of logical addresses, where a start and an end address define their boundaries. Restrictions may therefore be imposed on access to hidden partitions, if desired, by means of software (such as software stored in memory 20) that associates such restrictions with the addresses within such boundaries. Partitions are fully recognizable to the SSA by their logical address boundaries that are managed by it. The SSA system uses partitions to physically secure data from unauthorized host applications. To the host, the partitions are a mechanism of defining proprietary spaces in which to store data files. These partitions can either be public, where anyone with access to the storage device can see and be aware of the partition's presence on the device, or private or hidden, where only the selected host applications have access to and are aware of their presence in the storage device.

Figure 3:
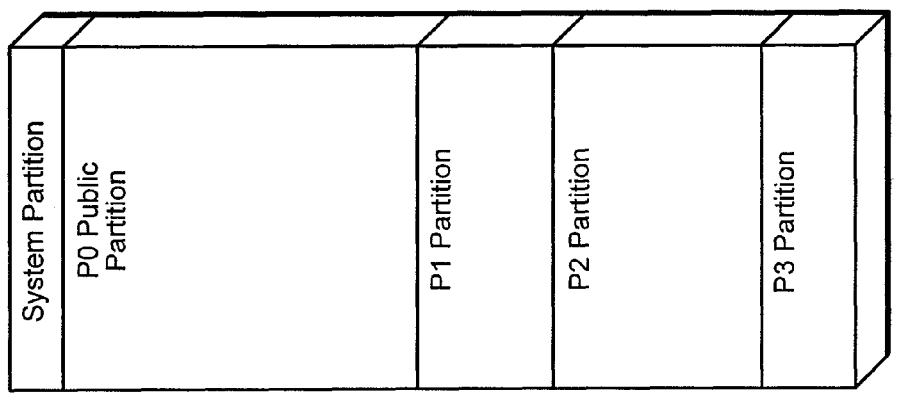
FIG. 3 is a schematic view of a memory illustrating the different partitions in the memory.

FIG. 3 is a schematic view of a memory illustrating the partitions of the memory: P0, P1, P2 and P3 (obviously fewer or more partitions than four may be employed), where P0 is a public partition which can be accessed by any entity without authentication.

A private partition (such as P1, P2 or P3) hides the access to the files within it. By preventing the host from accessing the partition, the flash device (e.g. flash card) delivers protection of the data files inside the partition. This kind of protection, however, engulfs all of the files residing in the hidden partition by imposing restrictions on access to data stored at the logical addresses within the partition. In other words, the restrictions are associated with a range of logical addresses. All of the users/hosts that have access to that partition will have unlimited access to all of the files inside. To isolate different files from one another—or groups of files—the SSA system provides another level of security and integrity per file—or groups of files—using keys and key references or Key IDs. A key reference or key ID of a particular key value used for encrypting data at different memory addresses can be analogized to a container or domain that contains the encrypted data. For this reason, in FIG. 4, the key references or key IDs (e.g. "key 1" and "key 2") are shown graphically as areas surrounding the files encrypted using the key values associated with the key IDs.

Figure 4:
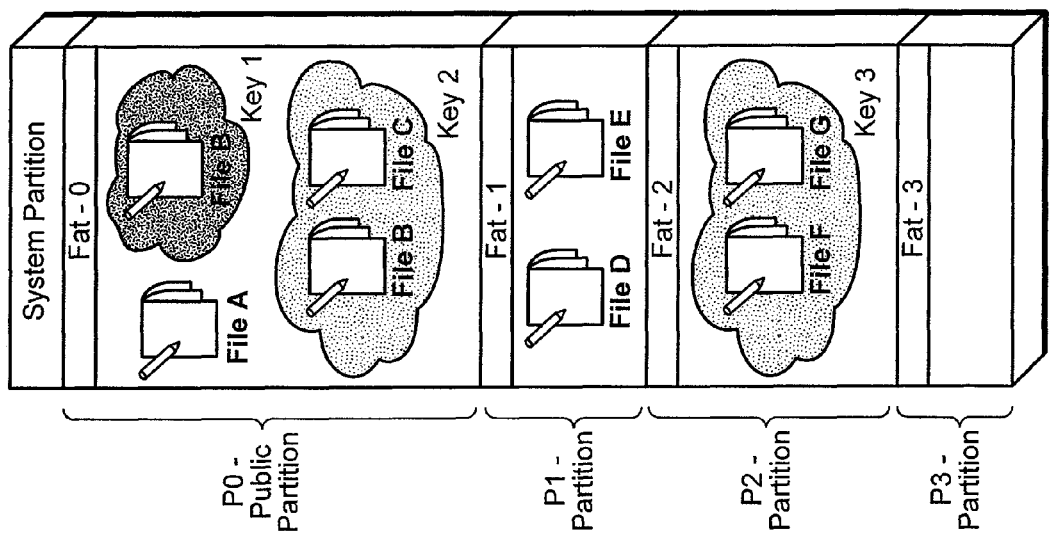
FIG. 4 is a schematic view of file location tables for the different partitions of the memory shown in FIG. 3 where some of the files in the partitions are encrypted useful for illustrating different embodiments of the invention.

In reference to FIG. 4, for example, File A is accessible to all entities without any authentication, since it is shown as not enclosed by any key ID. Even though File B in the public partition can be read or overwritten by all entities, it contains data encrypted with a key with ID "key 1", so that the information contained in File B is not accessible to an entity unless such entity has access to such key. In this manner using key values and key references or Key IDs provide logical protection only, as opposed to the type of protection provided by the partition described above. Hence, any host that can access a partition (public or private) is capable of reading or writing the data in the entire partition, including the encrypted data. However, since the data is encrypted, unauthorized users can only corrupt it. They preferably cannot alter the data without detection. By restricting the access to the encryption and/or decryption keys, this feature can allow only the authorized entities to use the data. Files B and C are also encrypted using a key with key ID "key 2" in P0.

Data confidentiality and integrity can be provided through symmetric encryption methods that use Content Encryption Keys (CEK), one per CEK. In the SSA embodiment, the key values in CEKs are generated or received by the flash device (e.g. flash card), used internally only, and kept as secrets from the outside world. The data that is encrypted or ciphered may also be either hashed or the cipher is chain blocked to ensure data integrity.

Not all the data in the partition is encrypted by different keys and associated with different key IDs. Certain logical addresses either in public or user files or in the operating system area (i.e. FAT) may not be associated with any key or key reference, and thus are available to any entity that can access the partition itself.

An entity that calls for the ability to create keys and partitions as well as writing and reading data from them or using the keys, needs to login to the SSA system through an Access Control Record (ACR). The privileges of an ACR in the SSA system are called Actions. Every ACR may have Permissions to perform Actions of the following three categories: Creating partitions and keys/key IDs, accessing partitions and keys and creating/updating other ACRs.

ACRs are organized in groups called ACR Groups or AGPs. Once an ACR has successfully authenticated, the SSA system opens a Session through which any of the ACR's actions can be executed. ACRs and AGPs are security data structures used to control access to the partitions and keys according to policies.

User Partition(s)

The SSA system manages one or more public partitions, also referred to as the user partition(s). This partition exists on the storage device and is a partition or partitions that can be accessed through the standard read write commands of the storage device. Getting information regarding the size of the partition(s) as well as its existence on the device preferably cannot be hidden from the host system.

The SSA system enables accessing this partition(s) either through the standard read write commands or the SSA commands. Therefore, accessing the partition preferably cannot be restricted to specific ACRs. The SSA system, however, can enable the host devices to restrict the access to the user partition. Read and write accesses can be enabled/disabled individually. All four combinations (e.g. write only, read only (write protect), read and write and no access) are allowed.

The SSA system enables ACRs to associate key IDs with files within the user partition and encrypt individual files using keys associated with such key IDs. Accessing encrypted files within the user partitions as well as setting the access rights to the partitions will be done using the SSA command set. The above features also apply to data not organized into files.

SSA Partitions

These are hidden (from unauthenticated parties) partitions that can be accessed only through the SSA commands. The SSA system will preferably not allow the host device to access an SSA partition, other than through a session (described below) established by logging onto an ACR. Similarly, preferably the SSA will not provide information regarding the existence, size and access permission of an SSA partition, unless this request is coming through an established session.

Access rights to partitions are derived from the ACR permissions. Once an ACR is logged into the SSA system, it can share the partition with other ACRs (described below). When a partition is created, the host provides a reference name or ID (e.g. P0-P3 in FIGS. 3 and 4) for the partition. This reference is used in further read and write commands to the partition.

Partitioning of the Storage Device

All available storage capacity of the device is preferably allocated to the user partition and the currently configured SSA partitions. Therefore, any repartition operation may involve reconfiguration of the existing partitions. The net change to the device capacity (sum of sizes of all partitions) will be zero. The IDs of the partitions in the device memory space are defined by the host system.

The host system can either repartition one of the existing partitions into two smaller ones or, merge two existing partitions (which may or may not be adjacent) into one. The data in the divided or merged partitions can be either erased or left untouched, at the host's discretion.

Since repartitioning of the storage device may cause loss of data (either because it was erased or moved around in the logical address space of the storage device) severe restrictions on repartitioning are administered by the SSA system. Only an ACR residing in a root AGP (explained below) is allowed to issue a repartition command and it can only reference partitions owned by it. Since the SSA system is not aware of how data is organized in the partitions (FAT other file system structure) it is the host's responsibility to reconstruct these structures any time the device is repartitioned.

Repartitioning of the user partition will change the size and other attributes of this partition as seen by the host OS.

After repartitioning, it is the host system's responsibility to make sure any ACR in the SSA system is not referencing the non-existing partitions. If these ACRs are not deleted or updated appropriately, future attempts, on behalf of these ACRs, to access the non-existing partitions will be detected and rejected by the system. Similar care is taken, regarding deleted keys and key IDs.

Keys, Key IDs and Logical Protection

When a file is written to a certain hidden partition, it is hidden from the general public. But, once an entity (hostile or not) gets knowledge and access to this partition the file becomes available and plain to see. To further secure the file, the SSA can encrypt it in the hidden partition, where the credentials for accessing the key for decrypting the file are preferably different from those for accessing the partition. Due to the fact that files are totally controlled and managed by the host, associating a CEK with a file is a problem. Linking the file to something the SSA acknowledges—the key ID, rectifies this. Thus, when a key is created by the SSA, the host associates the key ID for this key with the data encrypted using the key created by the SSA. If the key is sent to the SSA together with key ID, the key and key ID can be readily associated with each other.

The key value and key ID provide logical security. All data associated with a given key ID, regardless of its location, is ciphered with the same key value in the content encryption key (CEK) whose reference name or key ID is uniquely provided at creation by the host application. If an entity obtains access to a hidden partition (by authenticating through an ACR) and wishes to either read or write an encrypted file within this partition, it needs to have access to the key ID that is associated with the file. When granting access to the key for this key ID, the SSA loads the key value in CEK associated with this key ID and either decrypts the data before sending it to the host or encrypts the data before writing it to the flash memory 20. In one embodiment, a key value in CEK associated with a key ID is randomly created once by the SSA system and maintained by it. No one outside the SSA system has knowledge or access to this key value in CEK. The outside world only provides and uses a reference or key ID, not the key value in CEK. The key value is entirely managed and preferably only accessible by the SSA. Alternatively, the key may be provided to the SSA system.

The SSA system protects the data associated with the key ID using any one (user defined) of the following cipher modes (the actual cryptographic algorithms used, as well as the key values in CEKs, are system controlled and not revealed to the outside world):

Block mode—Data is divided into blocks, each one of them, encrypted individually. This mode is generally considered less secure and susceptive to dictionary attacks, However, it will allow users to randomly access any one of the data blocks.

Chained mode—Data is divided into blocks, which are chained during the encryption process. Every block is used as one of the inputs to the encryption process of the next one. In this mode, although considered as more secure, the data is written and read sequentially from start to end, creating an overhead which may not be acceptable to the users.

Hashed—Chain mode with the additional creation of a data digest that can be used for validating data integrity.

ACRs and Access Control

The SSA is designed to handle multiple applications where each one of them is represented as a tree of nodes in the system database. Mutual exclusion between the applications is achieved by ensuring no cross talk between the tree branches.

In order to gain access to the SSA system, an entity needs to establish a connection via one of the system's ACRs. Login procedures are administered by the SSA system according to the definitions embedded in the ACR the user chose to connect with.

Figure 5:
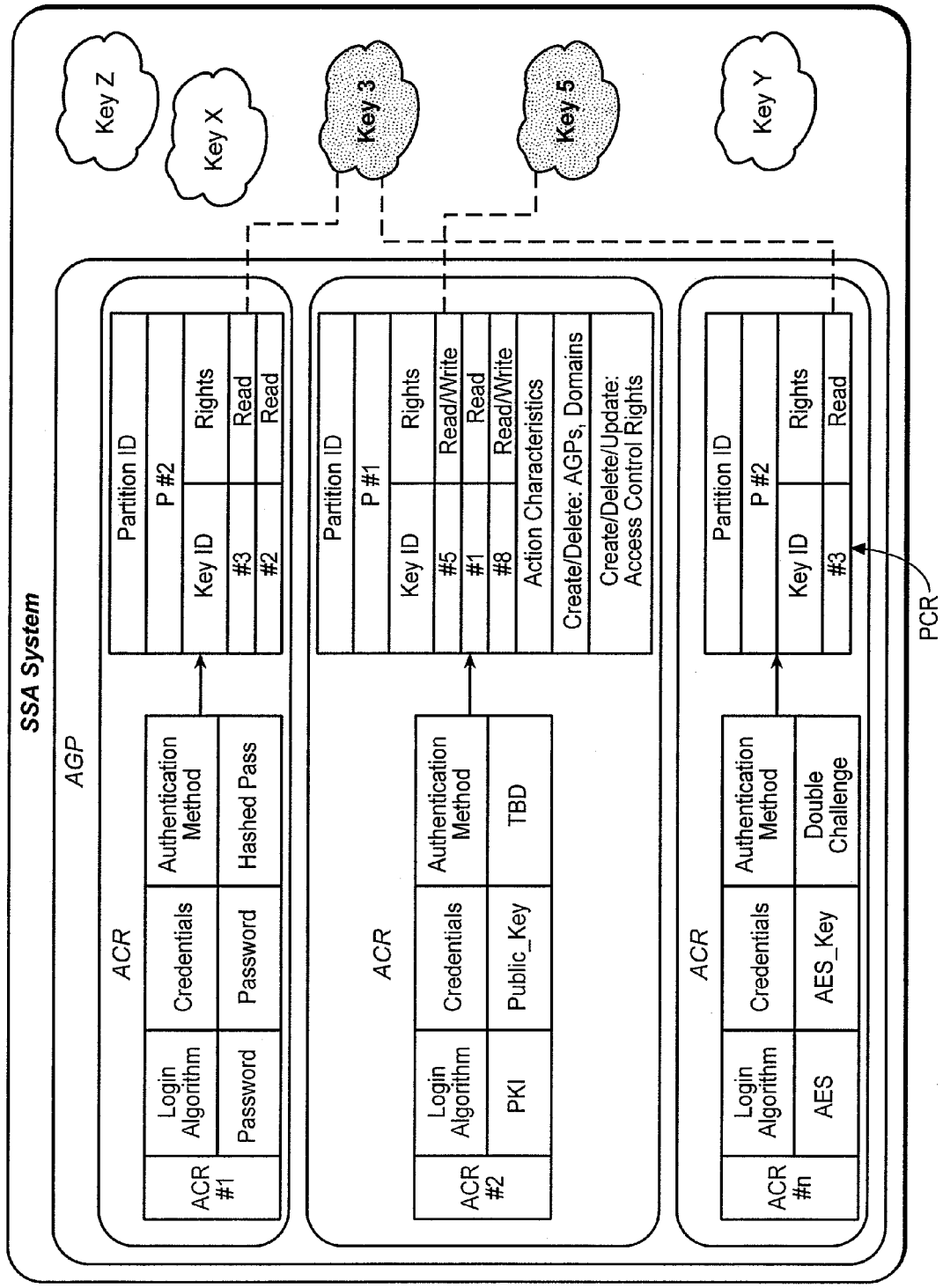
FIG. 5 is a schematic view of access control records in an access controlled record group and the associated key references useful for illustrating different embodiments of the invention.

The ACR is an individual login point to the SSA system. The ACR holds the login credentials and the authentication method. Also residing in the record are the login permissions within the SSA system, among which are the read and write privileges. This is illustrated in FIG. 5, which illustrates n ACRs in the same AGP. This means that at least some of the n ACRs may share access to the same key. Thus, ACR #1 and ACR #n share access to a key with key ID "key 3", where ACR#1 and ACR#n are the ACR IDs, and "key 3" is a key ID for the key that is used to encrypt data associated with "key 3". The same key can also be used to encrypt and/or decrypt multiple files, or multiple sets of data.

The SSA system supports several types of login onto the system where authentication algorithms and user credentials may vary, as may the user's privileges in the system once he logged in successfully. FIG. 5 again illustrates different login algorithms and credentials. ACR#1 specifies a password login algorithm and password as credential whereas ACR#2 specifies a PKI (public key infrastructure) login algorithm and public key as credential. Thus, to login, an entity will need to present a valid ACR ID, as well as the correct login algorithm and credential.

Once an entity is logged into an ACR of the SSA system, its permissions—its rights to use SSA commands—are defined in the Permissions Control Record (PCR) which is associated with the ACR. In FIG. 5, ACR#1 grants read only permission to data associated with "key 3", and ACR #2 grants permission to read and write data associated with "key 5" according to the PCR shown.

Different ACRs may share common interests and privileges in the system such as in keys with which to read and write. To accomplish that, ACRs with something in common are grouped in AGPs—ACR Groups. Thus, ACR #1 and ACR #n share access to a key with key ID "key 3".

Figure 6:
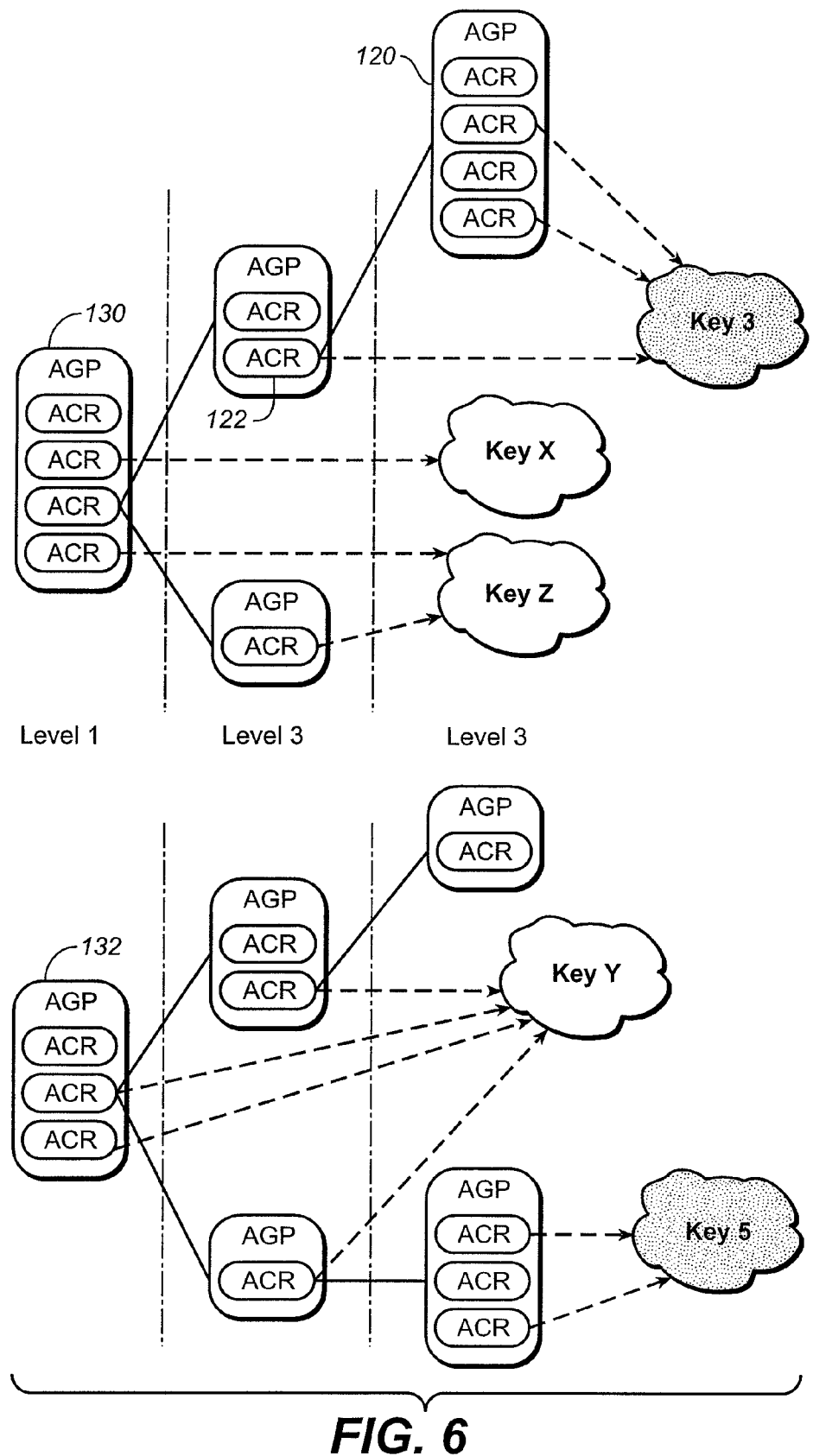
FIG. 6 is a schematic view of tree structures formed by access controlled records groups and access controlled records useful for illustrating different embodiments of the invention.

AGPs and, the ACRs within, are organized in hierarchical trees and so aside from creating secure keys that keep sensitive data secure; an ACR can preferably also create other ACR entries that correspond to his key ID/partitions. These ACR children will have the same or less permissions as their father—creator and, may be given permissions for keys the father ACR himself created. Needless to add, the children ACRs get access permissions to any key that they create. This is illustrated in FIG. 6. Thus, all of the ACRs in AGP 120 were created by ACR 122 and two of such ACRs inherit from ACR 122 permission(s) to access to data associated with "key 3".

AGP

Logging onto the SSA system is done by specifying an AGP and an ACR within the AGP.

Every AGP has a unique ID (reference name), which is used as an index to its entry in the SSA database. The AGP name is provided to the SSA system, when the AGP is created. If the provided AGP name already exists in the system, the SSA will reject the creation operation.

AGPs are used to administer restrictions on delegation of access and management permissions as will be described in the following sections. One of the functions served by the two trees in FIG. 6 is to administer the access by entirely separate entities, such as two different applications, or two different computer users. For such purposes, it may be important for the two access processes to be substantially independent of one another (i.e. substantially no cross-talk), even though both occur at the same time. This means that the authentication, permissions as well as the creation of additional ACRs and AGPs in each tree are not connected to and do not depend on those of the other tree. Hence, when the SSA system is used in memory 10, this allows the memory system 10 to serve multiple applications simultaneously. It also allows the two applications to access two separate sets of data independently of one another (e.g. a set of photographs and a set of songs). This is illustrated in FIG. 6. Thus, the data associated with "keys 3", "key X" and "key Z" for the application or user accessing via nodes (ACRs) in the tree in the top portion of FIG. 6 may comprise photographs. The data associated with "key 5" and "key Y" for the application or user accessing via nodes (ACRs) of the tree in the bottom portion of FIG. 6 may comprise songs. The ACR that created the AGP has the permission to delete it only when the AGP is empty of ACR entries.

The entity's SSA entry point: Access Control Record (ACR)

An ACR in the SSA system describes the way the entity is permitted to log into the system. When an entity logs into the SSA system it needs to specify the ACR that corresponds to the authentication process it is about to perform. An ACR includes a Permissions Control Record (PCR) that illustrates the granted actions the user can execute once authenticated as defined in the ACR as illustrated in FIG. 5. The host side entity provides all of the ACR data fields.

When an entity has successfully logged onto an ACR, the entity will be able to query on all of the ACR's partition and key access permissions and ACAM permissions (explained below).

ACR ID

When an SSA system entity initiates the login process it needs to specify the ACR ID (as provided by the host when the ACR was created) that corresponds to the login method so that the SSA will set up the correct algorithms and select the correct PCR when all login requirements have been met. The ACR ID is provided to the SSA system when the ACR is created.

Login/Authentication Algorithm

The authentication algorithm specifies what sort of login procedure will be used by the entity, and what kind of credentials are needed to provide proof of user's identity. The SSA system supports several standard login algorithms, ranging from no procedure (and no credential) and password-based procedures to a two-way authentication protocols based on either symmetric or asymmetric cryptography.

Credentials

The entity's credentials correspond to the login algorithm and are used by the SSA to verify and authenticate the user. An example for credential can be a password/PIN-number for password authentication, AES-key for AES authentication, etc. The type/format of the credentials (i.e. the PIN, the symmetric key, etc. . . . ) is predefined and derived from the authentication mode; they are provided to the SSA system when the ACR is created. The SSA system has no part in defining, distributing and managing these credentials, with the exception of PKI based authentication where the device (e.g. flash card) can be used to generate the RSA or other type of key pair and the public key can be exported for certificate generation.

The Permissions Control Record (PCR)

The PCR shows what is granted to the entity after logging into the SSA system and passing the ACR's authentication process successfully. There are three types of permission categories: Creation permissions for partition and keys, Access permissions to partitions and keys and management permissions for Entity-ACR Attributes Accessing Partitions This section of the PCR contains the list of partitions (using their IDs as provided to the SSA system) the entity can access upon completing the ACR phase successfully. For each partition the access type may be restricted to write-only or read-only or may specify full write/read access rights. Thus, the ACR#1 in FIG. 5 has access to partition #2 and not partition #1. The restrictions specified in the PCR apply to the SSA partitions and the public partition.

The public partition can be accessed either by regular read and write commands to the device (e.g. flash card) hosting the SSA system, or by SSA commands. When a root ACR (explained below) is created with the permission to restrict the public partition, he can pass it on to his children. An ACR can preferably only restrict the regular read and write commands from accessing the public partition. ACRs in the SSA system can be restricted preferably only upon their creation. Once an ACR has the permission to read/write from/to the public partition, preferably it cannot be taken away.

Accessing Key IDs

This section of the PCR contains the data associated with the list of key IDs (as provided to the SSA system by the host) the entity can access when the ACR policies have been met by the entity's login process. The key ID specified is associated with a file/files that reside in the partition appearing in the PCR. Since the key IDs are not associated with logical addresses in the device (e.g. flash card), when more than one partition is associated with a specific ACR, the files can be in either one of the partitions. The key IDs specified in the PCR can have each, a different set of access rights. Accessing data pointed to by key IDs can be restricted to write-only or read-only or may specify full write/read access rights.

ACR Attributes Management (ACAM)

This section describes how in certain cases the ACR's system attributes can be changed.

The ACAM actions that may be permitted in the SSA system are:

1. Create/delete/update AGPs and ACR.
2. Create/delete Partitions and Keys.
3. Delegate access rights to keys and partitions.

A father ACR preferably cannot edit ACAM permissions. This would preferably need the deletion and recreation of the ACR. Also the access permission to a key ID created by the ACR can preferably not be taken away.

An ACR may have the capacity to create other ACRs and AGPs. Creating ACRs also may mean delegating them some or all of the ACAM permissions possessed by their creator. Having the permission to create ACRs means having the permission for the following actions:

1. Define and edit the child's credentials—the authentication method preferably cannot be edited once set by the creating ACR. The credentials may be altered within the boundary of the authentication algorithm that is already defined for the child.
2. Delete an ACR.
3. Delegate the creating permission to the child ACR (thus having grandchildren).

An ACR with the permissions to create other ACRs has the permission to delegate the unblocking permission to ACRs it creates (although it probably does not have the permission to unblock ACRs). The father ACR will place in the child ACR a reference to his unblocker.

The father ACR is the only ACR that has the permission to delete his child ACR. When an ACR deletes a lower level ACR that he created, then all ACRs spawned by this lower-level ACR are automatically deleted as well. When an ACR is deleted then all the key IDs and partitions that it created are deleted.

There are two exceptions by which an ACR can update its own record:

1. Passwords/PINs, although set by the creator ACR, can be updated only by the ACR that includes them.

2. A root ACR may delete itself and the AGP that it resides in.

Delegate Access Rights to Keys and Partitions

ACRs and their AGPs are assembled in hierarchical trees where the root AGP and the ACRs within are at the top of the tree (e.g. root AGPs 130 and 132 in FIG. 6). There can be several AGP trees in the SSA system though they are totally separated from one another. An ACR within an AGP can delegate access permissions to its keys to all ACRs within the same AGP that it is in, and to all the ACRs created by them. The permission to create keys preferably includes the permission to delegate access permissions to use the keys.

Permissions to keys are divided into three categories:

1. Access—this defines the access permissions for the key i.e. Read, Write.

2. Ownership—an ACR that created a key is by definition its owner. This ownership can be delegated from one ACR to another (provided that they are in the same AGP or in a child AGP). An ownership of a key provides the permission to delete it as well as delegate permissions to it.

3. Access Rights Delegation—this permission enables the ACR to delegate the rights he holds.

An ACR can delegate access permissions to partitions he created as well as other partitions he has access permissions to.

The permission delegation is done by adding the names of the partitions and key IDs to the designated ACR's PCR. Delegating key access permissions may either be by the key ID or by stating that access permission is for all of the created keys of the delegating ACR.

Blocking and Unblocking of ACRs

An ACR may have a blocking counter which increments when the entity's ACR authentication process with the system is unsuccessful. When a certain maximum number (MAX) of unsuccessful authentications is reached, the ACR will be blocked by the SSA system.

The blocked ACR can be unblocked by another ACR, referenced by the blocked ACR. The reference to the unblocking ACR is set by its creator. The unblocking ACR preferably is in the same AGP as the creator of the blocked ACR and has the "unblocking" permission.

No other ACR in the system can unblock the blocked ACR. An ACR may be configured with a blocking counter but without an unblocker ACR. In this case, if this ACR get blocked it cannot be unblocked.

Root AGP—Creating an Application Database

The SSA system is designed to handle multiple applications and isolate the data of each one of them. The tree structure of the AGP system is the main tool used to identify and isolate application specific data. The root AGP is at the tip of an application SSA database tree and adheres to somewhat different behavior rules. Several root AGPs can be configured in the SSA system. Two root AGPs 130 and 132 are shown in FIG. 6. Obviously fewer or more AGPs may be used and are within the scope of this invention.

Registering the device (e.g. flash card) for a new application and/or issue credentials of a new applications for the device are done through the process of adding new AGP/ACR tree to the device.

The SSA system supports three different modes of root AGP creation (as well as all of the ACRs of the root AGP and their permissions):

1. Open: Any user or entity without requiring any sort of authentication, or users/entities authenticated through the system ACR (explained below), can create a new root AGP. The open mode enables creation of root AGPs either without any security measures while all data transfer is done on an open channel (i.e. in the secure environment of an issuance agency) or, through a secure channel established through the system ACR authentication (i.e. Over The Air (OTA) and post issuance procedures).

If the system ACR is not configured (this is an optional feature) and the root AGP creation mode is set to Open, only the open channel option is available.

2. Controlled: Only entities authenticated through the System ACR can create a new root AGP. The SSA system cannot be set to this mode if system ACR is not configured.

3. Locked: Creation of root AGPs is disabled and no additional root AGPs can be added to the system Two SSA commands control this feature (these commands are available to any user/entity without authentication):

1. Method configuration command—Used to configure the SSA system to use any one of the three root AGP creation modes. Only the following mode changes are allowed: Open->Controlled, Controlled->Locked (i.e. if the SSA system is currently configured as Controlled, it can only be changed to locked).

2. Method configuration lock command—Used to disable the method configuration command and permanently lock the currently selected method.

When a root AGP is created, it is in a special initializing mode that enables the creation and configuration of its ACRs (using the same access restrictions that applied to the creation of the root AGP). At the end of the root AGP configuration process, when the entity explicitly switches it to operating mode, the existing ACRs can no longer be updated and additional ACRs can no longer be created Once a root AGP is put in standard mode it can be deleted only by logging into the system through one of its ACRs that is assigned with the permission to delete the root AGP. This is another exception of root AGP, in addition to the special initialization mode; it is preferably the only AGP that may contain an ACR with the permission to delete its own AGP, as opposed to AGPs in the next tree level.

The third and last difference between a root ACR and a standard ACR is that it is the only ACR in the system that can have the permission to create and delete partitions.

SSA System ACR

The system ACR may be used for the following two SSA operations:

1. Create an ACR/AGP tree under the protection of a secured channel within hostile environments.

2. Identify and authenticate the device hosting the SSA system.

There may preferably be only one System ACR in the SSA and once defined it preferably cannot be changed. There is no need for system authentication when creating the System ACR; only a SSA command is needed. The create-system-ACR feature can be disabled (similarly to the create-root-AGP feature). After the system ACR is created, the create-system-ACR command has no effect, since preferably only one System ACR is allowed.

While in the process of creating, the System ACR is not operational. Upon finishing, a special command needs to be issued indicating that the System ACR is created and ready to go. After this point the System ACR preferably cannot be updated or replaced.

Figure 7:
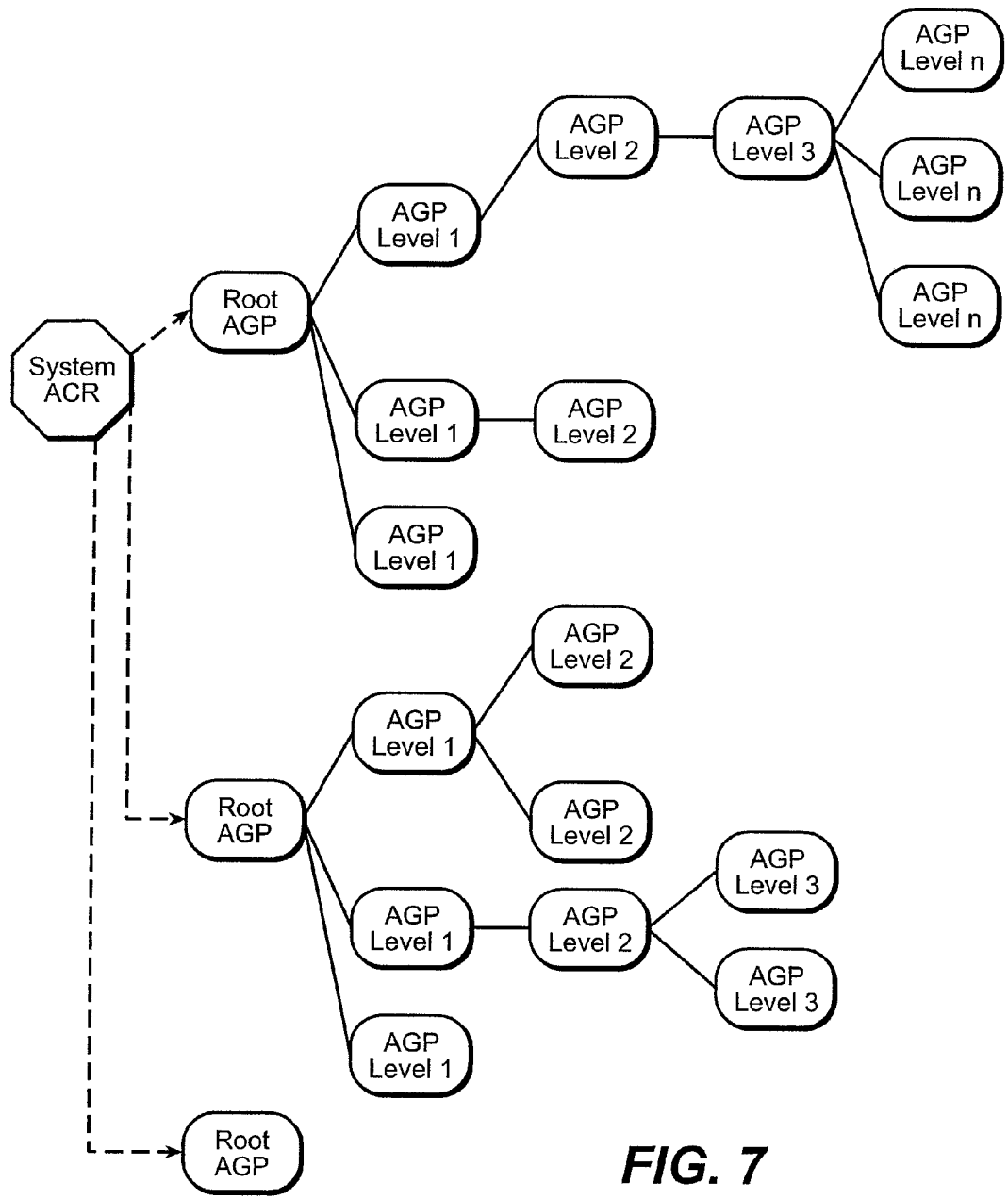
FIG. 7 is a schematic diagram of a tree illustrating three hierarchical trees of access controlled record groups to illustrate a process of formation of the trees.
Figure 8A:
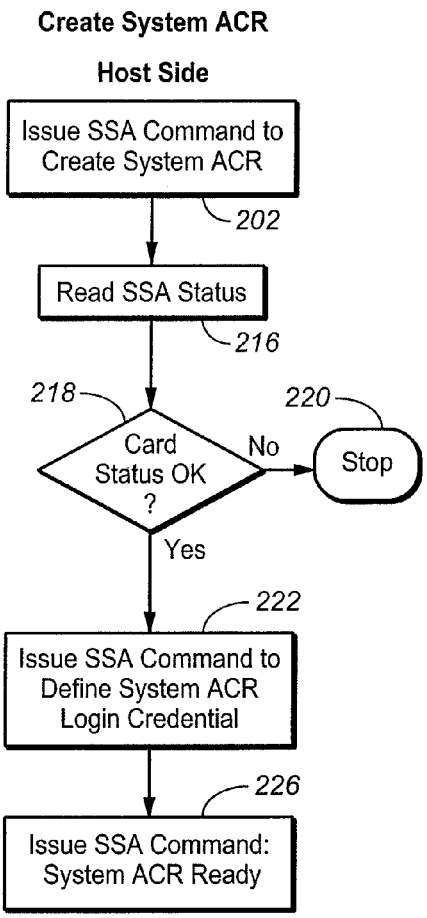
FIGS. 8A and 8B are flow charts illustrating the processes carried out by a host device and a memory device such as a memory card for creating and using a system access control record.
Figure 8B:
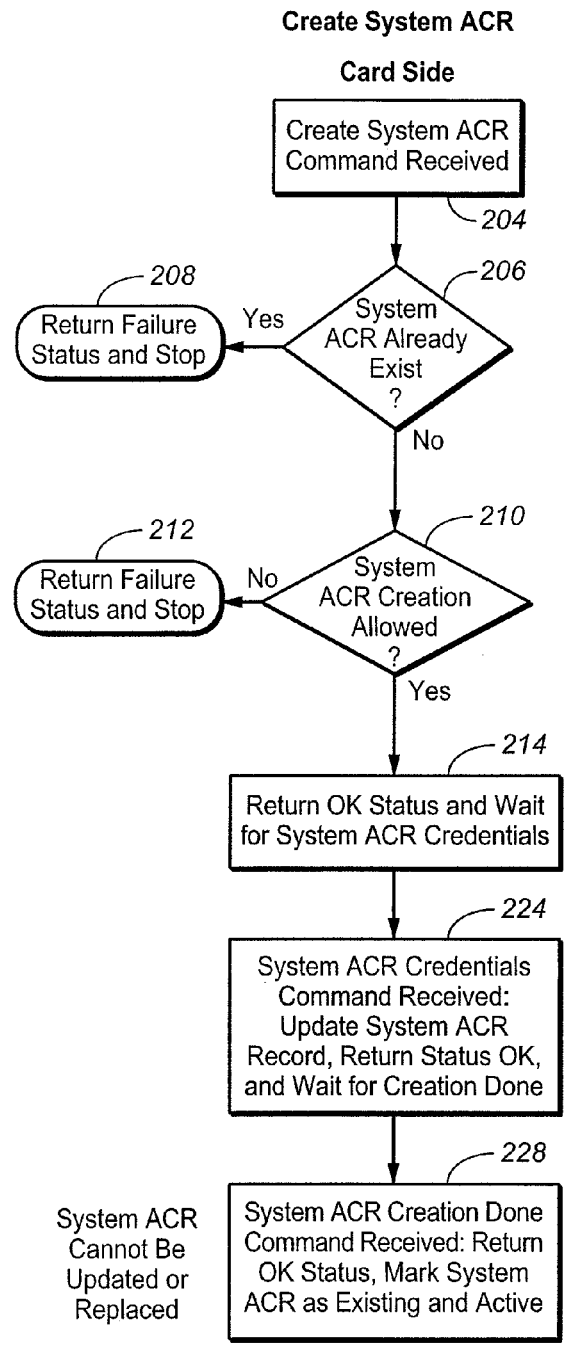

The System ACR creates the root ACR/AGP in the SSA. It has permission to add/change the root level until such time that the host is satisfied with it and blocks it. Blocking the root AGP essentially cuts off its connection to the system ACR and renders it temper proof. At this point no one can change/edit the root AGP and the ACRs within. This is done through an SSA command. Disabling creation of root AGPs has a permanent effect and cannot be reversed. The above features involving the system ACR are illustrated in FIG. 7. The system ACR is used to create three different root AGPs. At a certain time after these are created, the SSA command is sent from the host to block the root AGPs from the system ACR, thereby disabling the create-root-AGP feature, as indicated by the dotted lines connecting the System ACR to the root AGPs in FIG. 7. This renders the three root AGPs temper proof. The three root AGPs may be used to create children AGPs to form three separate trees, before or after the root AGPs are blocked.

The above described features provides great flexibility to the content owner in configuring secure products with content. Secure products need to be "Issued". Issuance is the process of putting identification keys by which the device can identify the host and vice versa. Identifying the device (e.g. flash card) enables the host to decide whether it can trust its secrets with it. On the other hand, identifying the host enables the device to enforce security policies (grant and execute a specific host command) only if the host is allowed to.

Products that are designed to serve multiple applications will have several identification keys. The product can be "pre-issued"—keys stored during manufacturing before shipping, or "post issued"—new keys are added after shipping. For post issuance, the memory device (e.g. memory card) needs to contain some kind of master or device level keys which are being used to identify entities which are allowed to add applications to the device.

The above described features enables a product to be configured to enable/disable post issuance. In addition, the post issuance configuration can be securely done after shipping. The device may be bought as a retail product with no keys on it in addition to the master or device level keys described above, and then be configured by the new owner to either enable further post issuance applications or disable them.

Thus, the system ACR feature provides the capability to accomplish the above objectives:

Memory devices with no system ACR will allow unlimited and uncontrolled addition of applications.

Memory devices without system ACR can be configured to disable the system ACR creation, which means there is no way to control adding of new applications (unless the feature of creating new root AGP is disabled as well)

Memory devices with system ACR will allow only controlled addition of applications via a secure channel to establish through an authentication procedure using the system ACR credential.

Memory devices with system ACR may be configured to disable the application adding feature, before or after applications have been added.

Key ID List

Key IDs are created per specific ACR request; however, in the memory system 10, they are used solely by the SSA system. When a key ID is created the following data is provided by or to the creating ACR:

1. Key ID. The ID is provided by the entity through the host and is used to reference the key and data that is encrypted or decrypted using the key in all further read or write accesses.

2. Key Cipher and data integrity Mode (the Blocked, Chained and Hashed Modes above and as explained below)

In addition to the host provided attributes, the following data is maintained by the SSA system:

1. Key ID Owner. The ID of the ACR that is the owner. When a key ID is created the creator ACR is its owner. Key ID ownership may, however, be transferred to another ACR. Preferably only the key ID owner is allowed to transfer ownership of, and delegate, a key ID. Delegating access permission to the associated key, and revoking these rights can be administered either by the key ID owner or any other ACR assigned with delegation permissions. Whenever an attempt is made to exercise any one of these operations, the SSA system will grant it only if the requesting ACR is authorized.

2. CEK. This is the CEK whose key value is used to cipher the content associated with or pointed to by the key ID. The key value may be a 128 bit AES random key generated by the SSA system.

3. MAC and IV values. Dynamic information (message authentication codes and initiation vectors) used in the Chained Block Cipher (CBC) encryption algorithms.

The various features of the SSA are also illustrated in reference to the flow charts in FIGS. 8A-16, where 'H' to the left of a step means the operation is performed by the host, and 'C' means the operation is performed by the card. While these SSA features are illustrated with reference to memory cards, it will be understood that these features apply as well to memory devices in other physical forms. In order to create a System ACR, the host issues to the SSA in the memory device 10 a command to create System ACR (block 202). The device 10 responds by checking whether a System ACR already exists (block 204, diamond 206). If it already exists, then device 10 returns failure and stops (oblong 208). If it does not, then memory 10 checks to see if System ACR creation is allowed (diamond 210), and returns a failure status if not allowed (block 212). Thus, there may be instances where the device issuer does not allow the creation of a System ACR, such as in the case where the security features needed have been predetermined so that no System ACR is needed. If this is allowed, the device 10 returns OK status and waits for System ACR credentials from the host (block 214). The host checks the SSA status and whether the device 10 has indicated that the creation of a System ACR is allowed (block 216 and diamond 218). If creation is not allowed or if a system ACR already exists, the host stops (oblong 220). If the device 10 has indicated that the creation of a System ACR is allowed, the host issues a SSA command to define its login credential and sends it to the device 10 (block 222). The device 10 updates a System ACR record with the credential received and returns OK status (block 224). In response to this status signal, the host issues SSA command indicating the system ACR is ready (block 226). The device 10 responds by locking the System ACR so that it cannot be updated or replaced (block 228). This locks in the features of the system ACR and its identity for identifying the device 10 to the host.

Figure 9:
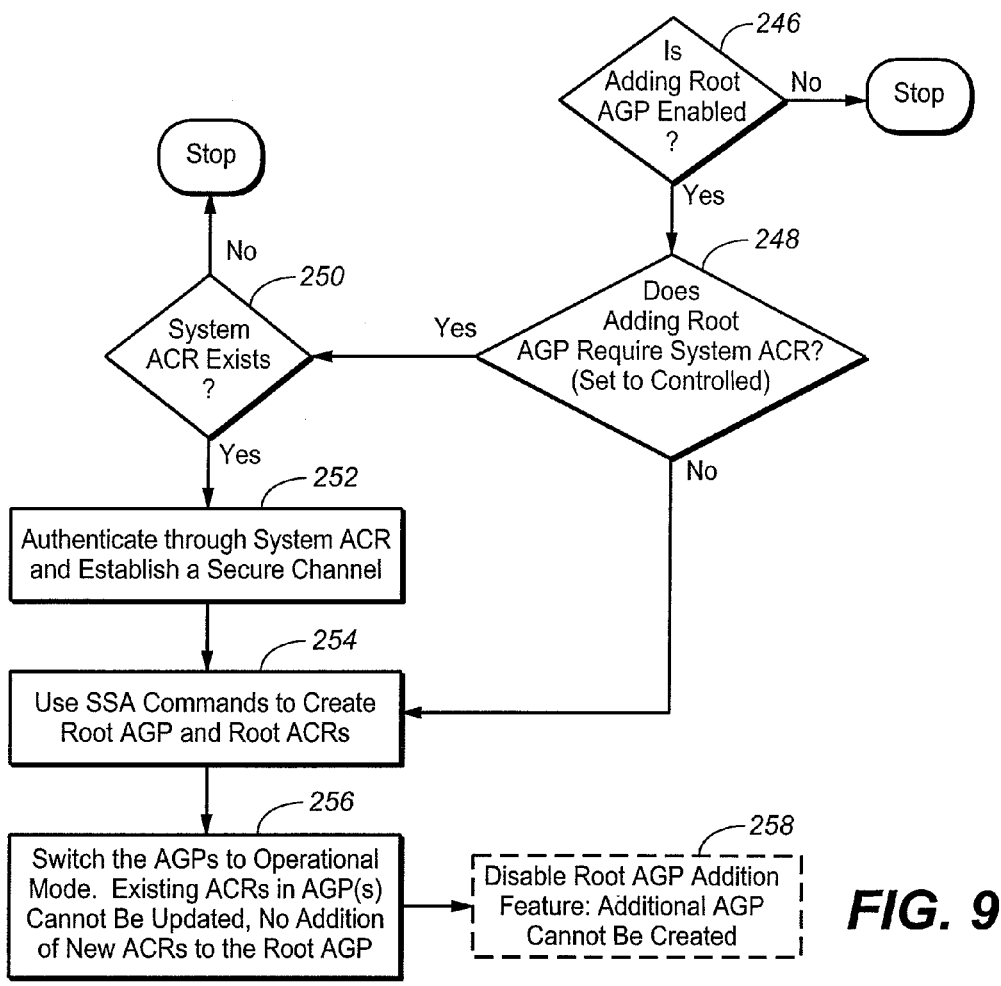
FIG. 9 is a flow chart illustrating a process using a system access control record to create an access controlled record group useful for illustrating different embodiments.

The procedure for creating new trees (New Root AGPs and ACR) is determined by the way these functions are configured in the device. FIG. 9 explains the procedures. Both the host 24 and the memory system 10 follow it. If adding new root AGP is disabled altogether, new root AGPs cannot be added (diamond 246). If it is enabled but a system ACR is needed, the host authenticates through the system ACR and establishes a secure channel (diamond 250, block 252) prior to issuing the Create Root_AGP command (block 254). If system ACR is not needed (diamond 248) the host 24 can issue the create root AGP command without authentication and proceed to block 254. If system ACR does exist, the host may use it even if it is not needed (not shown in the flow chart). The device (e.g. flash card) will reject any attempt to create a new root AGP if the function is disabled and it will reject an attempt to create a new root AGP without authentication, if system ACR is needed (diamonds 246 and 250). The newly created AGP and ACR in block 254, are now switched to Operational Mode so that the ACRs in such AGPs cannot be updated or otherwise changed, and no ACRs can be added to them (block 256). The system is then, optionally locked so that additional root AGPs cannot be created (block 258). The dotted line box 258 is a convention indicating that this step is an optional step. All the boxes in the flow charts of the figures of this application in dotted lines are optional steps. This allows the content owner to block the use of device 10 for other illicit purposes that may imitate a genuine memory device with legitimate content.

Figure 10:
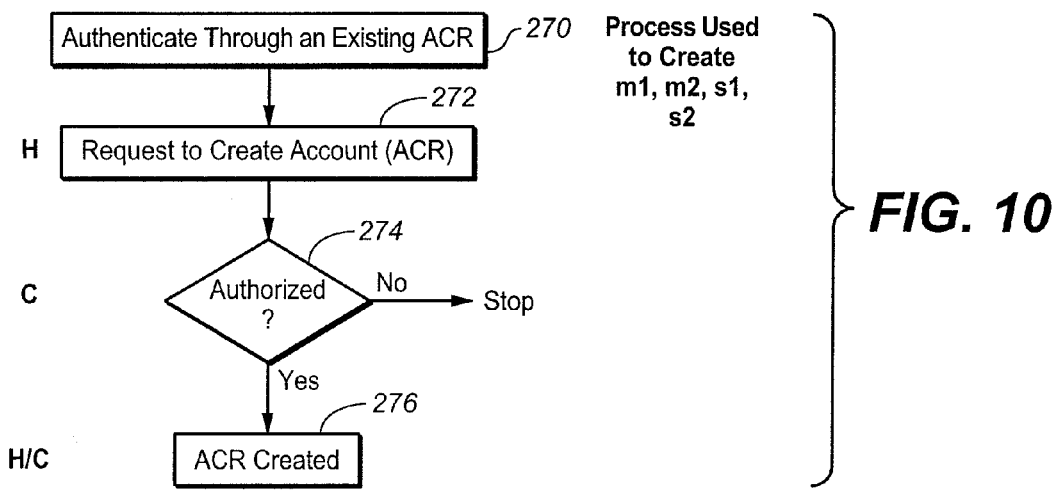
FIG. 10 is a flow chart illustrating a process for creating an access control record.

To create ACRs (other than the ACRs in the root AGP as described above), one may start with any ACR that has the right to create an ACR (block 270) as shown in FIG. 10. An entity may attempt to enter through the host 24 by providing the entry point ACR identity, and the ACR with all the necessary attributes that it wishes to create (block 272). The SSA checks for a match to the ACR identity and whether the ACR with such identity has the permission to create an ACR (diamond 274). If the request is verified to be authorized, the SSA in device 10 creates an ACR (block 276).

Figure 11:
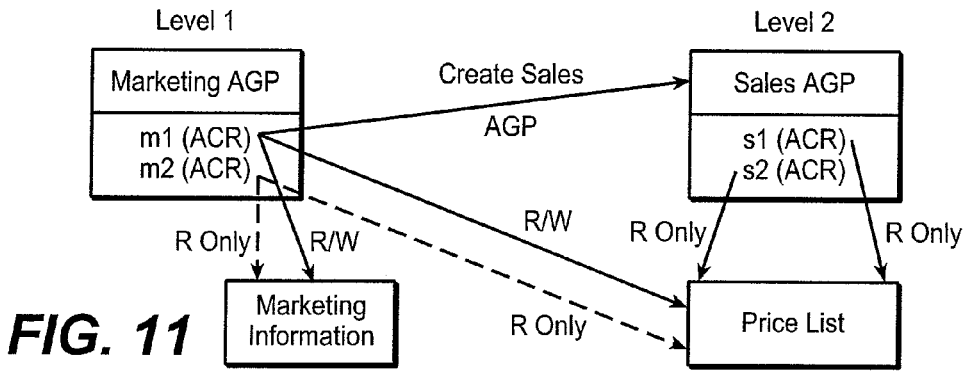
FIG. 11 is a schematic view of two access control record groups useful for illustrating a particular application of the hierarchical tree.

FIG. 11 shows two AGPs that illustrate a tree useful in security applications using the method of FIG. 10. Thus, the ACR with identity m1 in the marketing AGP has the permission to create an ACR. The ACR m1 also has the permission to use a key for reading and writing data associated with the key ID "Marketing Information" and data associated with the key ID "Price List". Using the method of FIG. 10, it creates the Sales AGP with two ACRs: s1 and s2 with only read permission to the key for accessing pricing data associated with the key ID "Price List", but not to the key necessary for accessing data associated with the key ID "Marketing Information". In this manner, the entities with the ACRs s1 and s2 can only read but not change the pricing data, and will have no access to marketing data. The ACR m2, on the other hand, has no permission to create ACRs, and has only read permission to the keys for accessing data associated with the key ID "Price List" and with the key ID "Marketing Information".

Figure 12:
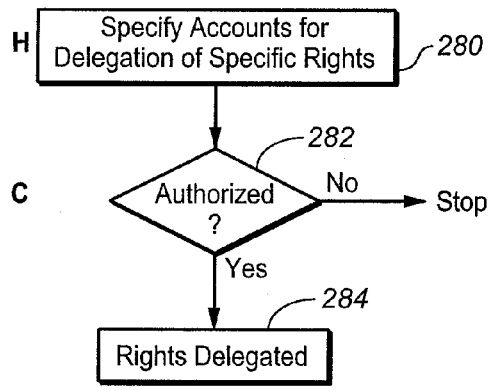
FIG. 12 is a flow chart illustrating a process for delegation of specific rights.
Figure 13:
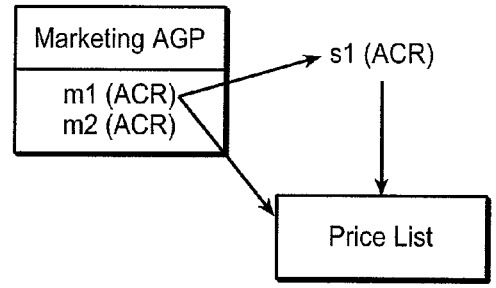
FIG. 13 is a schematic view of an access controlled record group and an access control record to illustrate the process of delegation of FIG. 12.

Thus, access rights may be delegated in the manner explained above where m1 delegates rights to read pricing data to s1 and s2. This is particularly useful where large marketing and sales groups are involved. Where there are but one or a few sales people, there may be no need to use the method of FIG. 10. Instead, the access rights may be delegated, by an ACR to one at a lower or the same level within the same AGP, as illustrated in FIG. 12. First, the entity enters the tree for such AGP by specifying an ACR in the manner described above in the tree through the host (block 280). Next the host will specify the ACR and the rights to delegate to. The SSA checks the tree(s) for such ACR and whether the ACR has the permission to delegate rights to the specified another ACR (diamond 282). If it does, the rights are delegated (block 284); if not it stops. The result is illustrated in FIG. 13. The ACR m1 in this case has the permission to delegate read permission to the ACR s1, so that s1 will be able to use a key to access pricing data after the delegation. This may be performed if m1 has the same or greater rights to access pricing data and the permission to so delegate. In one embodiment, m1 retains its access rights after the delegation. Preferably access rights may be delegated under restricted conditions (rather then permanently) such as for a limited time, limited number of accesses, etc.

Figure 14:
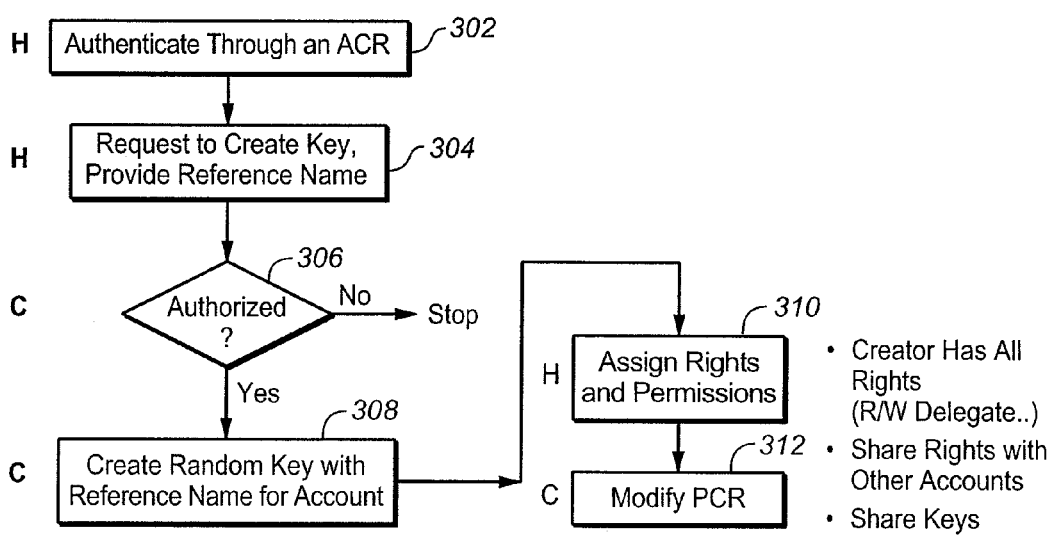
FIG. 14 is a flowchart illustrating the process for creating a key for the purpose of encryption and/or decryption.

The process for creating a key and key ID is illustrated in FIG. 14. The entity authenticates through an ACR (block 302). The entity requests the creation of a key with an ID specified by the host (block 304). The SSA checks and see if the ACR specified has the permission to do so (diamond 306). For example, if the key is to be used for accessing data in a particular partition, the SSA will check and see if the ACR may access such partition. If the ACR is authorized, then the memory device 10 creates a key value associated with the key ID provided by the host (block 308), ands stores the key ID in the ACR, and the key value in its memory (either in the controller-associated memory or memory 20) and assigns rights and permissions according to information supplied by the entity (block 310) and modifies the PCR of such ACR with such assigned rights and permissions (block 312). Thus, the creator of the key has all available rights, such as read and write permissions, right to delegate and share with other ACRs in the same AGP or an ACR at a lower level, and the right to transfer ownership of the key.

Figure 15:
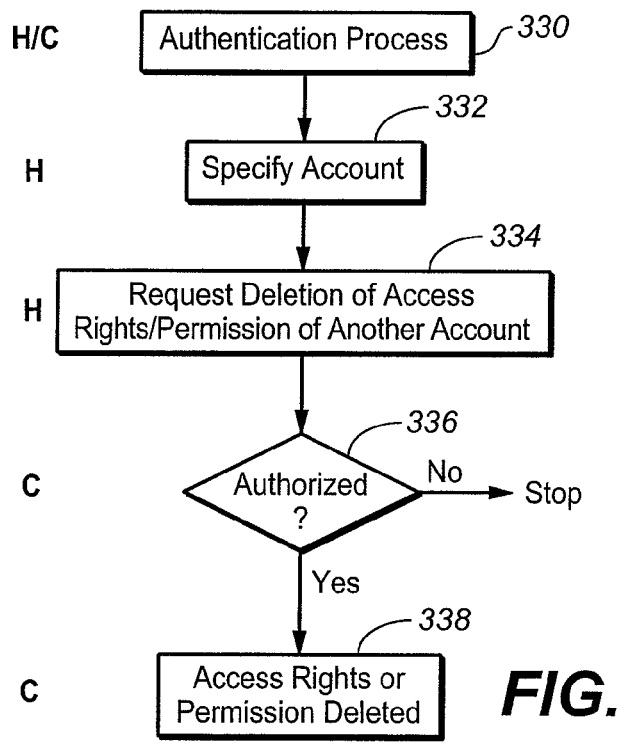
FIG. 15 is a flow chart illustrating a process for removing access rights and/or permission for data access according to an accessed controlled record.

An ACR can change the permissions (or the existence altogether) of another ACR in the SSA system as illustrated in FIG. 15. An entity may enter a tree through an ACR as before; in one case the entity is authenticated and then it specifies an ACR (blocks 330, 332). It requests the deletion of a target ACR or the permission in a target ACR (block 334). If the ACR specified or the one active at such time has the right to do so (diamond 336), the target ACR is deleted, or the PCR of the target ACR is altered to delete such permission (block 338). If this is not authorized the system stops.

Figure 16:
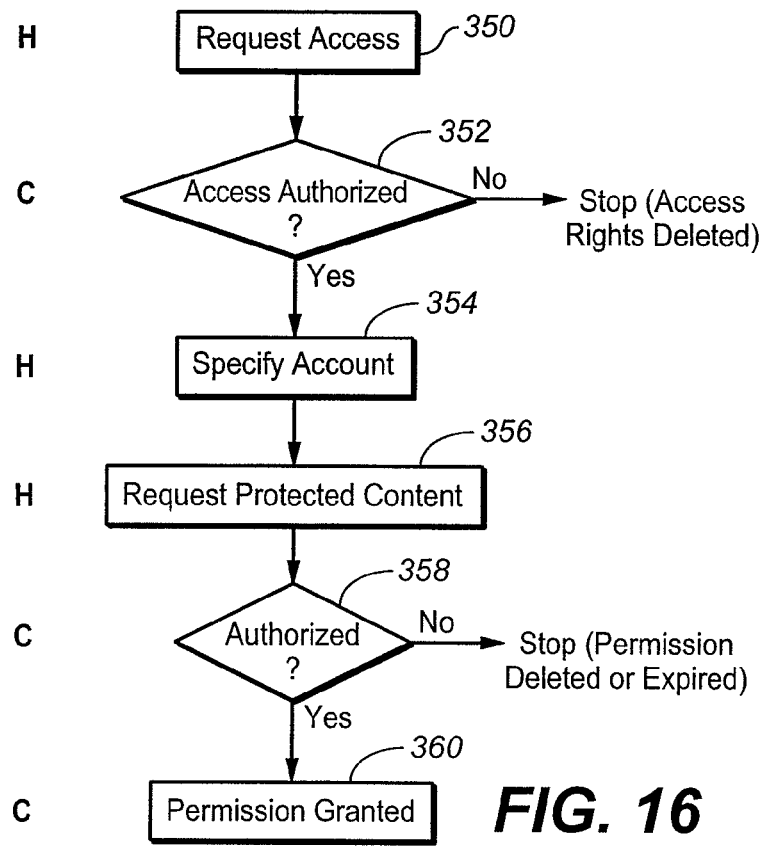
FIG. 16 is a flow chart illustrating a process for requesting access when access rights and/or permission to access has been deleted or has expired.

After the above described process, the target will no longer be able to access the data it was able to prior to the process. As shown in FIG. 16, an entity may attempt to enter at the target ACR (block 350) and finds that the authentication process fails, since the previously existing ACR ID is no longer present in the SSA, so that access rights are denied (diamond 352). Assuming that the ACR ID has not been deleted, the entity specifies an ACR (block 354) and the key ID and/or data in a particular partition (block 356), and the SSA then checks to see the key ID or partition access request is permitted according to the PCR of such ACR (diamond 358). If the permission has been deleted or has expired, then the request is again denied. Otherwise, the request is granted (block 360).

The above process describes how access to protected data is managed by the device (e.g. flash card), regardless of whether the ACR and its PCR were just changed by another ACR or were so configured to begin with.

Sessions

The SSA system is designed to handle multiple users, logged in concurrently. When this feature is used, every command received by the SSA is associated with a specific entity and executed only if the ACR, used to authenticate this entity, has the permissions for the requested action.

Multiple entities are supported through the session concept. A session is established during the authentication process and assigned a session-id by the SSA system. The session-id is internally associated with the ACR used for logging into the system and is exported to the entity to be used in all further SSA commands.

The SSA system supports two types of sessions: Open, and Secure sessions. The session type associated with a specific authentication process is defined in the ACR. The SSA system will enforce session establishment in a way similar to the way it enforces the authentication itself. Since the ACR defines the entity permissions, this mechanism enables system designers to associate secure tunneling either with accessing specific key IDs or invoking specific ACR management operations (i.e. creating new ACRs and setting credentials)

Open Session

Open session is a session identified with a session-id but without bus encryption, all commands and data are passed in the clear. This mode of operation is preferably used in a multi-user or multi-entity environment where the entities are not part of the threat model, nor is eavesdropping on the bus.

Although not protecting the transmission of the data nor enabling efficient fire-walling between the applications on the host side, the Open session mode enables the SSA system to allow access only to the information allowed for the currently authenticated ACRs.

The Open session can also be used for cases where a partition or a key needs to be protected. However, after a valid authentication process, access is granted to all entities on the host. The only thing the various host applications need to share, in order to get the permissions of the authenticated ACR is the session-id. This is illustrated in FIG. 17A. The steps above the line 400 are those taken by the host 24. After an entity is authenticated (block 402) for ACR1, it requests access to a file associated with a key ID X in the memory device 10 (blocks 404, 406 and 408). If the PCR of the ACR 1 allows such access, device 10 grants the request (diamond 410). If not, the system returns to block 402. After authentication is completed, the memory system 10 identifies the entity issuing a command only by the assigned session id (and not the ACR credentials). Once the ACR 1 gains access to the data associated with the key IDs in its PCR, in an open session, any other application or user can access the same data by specifying the correct session ID which is shared between the different applications on the host 24. This feature is advantageous in applications where it is more convenient to the user to be able to log in only once, and be able to access all the data tied to the account through which the log in is performed for different applications. Thus, a cellular phone user may be able to access stored emails, and listen to stored music in memory 20 without having to log in multiple times. On the other hand, data not encompassed by the ACR1 will not be accessible. Thus, the same cellular phone user may have valuable content such as games and photographs accessible through a separate account ACR2. This is data that he does not wish others who borrow his phone to access, even though he may not mind others accessing data available through his first account ACR1. Separating access to the data into two separate accounts while allowing access to ACR1 in open session provides ease of use as well as affording protection of valuable data.

To even further ease the process of sharing the session-id amongst the host applications, when an ACR is requesting an Open session it can specifically request that the session will be assigned the "0 (zero)" id. This way, applications can be designed to use a pre-defined session-id. The only restriction is, for obvious reasons, that only one ACR, requesting session 0, can be authenticated at a specific time. An attempt to authenticate another ACR requesting session 0, will be rejected.

Secure Session

Figure 17B:
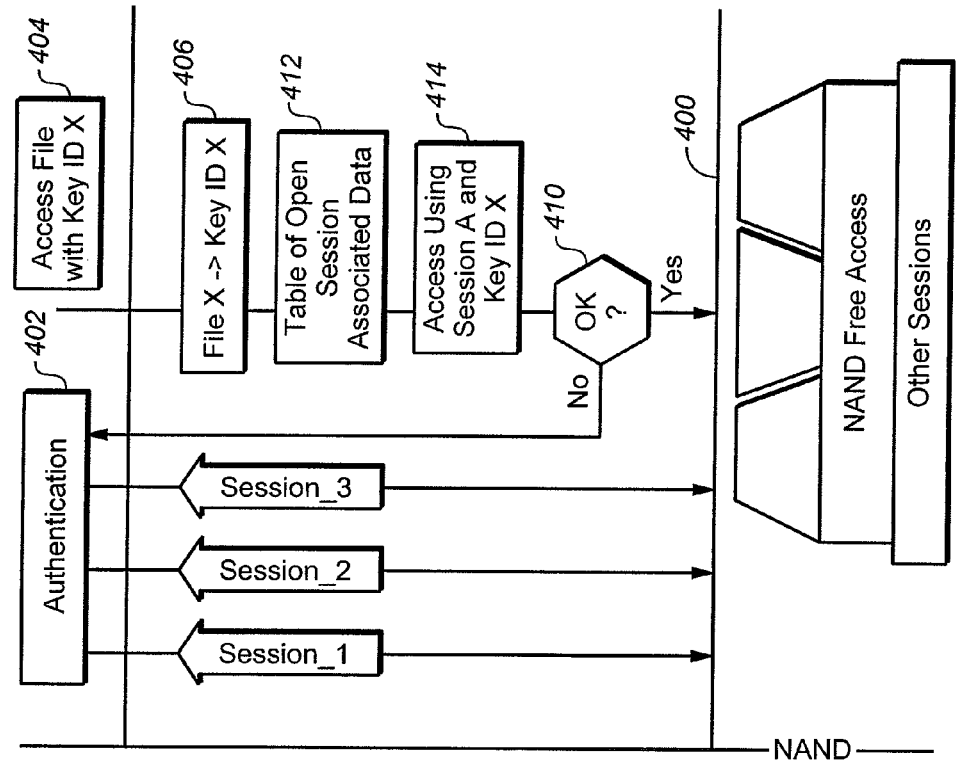
FIGS. 17A and 17B are schematic views illustrating an organization of a rule structure for authentication and policies for granting access to cryptographic keys useful for illustrating different embodiments of the invention.
Figure 17A:
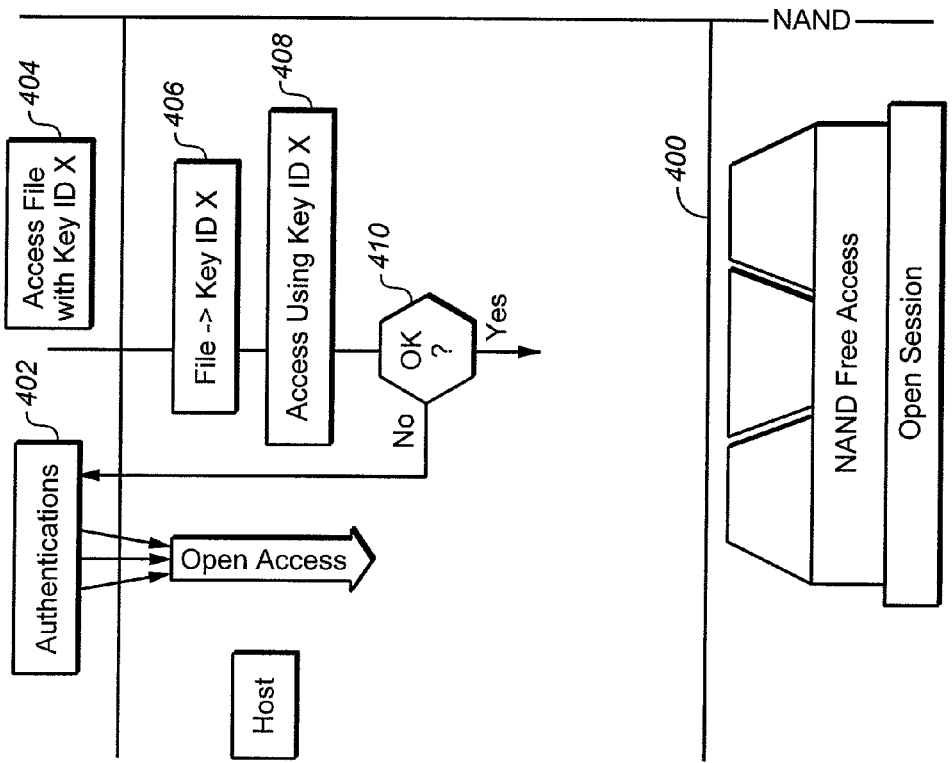

To add a layer of security, the session id may be used as shown in FIG. 17B. The memory 10 then also stores the session ids of the active sessions. In FIG. 17B, for example, in order to be able to access a file associated with key ID X, the entity will need to also provide a session id, such as session id "A" before it is allowed to access the file (blocks 404, 406, 412 and 414). In this manner, unless the requesting entity is aware of the correct session id, it cannot access the memory 10. Since the session id is deleted after the session is over and will be different for each session, an entity can gain access only when it has been able to provide the session number.

The SSA system tracks whether a command is really coming from the correct authenticated entity by using the session number. For applications and use cases where there is a threat that attackers will try to use an open channel to send malicious commands, the host application uses a secure session (a secure channel).

When using a secure channel, the session-id, as well as the entire command, is encrypted with the secure channel encryption (session) key and the security level is as high as the host side implementation.

Terminating a Session

A session is terminated and, the ACR is logged off, in any one of the following scenarios:

1. The entity issues an explicit end-session command.
2. Time out on communication. A specific entity issued no command for a time period defined as one of the ACR parameters.
3. All open sessions are terminated after device (e.g. flash card) reset and/or power cycle.

Data Integrity Services

The SSA system verifies the integrity of the SSA database (which contains all the ACRs, PCRs, etc. . . . ). In addition data integrity services are offered for entity data through the key ID mechanism.

If a key ID is configured with Hashed as its encryption algorithms the hash values are stored along side with the CEK and IV in the CEK record. Hash values are calculated and stored during write operation. Hash values are again calculated during read operations and compared with the values stored during the previous write operations. Every time the entity is accessing the key ID the additional data is concatenated (cryptographically) to the old data and the appropriate Hash value (for read or for write) updated.

Since only the host knows the data files associated with or pointed to by a key ID, the host explicitly manages several aspects of the data integrity function in the following manner:

1. A data file associated with or pointed to by a key ID is written or read from the beginning to end. Any attempt to access portions of the file will mess it up since the SSA system is using a CBC encryption method and generates a hashed message digest of the entire data
2. There is no need to process the data in a contiguous stream (the data stream can be interleaved with data streams of other key Ids and may be split over multiple sessions) since intermediate Hash values are maintained by the SSA system. However, the entity will need to explicitly instruct the SSA system to reset the Hash values if the data stream is restarted.
3. When a read operation is completed, the host explicitly requests the SSA system to validate the read Hash by comparing it with the Hash value calculated during the write operation.
4. The SSA system provides a "dummy read" operation as well. This feature will stream the data through the encryption engines but will not send it out to the host. This feature can be used to verify data integrity before it is actually read out of the device (e.g. flash card).

Random Number Generation

The SSA system will enable external entities to make use of the internal random number generator and request random numbers to be used outside of the SSA system. This service is available to any host and does not need authentication.

RSA Key Pair Generation

The SSA system will enable external users to make use of the internal RSA key pair generation feature and request a key pair to be used outside of the SSA system. This service is available to any host and does not need authentication.

Alternative Embodiment

Figure 18:
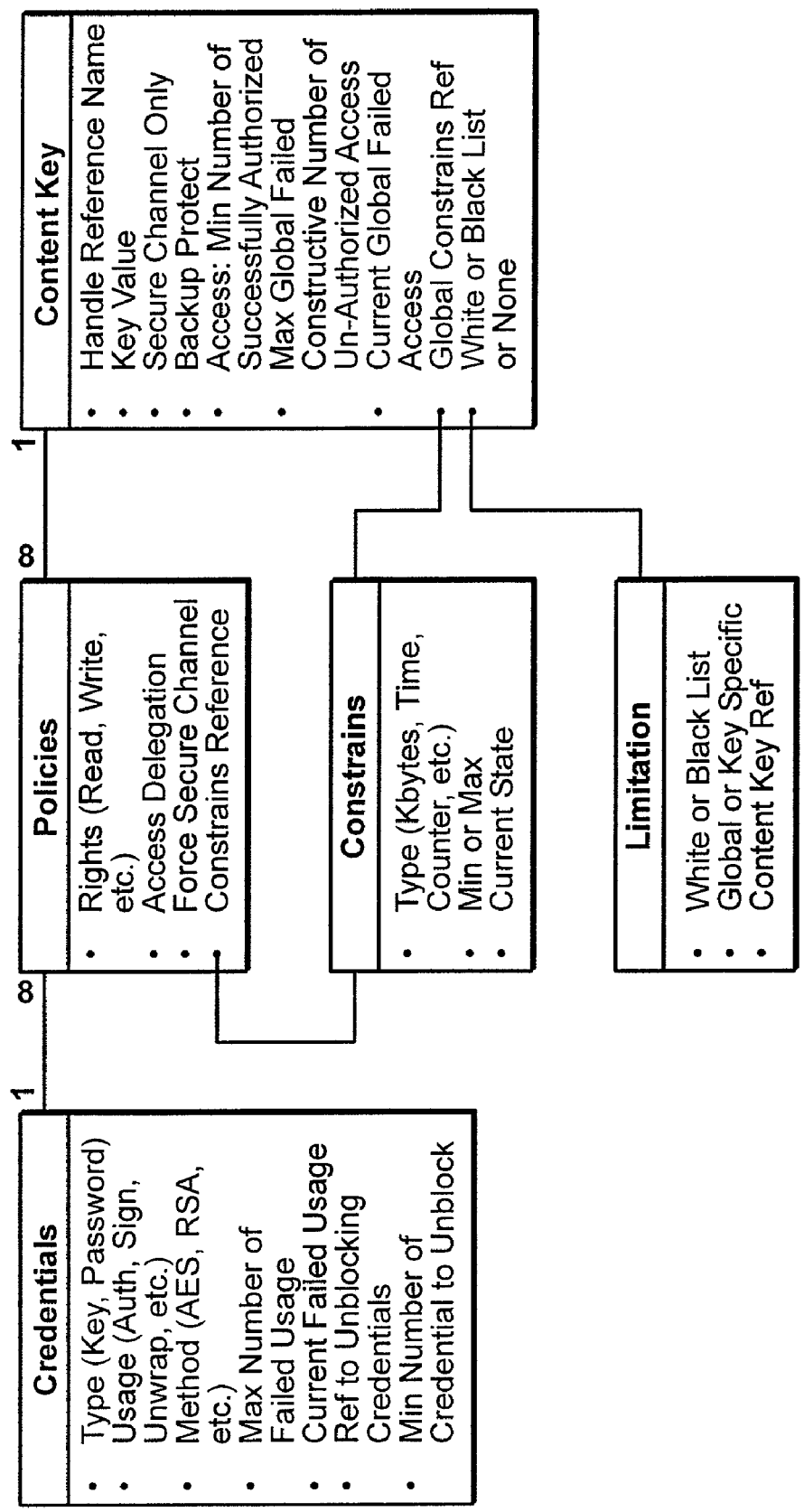
FIG. 18 is a block diagram of a database structure illustrating an alternative method for controlling access to protected information according to policies.

Instead of using a hierarchical approach, similar results can be achieved using a data base approach, as illustrated in FIG. 18.

As shown in FIG. 18, a list of credentials for entities, authentication methods, the maximum number of failed attempts, and the minimum number of credentials needed to unblock may be entered into a database stored in controller 12 or memory 20, which relates such credential requirements to the policies (read, write access to keys and partitions, secure channel requirement) in the database carried out by the controller 12 of memory 10. Also stored in the database are constraints and limitations to the access to keys and partitions. Thus, some entities (e.g. system administrator) may be on a white list, which means that these entities can access all keys and partitions. Other entities may be on a black list, and their attempts to access any information will be blocked. The limitation can be global, or key and/or partition specific. This means that only certain entities can access certain specific keys and partitions, and certain entities cannot do so. Constraints can also be put on the content itself, irrespective of the partition it is in or the key used to encrypt or decrypt it. Thus, certain data (e.g. songs) may have the attribute that they can only be accessed by the first five host devices that access them, or that other data (e.g. movies) can only be read for a limited number of times, irrespective of which entities had access.

Authentication

Password Protection

Password-protect means that a password needs to be presented to access the protected area. Unless it cannot be more than one password then passwords could be associated with different rights such as read access or read/write access.

Password protect means that the device (e.g. flash card) is able to verify a password provided by the host i.e. the device also has the password stored in device managed secured memory area.

Issues and limitations

Passwords are subject to replay attack. Because the password does not change after each presentation it can be identically resent. It means that password as is should not be used if the data to be protected are valuable, and the communication bus is easily accessible.

Password could protect access to stored data but should NOT be used to protect data (not a key)

To increase the security level associated with passwords, they can be diversified using a master key, with the result that hacking one does not crack entire system. A session key based secure communication channel can be use to send the password.

Figure 19:
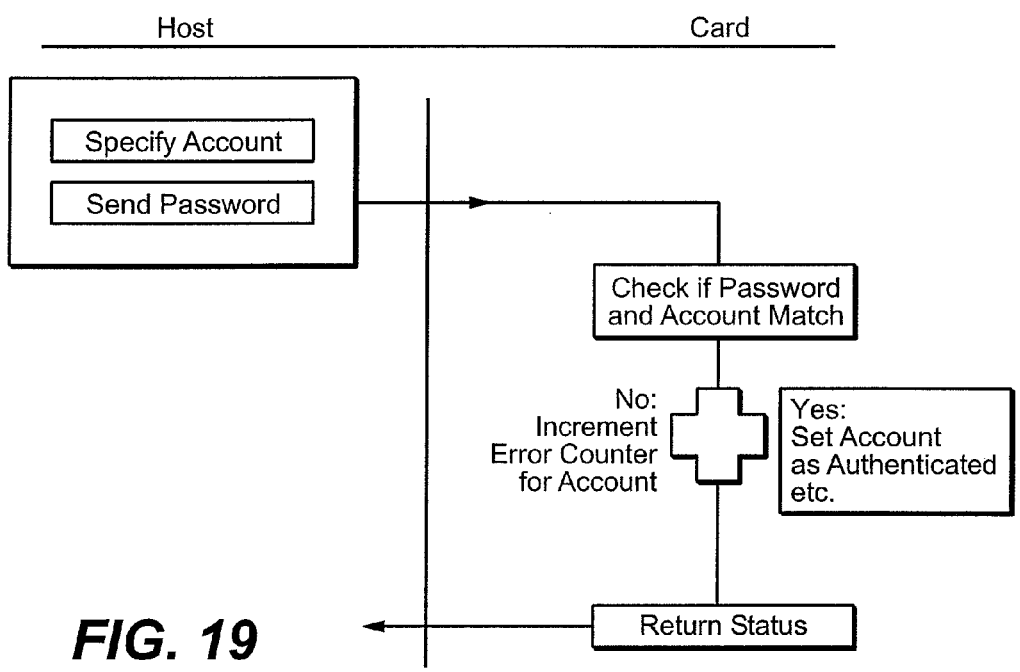
FIG. 19 is a flow chart illustrating an authentication processes using passwords.

FIG. 19 is a flow chart illustrating authentication using a password. The entity sends in an account id and password to system 10 (e.g. flash memory card). The system checks to see if the password matches that in its memory. If it matches, authenticated status is returned. Otherwise, the error counter is incremented for that account, and the entity is asked to re-enter an account id and password. If the counter overflows, the system return status that access is denied.

Symmetric Key

Symmetric key algorithm means that the SAME key is used on both sides to encrypt and decrypt. It means that the key has been pre-agreed prior to communicating. Also each side should implement the reverse algorithm of each other i.e. encrypt algorithm on one side and decrypt on the other. Both sides do not need to implement both algorithms to communicate.

Authentication

Symmetric key authentication means that device (e.g. flash card) and host share the same key and have the same cryptographic algorithm (direct and reverse e.g. DES and DES-1).

Symmetric key authentication means challenge-response (protect against replay attack). The protected device generates a challenge for the other device and both compute the response. The authenticating device sends back the response and the protected device check the response and validate authentication accordingly. Then rights associated with authentication can be granted.

Authentication could be:

External: the device (e.g. flash card) authenticates the outside world i.e. the device validates credentials of a given host or application Mutual: a challenge is generated on both sides Internal: the host application authenticates the device (e.g. flash card) i.e. host checks if device is genuine for its application.

To increase the security level of the entire system (i.e. breaking one does not break all)

Symmetric key are usually combined with diversification using a master key

Mutual authentication uses challenge from both side to ensure challenge is a real challenge Encryption Symmetric key cryptography is also used for encryption because it is a very efficient algorithm i.e. it does not need a powerful CPU to handle cryptography.

When used to secure a communication channel:

Both devices have to know the session key used to secure the channel (i.e. encrypt all outgoing data and decrypt all incoming data). This session key is usually established using a pre-shared secret symmetric key or using PKI.

Both devices have to know and implement the same cryptographic algorithms

Signature

Symmetric key can also be used to sign data. In that case the signature is a partial result of the encryption. Keeping the result partial allows to sign as many time as needed without exposing the key value.

Issues and Limitations

Symmetric algorithms are very efficient and secure but they are based on a pre-shared secret. The issue is securely share this secret in a dynamic manner and possibly to have it random (like a session key). The idea is that a shared secret is hard to keep safe in a long term and is almost impossible to share with multiple people.

To facilitate this operation, public key algorithm has been invented as it allows the exchange of secrets without sharing them.

Asymmetric Authentication Procedure

Asymmetric key based authentication uses a series of data passing commands that eventually construct the session key for the secure channel communication. The basic protocol authenticates the user to the SSA system. Protocol variations allow for mutual authentication, where the user gets to verify the ACR that he wishes to use, and two-factor authentication.

The asymmetric authentication protocols of the SSA preferably uses Public Key Infrastructure (PKI) and RSA algorithms. As defined by these algorithms, each party in the authentication process is allowed to create its own RSA key pair. Each pair consists of public and private keys. Since the keys are anonymous they cannot provide proof of identity. The PKI layer calls for a third, trusted, party which signs each one of the public keys. The public key of the trusted party is pre-shared between the parties which are to authenticate each other and is being used to verify the public keys of the parties. Once trust is established (both parties determined that the public key provided by the other party can be trusted) the protocol continues to authentication (verifying that each party holds the matching private key) and key exchange. This can be done through the challenge response mechanism illustrated in FIGS. 22 and 23 described below.

The structure containing the signed public key is referred to as a Certificate. The trusted party that signed the certificates is referred to as Certificate Authority (CA). In order for a party to be authenticated it has an RSA key pair and a Certificate attesting to the authenticity of the public key. The Certificate is signed by a Certificate Authority which is trusted by the other (the authenticating) party. The authenticating party is expected to have in its possession the public key of its trusted CA.

Figure 23:
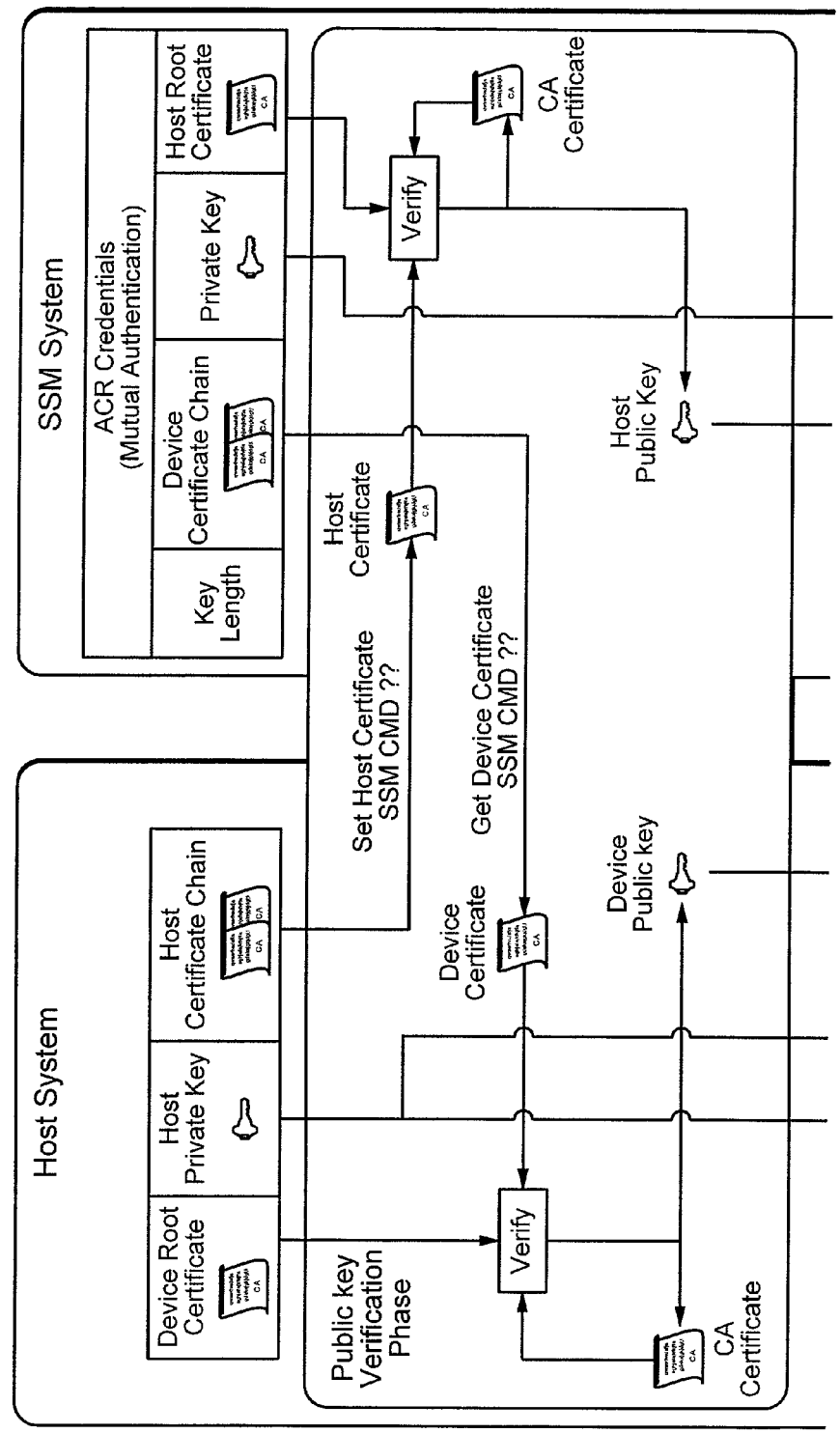
Figure 23B:
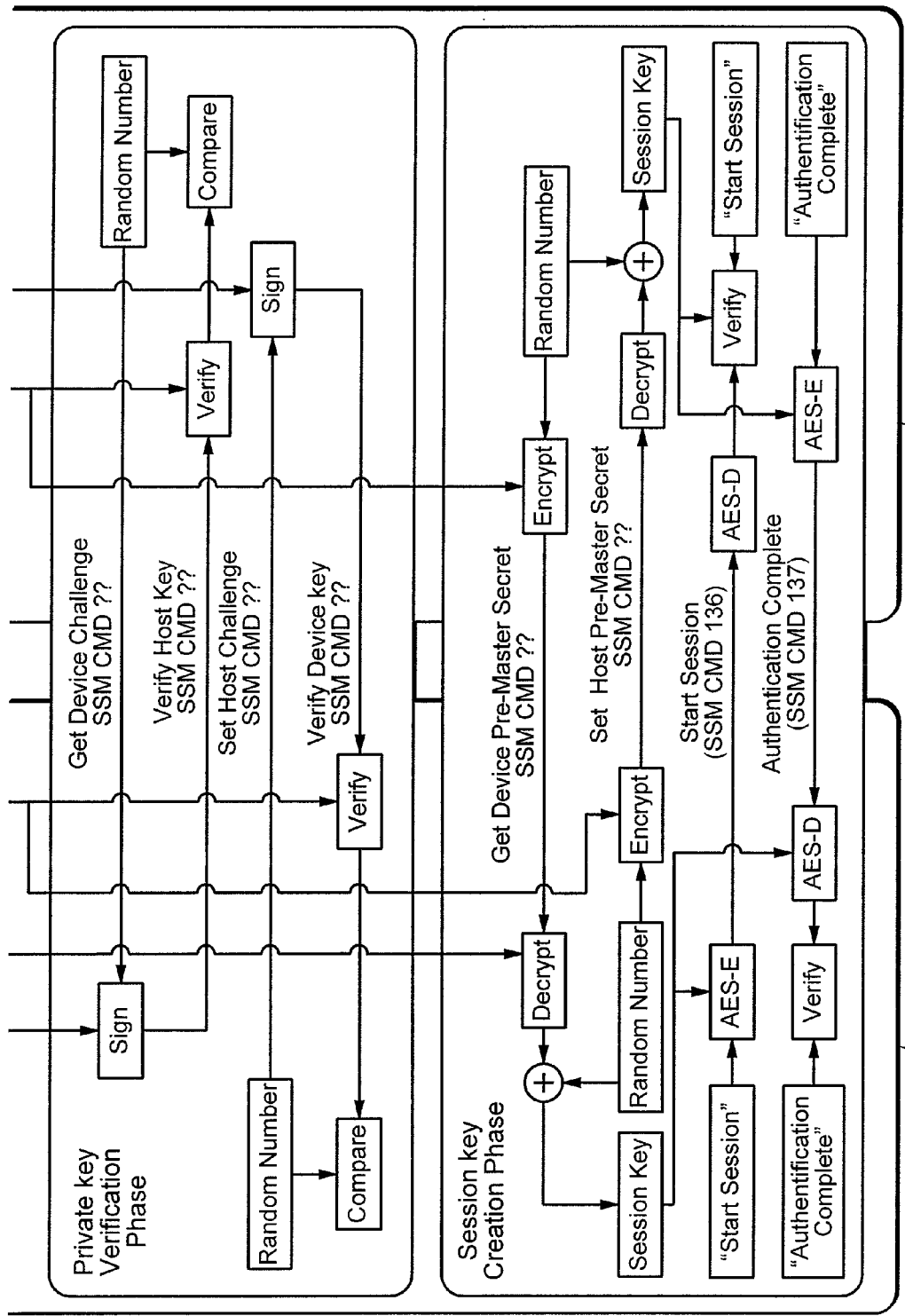

The SSA allows for certificate chaining. This means that the public key of the party being identified may be signed by a different—from the one trusted by the identifying party—CA. In this case the identified party will provide, in addition to its own certificate, the certificate of the CA which signed its public key. If this second level Certificate is still not trusted by the other party (not signed by its trusted CA), a third level certificate can be provided. In this Certificate chaining algorithm, each party will possess the complete list of certificates needed to authenticate its public key. This is illustrated in FIGS. 23 and 24. The credentials, needed for mutual authentication by this type of ACR are RSA key pairs in the selected length.

SSA Certificates

SSA employs [X.509] version 3 digital certificates. [X.509] is a general purpose standard; the SSA certificate profile, described here, further specifies and restrict the contents of the certificate's defined fields. The certificate profile also defines the hierarchy of trust defined for the management of certificate chain, the validation of SSA certificates and the Certificate Revocation List (CRL) profile.

The certificate is considered public information (as the public key inside) and therefore is not encrypted. However, it includes an RSA signature which verifies that the public key, as well as all other information fields, were not tampered with.

[X.509] defines that each field is formatted using ASN.1 standard which, in turn, uses DER format for data encoding.

SSA Certificate Overview

Figure 20:
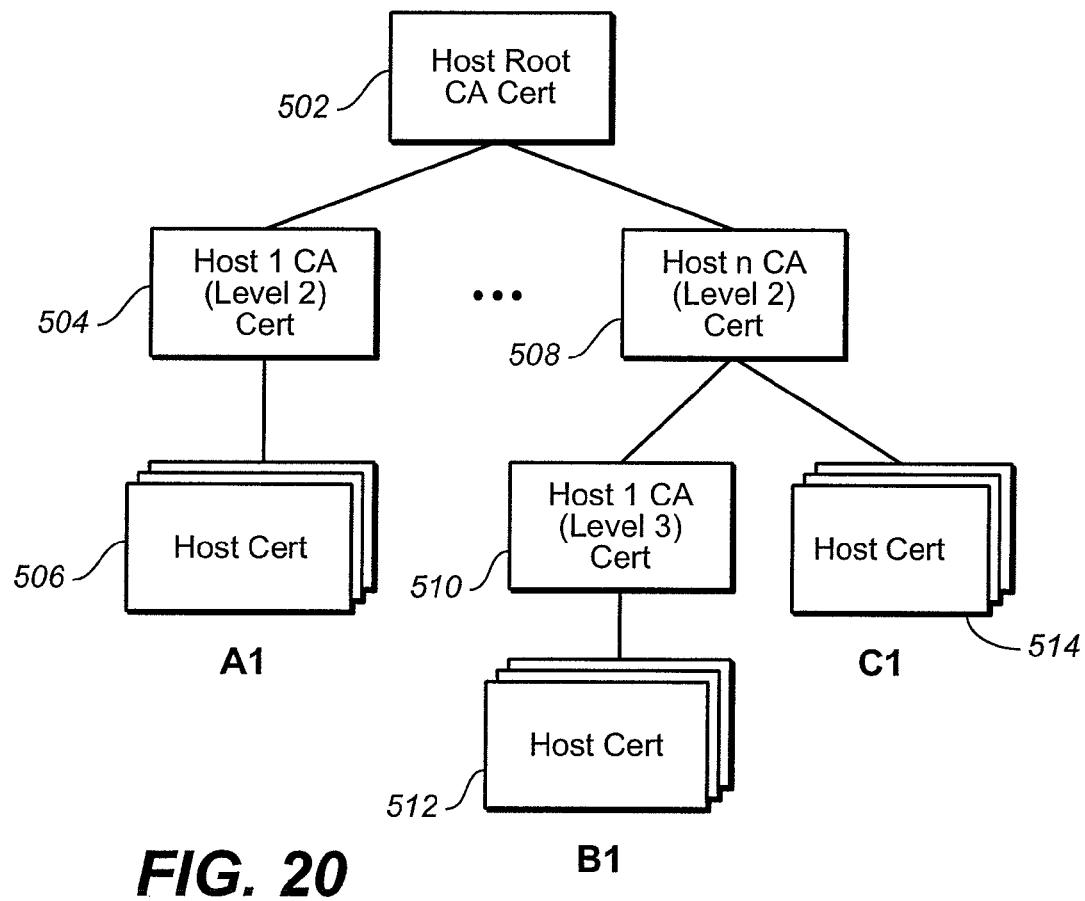
FIG. 20 is a diagram illustrating a number of host certificate chains.
Figure 21:
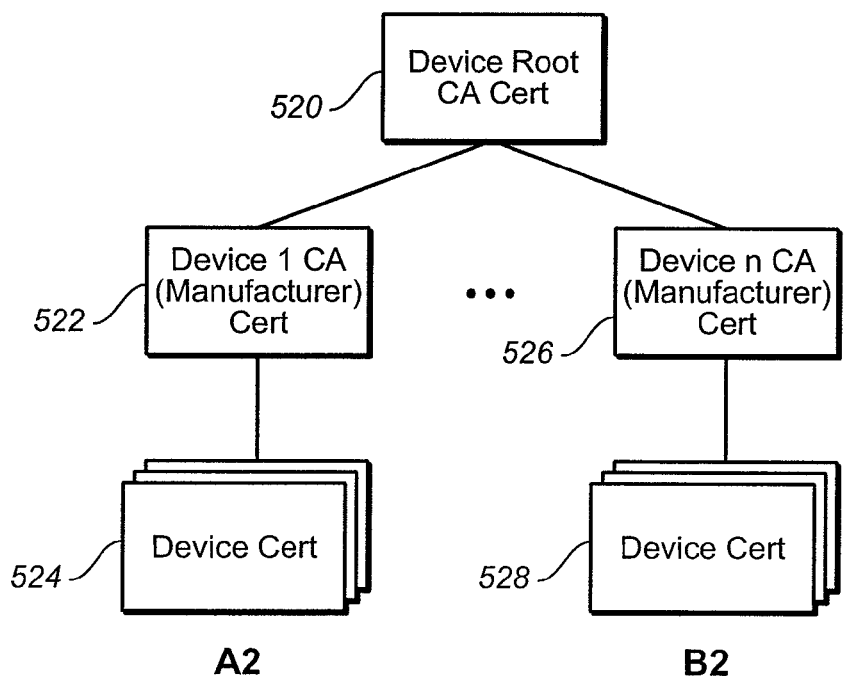
FIG. 21 is a diagram illustrating a number of device certificate chains.

One embodiment of the SSA certificate management architecture, depicted in FIG. 20 and FIG. 21, consists of unlimited levels of hierarchy for the host and up to three-level hierarchy for the device, although a larger or fewer number of levels of hierarchy than three may be used for the device.

Host certificate Hierarchy

The device authenticates hosts based on two factors: the root CA certificate stored in the device (as an ACR credential, stored on creation of the ACR) and the certificate/certificate chain supplied by the entity trying to access the device (for that specific ACR).

For each ACR the Host Certificate Authority serves as the root CA (this is the certificate residing in the ACR credentials). For example: for one ACR the root CA could be "Host 1 CA (level 2) cert" and for another ACR it could be "Host Root CA cert". For each ACR, every entity which holds a certificate (or a certificate chain which connects the root CA to the end-entity certificate) signed by the root CA can login into that ACR provided it has the corresponding private key for the end-entity certificate. As mentioned above, certificates are public knowledge, and are not kept secret.

The fact that all certificate holders (and the corresponding private key) issued by the root CA can login into that ACR means that authentication to a specific ACR is determined by the issuer of the root CA stored in the ACR credential. Put in other words, the issuer of the root CA can be the entity managing the authentication scheme of the ACR.

Host Root Certificate

The Root Certificate is the trusted CA Certificate the SSA is using to start verifying the public key of the entity attempting to log-in (host). This certificate is provided when the ACR is created as part of the ACR credentials. It is the root of trust for the PKI system and, therefore, it is assumed to be provided by a trusted entity (either a father ACR or manufacturing/configuration trusted environment). The SSA verifies this certificate using its public key to verify the certificate signature. The host root certificate is stored encrypted in a non-volatile memory (not shown in FIG. 1) with secret keys of the device preferably accessible only by the CPU 12 of FIG. 1 of system 10.

Host Certificate Chain

These are the certificates provided to the SSA during authentication. No recollection of the Host certificate chain should be stored in the device after the processing of the chain is completed.

FIG. 20 is a schematic view of a host certificate level hierarchy illustrating a number of different host certificate chains. As illustrated in FIG. 20, the host certificate may have many different certificate chains, where only three are illustrated:

A1. Host root CA certificate 502, host 1 CA (level 2) certificate 504 and host certificate 506;

B1. Host root CA certificate 502, host n CA (level 2) certificate 508, host 1 CA (level 3) certificate 510, host certificate 512;

C1. Host root CA certificate 502, host n CA (level 2) certificate 508 and host certificate 514.

The three certificate chains A1, B1 and C1 above illustrate three possible host certificate chains that may be used to prove that the public key of the host is genuine. In reference to the certificate chain A1 above and in FIG. 20, the public key in the host 1 CA (level 2) certificate 504 is signed (i.e. by encrypting a digest of the public key) by the private key of the host root CA, whose public key is in the Host root CA certificate 502. The host public key in the host certificate 506 is in turn signed by the private key of the host 1 CA (level 2), whose public key is provided in the host 1 CA (level 2) certificate 504. Hence, an entity that has the public key of the Host root CA will be able to verify the authenticity of the certificate chain A1 above. As the first step, the entity uses the public key of the Host root CA in its possession to decrypt the signed public key in host 1 CA (level 2) certificate 504 sent to it by the host and compare the decrypted signed public key with the digest of the unsigned public key in the host 1 CA (level 2) certificate 504 sent by the host. If the two match, the public key of the host 1 CA (level 2) is authenticated, and the entity will then use the authenticated public key of the host 1 CA (level 2) to decrypt the public key of the host signed by the private key of the host 1 CA (level 2) in the host certificate 506 sent by the host. If this decrypted signed value matches that of the digest of the public key in the host certificate 506 sent by the host, the public key of the host is then also authenticated. The certificate chains B1 and C1 may be used for authentication in a similar manner.

As will be noted from the above process involving chain A1, the first public key from the host that needs to be verified by the entity is the one in host 1 CA (level 2), and not the host root CA certificate. Therefore, all the host needs to send to the entity are the host 1 CA (level 2) certificate 504 and the host certificate 506, so that host 1 CA (level 2) certificate will be the first one in the chain that needs to be sent. As illustrated above, the sequence of certificate verification is as follows. The verifying entity, in this case, memory device 10, first verifies the genuineness of the public key in the first certificate in the chain, which in this case is the certificate 504 of the CA underneath the root CA. After the public key in such certificate is verified to be genuine, device 10 then proceeds to verify the next certificate, in this case the host certificate 506. By the same token, a similar sequence of verification may be applied where the certificate chain contains more than two certificates, beginning with the certificate immediately below the root certificate and ending with the certificate of the entity to be authenticated.

Device Certificate Hierarchy

The host authenticates the device based on two factors: the device root CA stored in the host and the certificate/certificate chain supplied by device to the host (which are supplied to the device upon creation of the ACR as a credential). The process for authenticating the device by the host is similar to that for the device authenticating the host described above.

Device Certificate Chain

These are the Certificates of the ACR's key pair. They are provided to the card when the ACR is created. The SSA stores these Certificates individually and will provide them to the host, one by one, during the authentication. The SSA uses these certificates to authenticate to the host. The device is able to handle a chain of 3 certificates, although a number of certificates different from 3 can be used. The number of Certificates may vary from one ACR to another. It is determined when the ACR is created. The device is able to send the certificate chain to the host, however it does not need to parse them since it does not use the certificate chain data.

FIG. 21 is a schematic view illustrating a device certificate level hierarchy for illustrating 1 through n different certificate chains for devices using SSA such as storage devices. The n different certificate chains illustrated in FIG. 21 are as follows:

A2. Device Root CA certificate 520, device 1 CA (manufacturer) certificate 522 and device certificate 524;

B2. Device root CA certificate 520, device n CA (manufacturer) certificate 526 and device certificate 528.

The SSA device may be manufactured by 1 through n different manufacturers, each with their own device CA certificate. Therefore, the public key in the device certificate for a particular device will be signed by the private key of its manufacturer, and the public key of the manufacture is in turn signed by the private key of the device root CA. The way the public key of the device is verified is similar to that in the case of the public key of the host described above. As in the case of the verification of chain A1 described above for the host, there is no need to send the device root CA certificate, and the first certificate in the chains that will need to be sent is the Device i CA (Manufacturer) certificate, followed by the device certificate, i being an integer from 1 to n.

In the embodiment illustrated in FIG. 21, the device will present two certificates: the device i CA (manufacturer) certificate followed by its own device certificate. The device i CA (manufacturer) certificate is that of the manufacturer that manufactured such device and is the manufacturer that provides the private key to sign the public key of the device. When the device i CA (manufacturer) certificate is received by the host, the host would use the public key of the root CA in its possession to decrypt and verify the device i CA (manufacturer) public key. If this verification fails, the host would abort the process and notify the device that authentication has failed. If authentication succeeds, the host then sends a request to the device for the next certificate. The device would then send its own device certificate to be verified by the host in a similar manner.

Figure 22:
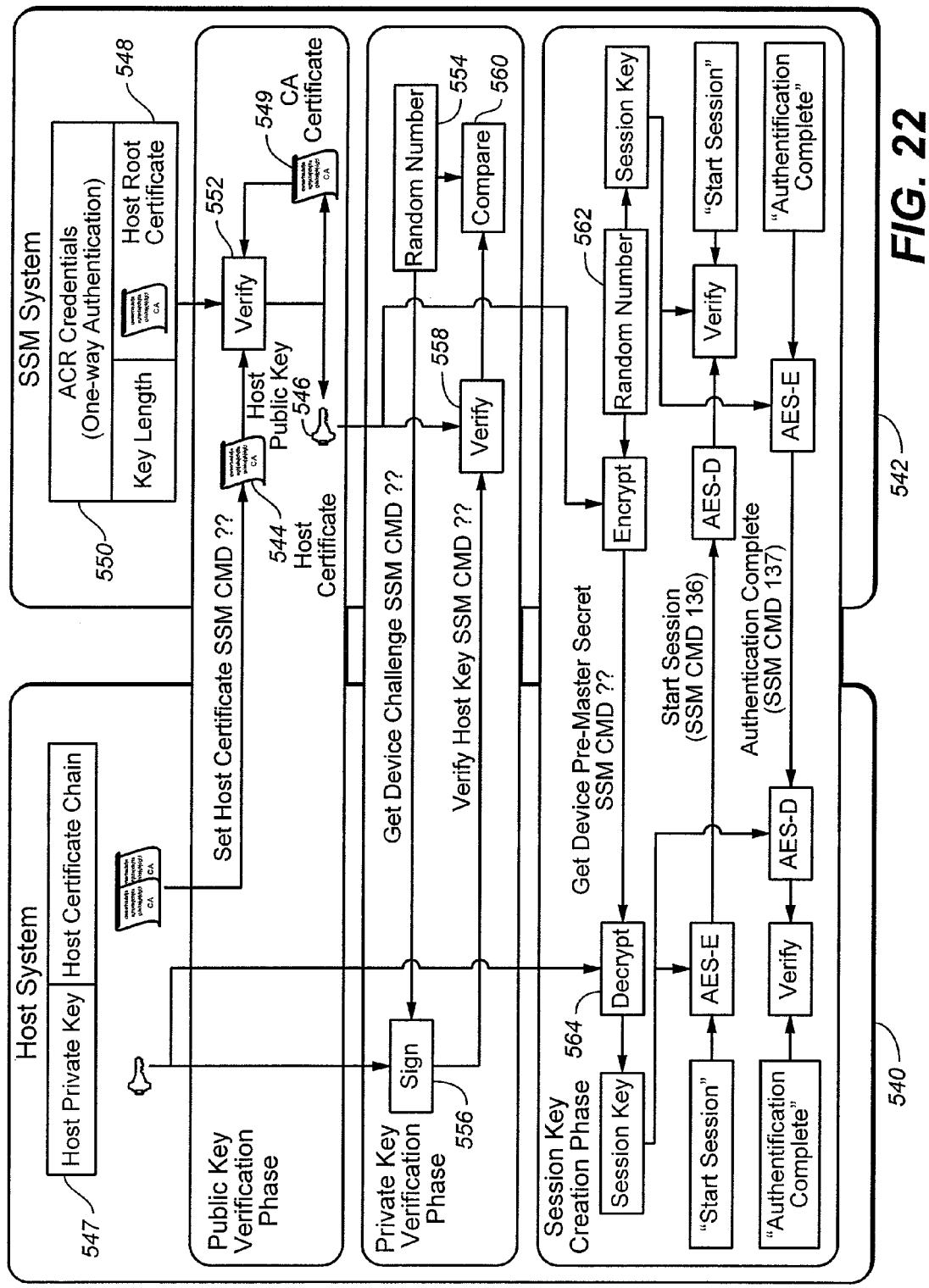
FIGS. 22 and 23 are protocol diagrams illustrating processes for one way and mutual authentication schemes.

The above-described verification processes are also illustrated in more detail in FIGS. 22 and 23. In FIG. 22, the "SSM system" is a software module that implements the SSA system described herein as well as other functions described below. SSM may be embodied as software or computer code with database stored in the memory 20 or a non-volatile memory (not shown) in CPU 12, and is read into RAM 12*a* and executed by CPU 12.

As shown in FIG. 22, there are three phases in the process where the SSM system 542 in device 10 authenticates a host system 540. In the first public key verification phase, the host system 540 sends to the SSM system 542 the host certificate chain in the SSM command. The SSM system 542 verifies (block 552) genuineness of the host certificate 544 and of the host public key 546 using the root certificate authority public key located in the host root certificate 548 in the ACR 550. Where an intermediate certificate authority between the root certificate authority and the host is involved, the intermediate certificate 549 is used as well for the verification in block 552. Assuming that the verification or process (block 552) is successful, the SSM system 542 then proceeds to the second phase.

The SSM system 542 generates a random number 554 and sends it as a challenge to the host system 540. System 540 signs the random number 554 using the private key 547 of the host system (block 556) and sends the signed random number as the response to the challenge. The response is decrypted using the host public key 546 (block 558) and compared with the random number 554 (block 560). Assuming that the decrypted response matches the random number 554, then the challenge response is successful.

In the third phase, random number 562 is encrypted using the host public key 546. This random number 562 is then the session key. The host system 540 can obtain the session key by using its private key to decrypt (block 564) the encrypted number 562 from the SSM system 542. By means of this session key, secure communication between the host system 540 and SSM system 542 may then be initiated. FIG. 22 illustrates a one way asymmetric authentication where the host system 540 is authenticated by the SSM system 542 in device 10.

FIG. 23 is a protocol diagram illustrating a two-way mutual authentication process analogous to the one-way authentication protocol of FIG. 22, where the SSM system 542 in FIG. 23 is also authenticated by the host system 540.

FIG. 24 is a diagram of a certificate chain 590 used for illustrating one embodiment of the invention. As noted above, the certificate chain that needs to be presented for verification may include a number of certificates. Thus the certificate chain of FIG. 24 includes a total of nine (9) certificates, all of which may need to be verified for authentication. As explained above in the background section, in the existing system for certificate verification, either an incomplete certificate chain is sent, or if the entire certificate is sent, the certificates are not sent in any particular order so that the recipient will not be able to analyze the certificates until the entire group of certificates have been received and stored. Since the number of certificates in a chain is not known beforehand, this can present a problem. A large amount of storage space may need to be reserved for storing the certificate chain of uncertain length. This can be an issue for storage devices that perform the verification.

One embodiment of the invention is based on the recognition that the problem can be alleviated by a system where host devices send its certificate chain in the same order that the certificate chain will be verified by the storage device. Thus as shown in FIG. 24, the chain 590 of certificates starts with certificate chain 590 (1) which is the certificate immediately below the host root certificate and ends with certificate 590 (9) which is the host certificate. Therefore, device 10 will first verify the public key in certificate 590 (1), followed by a verification of the public key in certificate 590 (2) and so on until the host public key in certificate 590 (9) is verified. This then completes the verification process of the entire certificate chain 590. Thus if the host device sends to memory device 10 the certificate chain 590 in the same order or sequence in which the certificate chain is to be verified, then memory device 10 can start verifying each certificate as it is received, without having to wait until the entire 9 certificates in the chain 590 have been received.

Thus, in one embodiment, the host device sends one certificate at a time in chain 590 to memory device 10. Memory device 10 will then have to store a single certificate at a time. After the certificate has been verified, it can be over-written by the next certificate that is sent by the host, except for the last certificate in the chain. In this manner, memory device 10 will need to reserve space for storing only a single certificate at any time.

The memory device will need to know when the entire chain 590 has been received. Thus, preferably, the last certificate 590 (9) contains an indicator or indication that this is the last certificate in the chain. This feature is illustrated in FIG. 25 which is a table illustrating information in a control sector that precedes the certificate buffer that is sent by the host to the memory device 10. As shown in FIG. 25, the control sector of certificate 590 (9) contains an argument name "'is final' flag." Memory device 10 can then verify that certificate 590 (9) is the last certificate in the chain by checking whether the "is final" flag is set, to determine whether the certificate received is the last one in the chain.

In an alternative embodiment, the certificates in chain 590 may be sent not one-by-one, but in groups of one, two, or three certificates. Obviously, groups with other number of certificates, or the same number of certificates in the groups, may be used. Thus, chain 590 includes five (5) continuous strings of certificates 591, 593, 595, 597, and 599. Each of the strings contains at least one certificate. A continuous string of certificates is one that contains the certificate which is next to the string before the one string at issue in the chain (beginning certificate), the certificate immediately next to the string that follows the one string in the chain (ending certificate), and all of the certificates in between the beginning and the ending certificates. For example, string 593 contains all three certificates 590 (2), 590 (3), and 590 (4). The five strings of certificates are verified by memory device 10 in the following sequence: 591, 593, 595, 597, and ending with 599. Therefore, if the five strings are sent and received in the same sequence as the verification performed by memory device 10, the memory device will not need to store any of the strings after they have been verified, and all strings except for the last one can be overwritten by the next string that arrives from the host. As in the prior embodiment, it is desirable for the last certificate in the chain to contain an indicator such as a flag that is set to a particular value to indicate that it is the last certificate in the chain. In this embodiment, the memory device will only need to reserve space adequate for storing the largest number of certificates in the five strings. Thus if the host first notifies the memory device 10 of the longest string it intends to send, the memory device 10 will only need to reserve enough space for the longest string.

Preferably, the length of each certificate in the chain sent by the host is not more than four times the length of the public key that is certified by the certificate. Similarly, the length of the certificate sent by the memory device 10 to a host device to certify the public key of the memory device is preferably not more than four times the length of the public key certified by the certificate.

Figure 26:
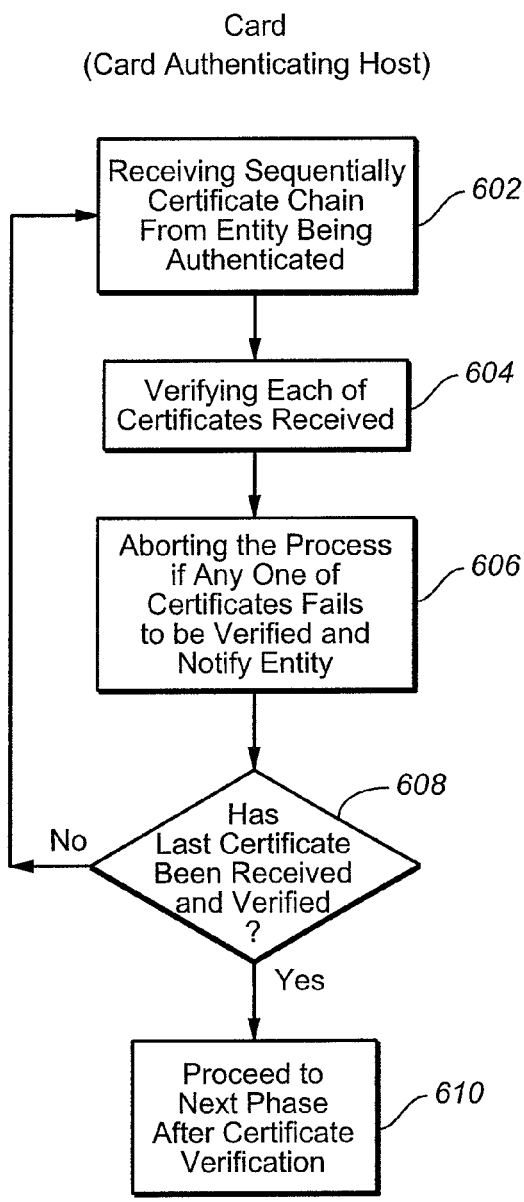
FIGS. 26 and 27 are flow charts illustrating card and host processes respectively for authentication schemes where a memory card is authenticating a host device.

The above described embodiment for verification of certificate chains is illustrated in the flow chart of FIG. 26, where for simplicity, the number of certificates in each group is assumed to be one. As shown in FIG. 26, the host sends the certificates in the chain sequentially to the card. Starting with the first certificate in the chain (typically the one following the root certificate as explained above), the card receives sequentially the certificate chain from the host that is being authenticated (block 602). The card then verifies each of the certificates received and aborts the process if any one of the certificates fails to be verified. If any one of the certificates fails to be verified, the card notifies the host (Blocks 604, 606). The card will then detect whether the last certificate has been received and verified (diamond 608). If the last certificate has not been received and verified, the card then returns to block 602 to continue receiving and verifying certificates from the host. If the last certificate has been received and verified, the card then proceeds to the next phase after certificate verification (610). While the features in FIG. 26 and subsequent figures below refer to memory cards as examples, it will be understood that these features are applicable as well to memory devices with physical forms that are not memory cards.

Figure 27:
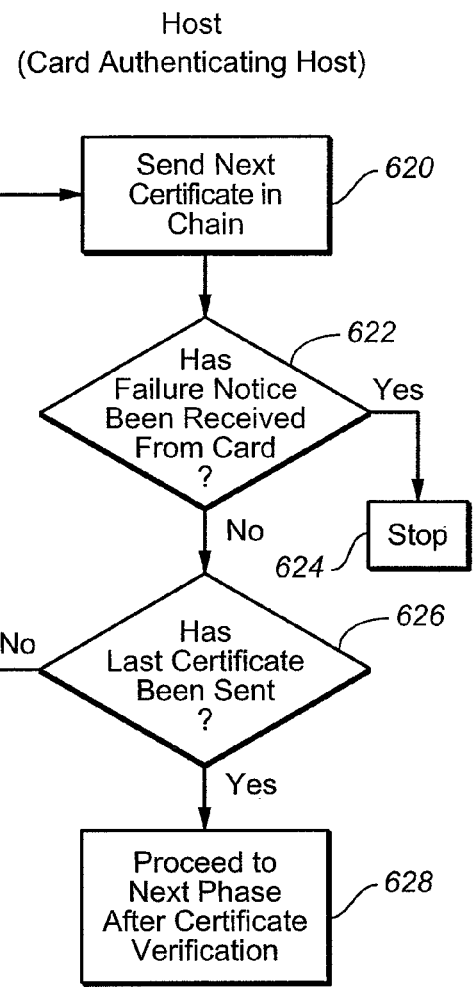

The process carried out by the host when the card is authenticating the host is illustrated in FIG. 27. As shown in FIG. 27, the host sends the next certificate in the chain to the card (block 620)(typically beginning with the one following the root certificate. The host then determines whether an abort notice indicating authentication failure has been received from the card (diamond 622). If an abort notice has been received, the host stops (block 624). If an abort notice has not been received, the host checks to see if the last certificate in the chain has been sent by checking whether the "is final flag" has been set in the last certificate sent (diamond 626). If the last certificate has been sent, the host then proceeds to the next phase after certificate verification (block 628). As illustrated in FIGS. 22 and 23, the next phase can be a challenge response followed by session key creation. If the last certificate in the chain has not yet been sent, the host returns to block 620 to send the next certificate in the chain.

Figure 28:
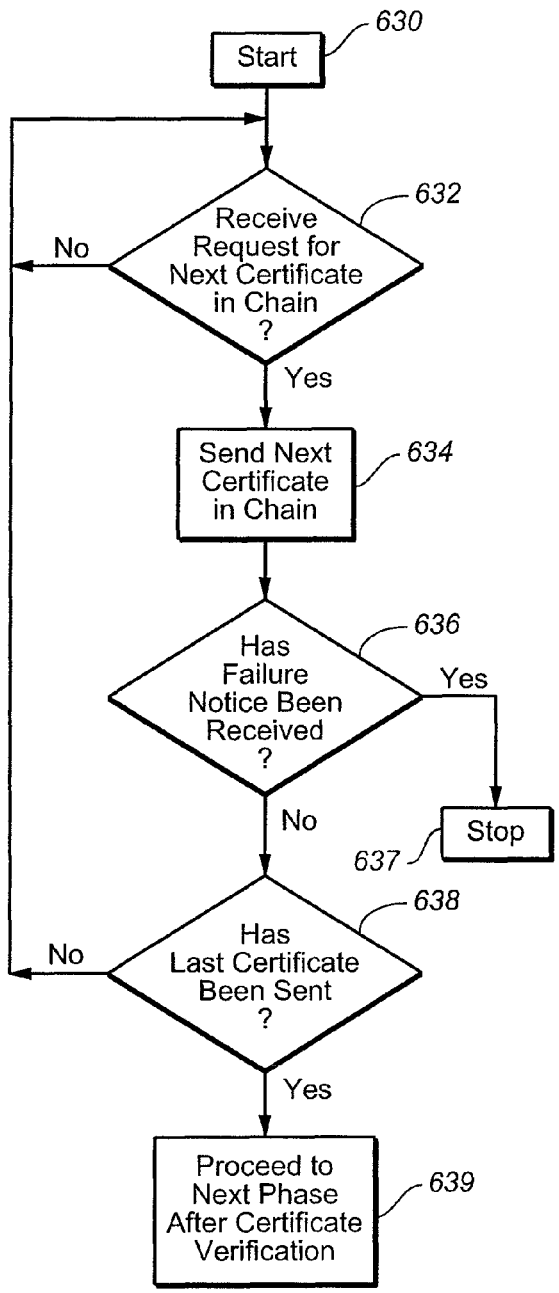
FIGS. 28 and 29 are flow charts illustrating card and host processes respectively for authentication schemes where host device is authenticating a memory card.
Figure 29:
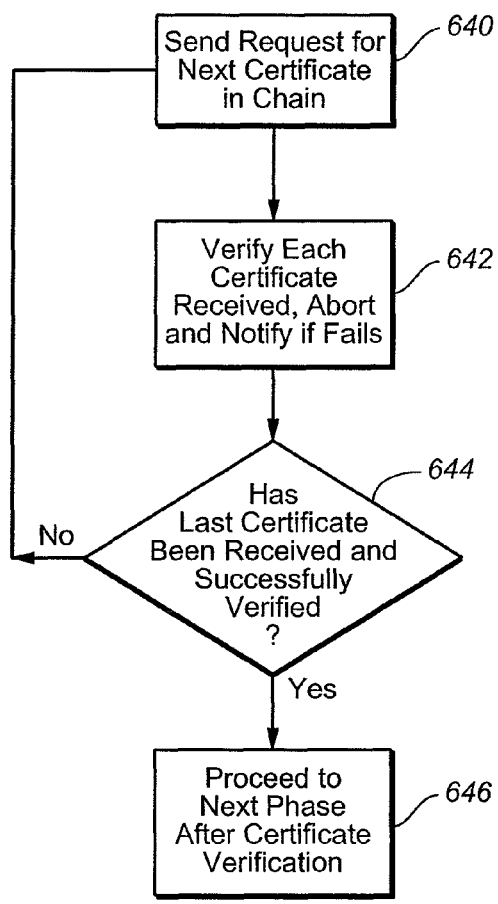

The actions taken by the card and the host when the card is being authenticated are illustrated in FIGS. 28 and 29. As shown in FIG. 28, after starting, the card waits for a request from the host for sending a certificate in the chain (block 630, diamond 632). If a request from the host is not received, the card will return to diamond 632. If a request from the host is received, the card will then send the next certificate in the chain, beginning with the first certificate that should be sent (typically beginning with the one following the root certificate, (block 634). The card determines whether a failure notice has been received from the host (diamond 636). If a failure notice has been received, the card stops (block 637). If no failure notice is received, the card then determines whether the last certificate has been sent (diamond 638). If the last certificate has not been sent, the card returns to diamond 632 and waits until it receives the next request from the host for sending the next certificate in the chain. If the last certificate has been sent, the card then proceeds to the next phase (block 639).

FIG. 29 illustrates the actions taken by the host when the card is being authenticated. The host sends the request for the next certificate in the chain to the card, beginning with the request for the first certificate to be sent (block 640). The host then verifies each certificate received, and aborts the process and notifies the card if verification fails (block 642). If verification passes, the host checks to see whether the last certificate has been received and successfully verified (diamond 644). If the last certificate has not been received and successfully verified, the host then returns to block 640 to send a request for the next certificate in the chain. If the last certificate has been received and successfully verified, the host then proceeds to the next phase after certificate verification (block 646).

Certificate Revocation

When a certificate is issued, it is expected to be in use for its entire validity period. However, various circumstances may cause a certificate to become invalid prior to the expiration of the validity period. Such circumstances include change of name, change of association between subject and CA (e.g., an employee terminates employment with an organization), and compromise or suspected compromise of the corresponding private key. Under such circumstances, the CA needs to revoke the certificate.

SSA enables certificate revocation in different ways, each ACR can be configured for a specific method for revoking certificates. An ACR can be configured not to support a revocation scheme. In this case, each Certificate is considered valid until its expiration date, or Certificate Revocation Lists (CRL) may be employed. As still another alternative, the revocation scheme can be specific to a particular application, or Application-Specific, which will be explained below. An ACR specifies which of the three revocation schemes is adopted by specifying a revocation value. If an ACR is created with no revocation scheme, it is possible for it to adopt a revocation scheme which can be activated by the ACR owner. Revocation of memory device certificates is enforced by the host and not by the SSA security system. An ACR owner is responsible for managing the revocation of a Host Root certificate, the mechanism by which it is done is by updating the ACR's credentials.

Certificate Revocation List (CRL)

The SSA system uses a revocation scheme which involves each CA periodically issuing a signed data structure called a Certificate Revocation List (CRL). A CRL is a time stamped list identifying revoked certificates which is signed by a CA (the same CA that issued the certificates in question), and made freely available to the public. Each revoked certificate is identified in a CRL by its certificate serial number. The size of the CRL is arbitrary and is dependent on the number of non-expired certificates revoked. When a device uses a certificate (e.g., for verifying a host's identity), the device not only checks the certificate signature (and validity) but also verifies it against a list of serial numbers received through a CRL. If an identification such as serial number of a certificate is found on the CRL issued by the CA that issued the certificate, this indicates that the certificate has been revoked and is no longer valid.

The CRL also will need to be verified to be genuine in order for it to serve the purpose of validating certificates. CRLs are signed using the private key of the CA that issued the CRL, and can be verified to be genuine by decrypting the signed CRL using the public key of the CA. If the decrypted CRL matches the digest of the unsigned CRL, this means that the CRL has not been tampered with and is genuine. CRLs are frequently hashed to obtain their digests using a hashing algorithm and the digests are encrypted by the private key of the CA. In order to verify whether a CRL is valid, the signed CRL (i.e. hashed and encrypted CRL) is decrypted using the public key of the CA to yield a decrypted and hashed CRL (i.e. a digest of the CRL). This is then compared to the hashed CRL. Thus, the verification process may frequently involve the step of hashing the CRL for comparison with the decrypted and hashed CRL.

One of the characteristics of the CRL scheme is that the validation of the certificate (against the CRL) can be performed separate from obtaining the CRL. CRLs are also signed by the issuers of the pertinent certificates, and are verified in a manner similar to the verification of certificates, using the public keys of CAs that issued the CRLs, in the manner described above. The memory device verifies that the signature is of the CRL and that the issuer of the CRL matches the issuer of the certificate. Another characteristic of the CRL scheme is that CRLs may be distributed by exactly the same means as the certificates themselves, namely, via un-trusted servers and un-trusted communications. CRLs and their characteristics are explained in detail in the X.509 Standard.

SSA Infrastructure for CRL

SSA provides an infrastructure for revocation of hosts using the CRL scheme. When authenticating to an RSA based ACR with CRL revocation scheme, the host adds one CRL (potentially—if no certificates are revoked by the issuer CA—an empty one) as an additional field to a Set Certificate Command. This field will contain a CRL signed by the issuer of the certificate. When this field is present, the memory device 10 first verifies the certificate in the Set Certificate Command. The obtaining and accessing the CRL repository is completely the hosts' responsibility. CRLs are issued with time periods (CRL expiration time periods or CET) during which they are valid. During verification, if the current time is found to be not within this time period, then the CRL is deemed defective, and cannot be used for certificate verification. The outcome is then that the authentication of the certificate fails.

In conventional certificate verification methods, the authenticating or verifying entity is expected to either possess or be able to retrieve certificate revocation lists from certificate authorities (CA) and check the serial numbers of the certificate presented for authentication against the list to determine whether the certificate presented has been revoked. Where the authenticating or verifying entity is a memory device, the memory device may not have been used on its own to retrieve certificate revocation lists from CAs. If a certificate revocation list is pre-stored in the device, such list may become outdated so that certificates revoked after the date of installation will not appear on the list. This will enable users to access the storage device using a revoked certificate. This is undesirable.

The above problem may be solved in one embodiment by a system where the entity that wishes to be authenticated presents a certificate revocation list together with the certificate to be authenticated to the authenticating entity, which may be a memory device 10. The authenticating entity then verifies the authenticity of the certificate and of the certificate revocation list received. The authenticating entity checks whether the certificate is on the revocation list by checking whether an identification of the certificate, such as a serial number of the certificate, is present on the list.

In view of the above, an asymmetric authentication scheme may be used for mutual authentication between a host device and memory device 10. The host device wishing to be authenticated to memory device 10 will need to provide both its certificate chain and the corresponding CRLs. Host devices, on the other hand, have been used to connect to CAs to obtain CRLs, so that when memory device 10 is to be authenticated by host devices, the memory device need not present CRLs to the host devices along with their certificates or certificate chains.

In recent years, there is an expanding number of different types of portable devices that can be used to play content, such as different embedded or stand alone music players, mp3 players, cellular phones, personal digital assistants, and notebook computers. While it is possible to connect such devices to the World Wide Web in order to access certificate revocation lists from certificate authorities, many users typically do not connect to the web on a day to day basis, but instead will do so only to obtain new content or to renew subscriptions, such as every few weeks. Therefore, it may be cumbersome for such users to have to obtain certificate revocation lists from certificate authorities on a more frequent basis. For such users, the certificate revocation list and optionally also the host certificate that will need to be presented to a storage device to access protected content may be stored in a preferably unprotected area of the storage device itself. In many types of storage devices (e.g. flash memories) the unprotected areas of the storage devices are managed by host devices and not by the storage devices themselves. In this manner, there is no need for the user (through the host device) to have to connect to the web to obtain more up to date certificate revocation lists. The host device may simply retrieve such information from the unsecured area of the storage device and then turn around and present such certificate and list to the storage or memory device to access protected content in the storage device. Since the certificate for accessing protected content and its corresponding certificate revocation list are typically valid for certain time periods, as long as they are still valid, the user will not have to obtain up to date certificates or certificate revocation list. The above feature enables users to have convenient access to the certificate and the certificate revocation list during reasonably long periods while both are still valid, without having to connect to the certificate authority for updated information.

The above-described process is illustrated in the flowcharts of FIGS. 30 and 31. As shown in FIG. 30, the host 24 reads from an unsecured public area of the memory device 10 the CRL (block 652) that pertains to a certificate the host will present to the memory device for authentication. Since the CRL is stored in an unsecured area of the memory, there is no need for authentication before the CRL can be obtained by the host. Because the CRL is stored in the public area of the memory device, the reading of the CRL is controlled by the host device 24. The host in turn sends the CRL with the certificate to be verified to the memory device (block 654) and proceeds to the next phase unless it receives a failure notice from the memory device 10 (block 656). In reference to FIG. 31, the memory device receives the CRL and certificate from the host (block 658) and checks whether the certificate serial number is on the CRL (block 660), as well as in other respects (e.g. whether the CRL has expired). If the certificate serial number is found on the CRL or fails for other reasons, the memory device then sends a fail notice to the host (block 662). In this manner, different hosts can obtain the CRL stored in the public area of the memory device, because the same CRL can be used for the authentication of different hosts. As noted above, the certificate that is to be verified using the CRL may also be stored together with the CRL preferably in an unsecured area of memory device 10 for convenience of the user. However, the certificate is usable for authentication to the memory device only by the host to which the certificate is issued.

Where the CRL contains in its fields a time for the next update as illustrated in FIG. 32, SSA in device 10 also checks the current time against this time to see if the current time is after this time; if it is, then the authentication also fails. The SSA thus preferably checks both the time for the next update as well as the CET against the current time (or against the time when the CRL is received by the memory device 10).

As noted above, if the CRL contains a long list of identifications of revoked certificates, processing (e.g. hashing) and searching the list for the serial number of the certificate presented by the host may take a long time, especially if the processing and searching are carried out in sequence. Thus, to speed up the process, these may be carried out concurrently. Furthermore, if the entire CRL needs to be received before it is processed and searched, the process may also be time consuming. The applicants recognized that the process can be expedited by processing and searching portions of the CRL as they are received (on-the-fly), so that when the last portions of the CRL are received, the process is about to be completed. The processing can discard portions of the certificate revocation list after they have been processed.

Figure 33:
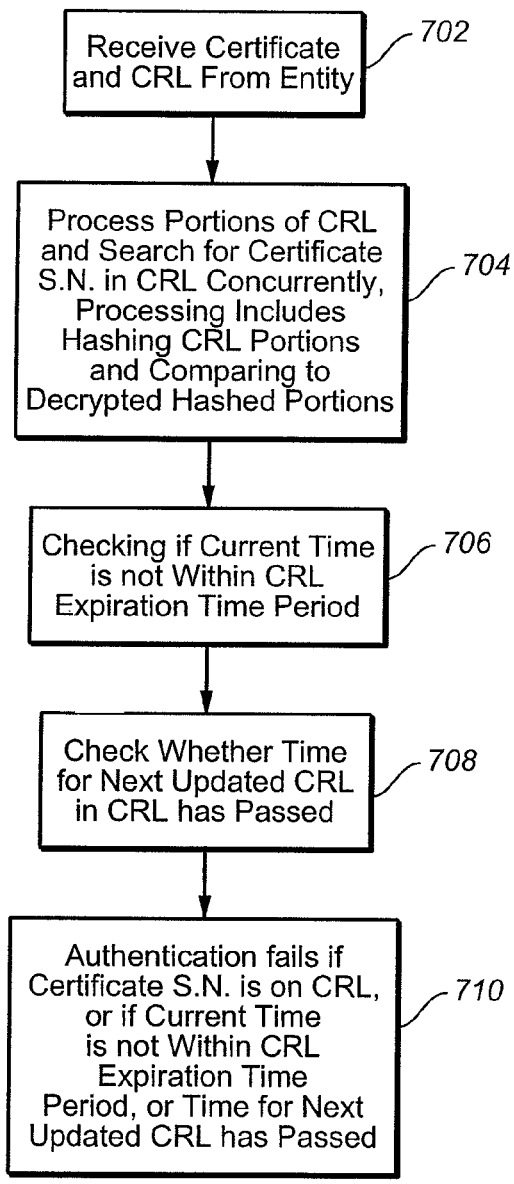
FIGS. 33 and 34 are flow charts illustrating card and host processes respectively for verifying certificates using certificate revocation lists.
Figure 34:
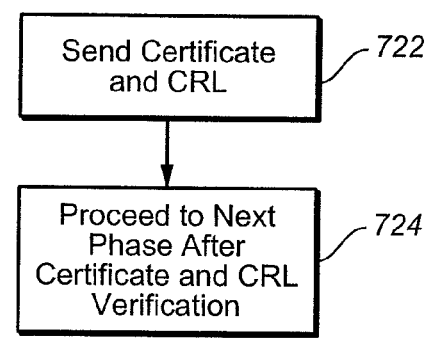

FIGS. 33 and 34 illustrate the above features of revocation schemes. At the authenticating entity (e.g. a memory device such as a memory card), the certificate and CRL are received from the entity wishing to be authenticated (block 702). Portions of the unencrypted CRL are processed (e.g. hashed) and a search is performed on such portions concurrently for identification (e.g. serial number) of the certificate presented. The processed (e.g. hashed) CRL portions are compiled into a hashed complete CRL, which is compared to the complete decrypted and hashed CRL formed by compiling the decrypted CRL portions from the portions received from the entity wishing to be authenticated (block 704). Authentication fails if the comparison indicates there is not a match in the comparison. The authenticating entity also checks both the time for the next update as well as the CET against the current time (blocks 706, 708). Authentication also fails if the identification of the certificate presented is found to be on the CRL, or if the current time is not within the CET, or if time for the next updated CRL has passed (block 710). Storing the hashed CRL portions and the decrypted hashed CRL portions for the compilations in some implementations may not require a large amount of memory space.

When an entity (e.g. the host) wishes to be authenticated, it will send to the authenticating entity its certificate and CRL (block 722), and proceed to the next phase (block 724). This is illustrated in FIG. 34.

A process similar to that above can be implemented if the entity presents a certificate chain for authentication. In such event, the above described process will need to be repeated for each certificate in the chain, along with its corresponding CRL. Each certificate and its CRL may be processed as they are received without waiting for receipt of the rest of the certificate chain and their corresponding CRLs.

Identity Object (IDO)

The identity object is a protected object designed to allow the memory device 10 such as a flash memory card to store an RSA key-pair or other types of cryptographic IDs. The identity object includes any type of cryptographic ID that can be used to sign and verify identities, and encrypt and decrypt data. The identity object includes also a certificate from a CA (or a certificate chain from multiple CAs) that certifies that the public key in the key pair is genuine. The identity object may be used to provide proof of identity either of an external entity or an internal card entity (I.e. the device itself, an internal application, etc. referred to as the owner of the identity object). Therefore, the card is not using the RSA key-pair or other types of cryptographic IDs to authenticate the host through a challenge response mechanism, but rather as a proof of identification through signing data streams provided to it. In other words, the identity object contains the cryptographic ID of its owner. To access the cryptographic ID in the identity object, the host will first need to be authenticated. As described below, the authentication process is controlled by means of an ACR. After the host has been successfully authenticated, the cryptographic ID can be used by the identity object owner to establish the identity of the owner to another party. For example, the cryptographic ID (e.g. the private key of a public-private key pair) can be used to sign data presented through the host by the other party. The signed data and the certificate in the identity object are presented on behalf of the identity object owner to the other party. The public key of the public-private key pair in the certificate is certified to be genuine by a CA (i.e. a trusted authority), so that the other party can trust that this public key is genuine. The other party can then decrypt the signed data using the public key in the certificate, and compare the decrypted data with the data sent by the other party. If the decrypted data matches the data sent by the other party, this shows that the owner of the identity object does have access to the genuine private key, and is therefore truly the entity it is representing to be.

A second usage of the identity object is to protect data designated to the owner of the IDO using the cryptographic ID such as the RSA key itself. The data is expected to be encrypted using the IDO public key. The memory device 10 such as a memory card will use the private key to decrypt the data.

The IDO is an object that can be created for any type of ACR. In one embodiment, an ACR may have only one IDO object. Both the data signing and protection features are services the SSA system is providing to any entity capable of authenticating to the ACR. The protection level of the IDO is as high as the ACR's login authentication scheme. Any authentication algorithm can be chosen for an ACR that is bound to have an IDO. It is up to the creator (host) to decide and evaluate which algorithm can better protect the IDO usage. An ACR with an IDO provides its Certificate chain in response to a command to get the IDO public key.

When the IDO is being used for data protection, the decrypted data outputted from the card may need further protection. In such case, the host is encouraged to use a secure channel established through anyone of the available authentication algorithms.

When creating the IDO, the key length, as well as the PKCS#1 version, are selected. In one embodiment, the public and the private keys are using the (exponent, modulus) representation as defined in the PKCS#1 v2.1;

In one embodiment, the data included during creation of an IDO is the RSA key pair in the selected length, and a chain of certificates that, recursively, attests to the authenticity of the public key.

The ACR that owns the IDO will allow signing of user data. This is done through two SSA commands:
Set user data: Provides a free format data buffer to be signed.
Get SSA signature. The card will provide an RSA signature (using the ACR private key).
The format and size of the signature may be set according to PKCS#1 V1.5 or V2.1 depending on the object type.

Figure 35:
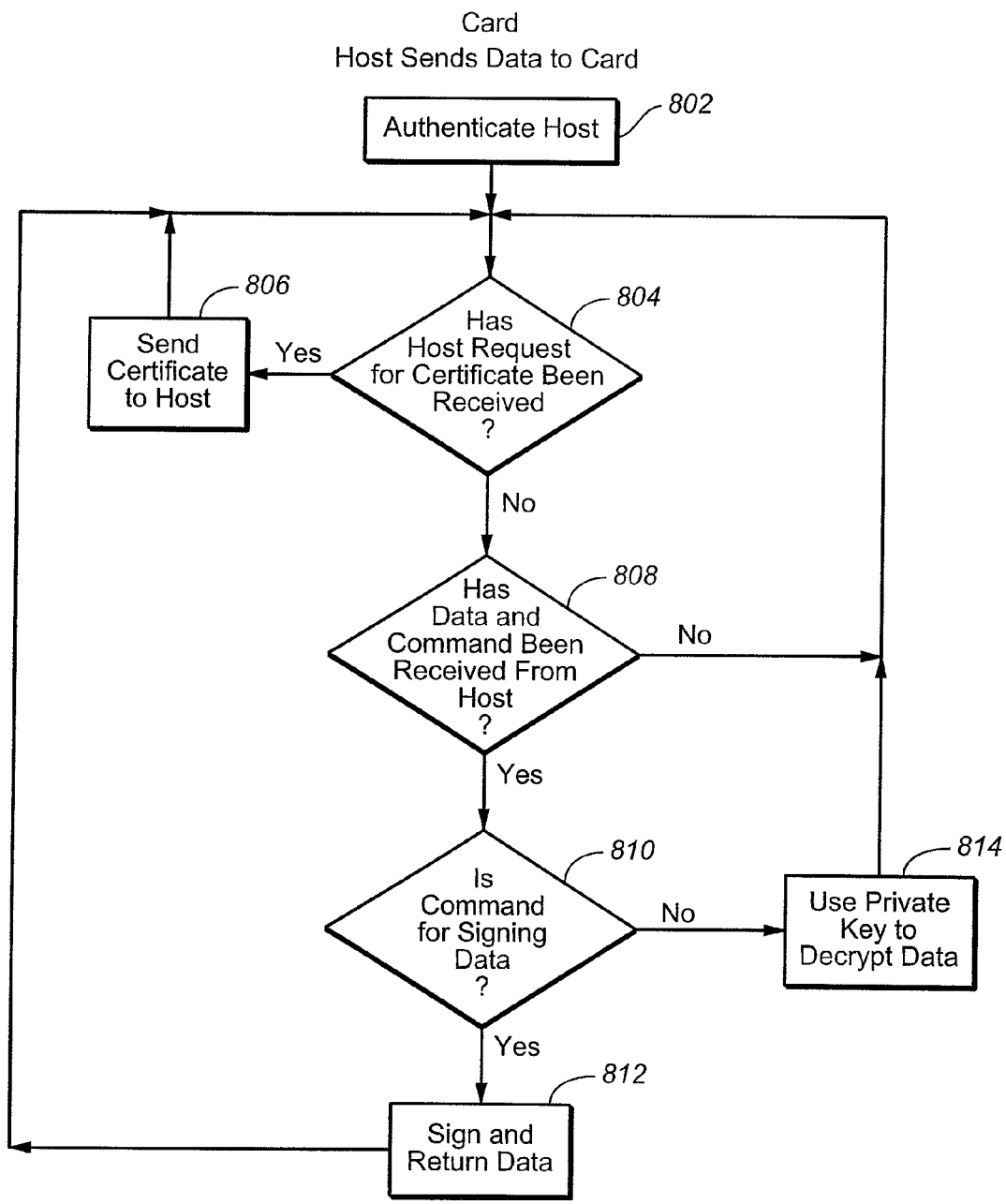
FIG. 35 is a flow chart illustrating card processes for the card signing data sent to the host and for decrypting data from the host.
Figure 36:
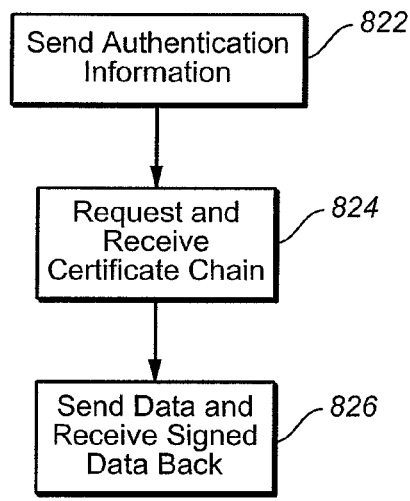
FIG. 36 is a flow chart illustrating host processes where the card signs data sent to the host.
Figure 37:
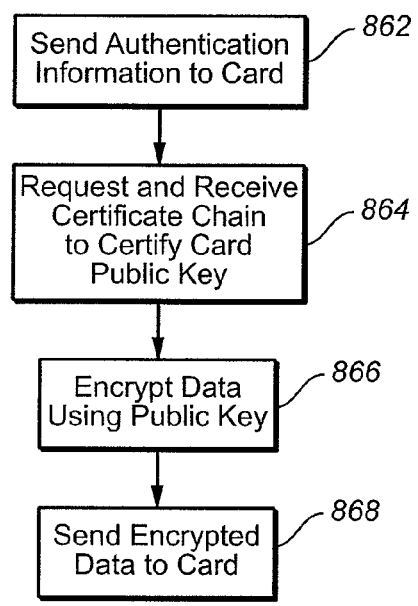
FIG. 37 is a flow chart illustrating host processes where the host sends encrypted data to the memory card.

The operation using an IDO is illustrated in FIGS. 35-37, where the memory device 10 is a flash memory card, and the card is the owner of the IDO. FIG. 35 illustrates a process carried out by the card in signing data sent to a host. Referring to FIG. 35, after a host is authenticated (block 802) as controlled by an ACR at a node of a tree structure described above, the card waits for a host request for a certificate (diamond 804). After receiving the request, the card sends the certificate and returns to diamond 804 for the next host request (block 806). If a chain of certificates needs to be sent to certify the public key of the IDO owned by the card, the above actions are repeated until all the certificates in the chain have been sent to the host. After each certificate has been sent to the host, the card waits for other commands from the host (diamond 808). If no command is received from the host within a preset time period, the card returns to diamond 804. Upon receiving data and a command from the host, the card checks to see if the command is for signing data (diamond 810). If the command is for signing data, the card signs the data with the private key in the IDO and then sends the signed data to the host (block 812) and returns to diamond 804. If the command from the host is not for signing the data from the host, the card uses the private key in the IDO to decrypt the received data (block 814), and returns to diamond 804.

FIG. 36 illustrates a process carried out by the host in the card's signing of data to be sent to the host. Referring to FIG. 36, the host sends authentication information to the card (block 822). After successful authentication as controlled by an ACR at a node of a tree structure described above, the host sends requests to the card for the certificate chain and receives the chain (block 824). After the public key of the card has been verified, the host sends data to the card for signing and receives the data signed by the card's private key (block 826).

FIG. 37 illustrates a process carried out by the host when the host encrypts data using the card's public key and sends the encrypted data to the card. Referring to FIG. 37, the host sends authentication information to the card (block 862). After authentication as controlled by an ACR is successfully performed, the host sends requests to the card for the certificate chain (block 864) needed to verify the card's public key in the IDO, and sends requests to the card for data. After the public key of the card in the IDO has been verified, the host encrypts data from the card using the verified public key of the card and sends it to the card (blocks 866, 868).

Queries

Hosts and applications need to posses certain information regarding the memory device or card they are working with in order to execute system operations. For example, hosts and applications may need to know which applications stored on the memory card are available for invocation. The information needed by the host is sometimes not public knowledge meaning that not everyone has the right to possess it. So to differentiate between the authorized and non-authorized users there is a need to provide two methods of Queries that can be used by a host.

General Information Query

This query gives out system public information without restrictions. Confidential information stored in the memory devices comprises two portions: a shared portion, and an unshared portion. One portion of the confidential information includes information that may be proprietary to individual entities, so that each entity should be allowed to access only his or her own proprietary information, without being able to access the proprietary confidential information of others. This type of confidential information is not shared and forms the unshared part or portion of the confidential information.

Certain information normally thought to be public might in some cases be regarded as confidential such as the names of applications residing in the card and their life cycle state. Another example for this might be Root ACR names which are considered public but could be confidential for some SSA use cases. For these cases the system shall provide the option to keep this information available only to all authenticated users, but not to unauthenticated users, in response to a general information query. Such information constitutes the shared portion of the confidential information. An example of the shared portion of the confidential information may include a Root ACR List—list of all Root ACRs currently present on the device.

Access to public information through the general information query does not need the host/user to be logged into an ACR. Thus anyone knowledgeable with the SSA standard can execute and receive the information. In SSA terms this query command is handled without a Session number. However, if access to the shared portion of the confidential information by an entity is desired, the entity needs to be first authenticated through any of the control structures (e.g. any of the ACRs) controlling access to data in the memory device. After a successful authentication, the entity will be able to access the shared portion of the confidential information through a general information query. As explained above, the authentication process will result in a SSA session number or id for the access.

Discreet Information Query

Private information regarding individual ACRs and their system access and assets is considered to be discreet and needs explicit authentication. So this kind of query calls for ACR login and authentication (if authentication is specified by the ACR) before receiving authorization for information query. This query needs a SSA Session number.

Before the two types of queries are described in detail, it will be useful to first describe the concept of index groups as a practical solution for implementing the queries.

Index Groups

Applications running on potential SSA hosts are requested by the operating system (OS) on the host and system drivers to specify the number of sectors intended to be read. This in turn means that the host application needs to know how many sectors need to be read for every SSA read operation.

Because the nature of query operations is to supply information which is generally not known to the one who requests it, there is a difficulty for the host application to issue the query and guessing the amount of sectors needed for this operation.

To solve this problem the SSA query output buffer consists of only one sector (512 bytes) per query request. Objects that are part of the output information are organized in what is called Index Groups. Each type of object may have a different byte size which accounts for the number of objects that may fit to a single sector. This defines this object's Index group. If an object had a size of 20 bytes then the Index group for this object would contain up to 25 objects. If there where a total of 56 such objects they would have been organized in 3 Index groups where object '0' (the first object) would start the first Index group, object '25' would start the second Index group and Object 50 would start the 3rd and last Index group.

System Query (General Information Query)

This query provides general public information regarding the supported SSA system in the device and the current system that is setup like the different Trees and applications running on the device. Similar to the ACR Query (discreet query) described below, the system query is structured to give several query options:

General—SSA supported version.
    SSA Applications—list of all SSA applications currently present on the device including their running state.

The above listed information is public information. As with the ACR Query, to forgo the need of the host to know how many sectors to read for the query output buffer there will be one sector sent back from the device while still enabling the host to further query additional Index groups. So if the number of Root ACR objects exceeds that of the output buffer size for Index Group '0' the host can send another query request with the following Index group ('1').

ACR Query (Discreet Information Query)

The SSA ACR Query command is intended to supply the ACR user with information about the ACR's system resources like key and application IDs, Partitions and child ACRs. The Query information is only about the logged in ACR and nothing concerning other ACRs on the system Tree. In other words, access is limited to only that portion of the confidential information which is accessible under the permissions of the ACR involved.

There are three different ACR objects that the user can query:
    Partitions—name and access rights (Owner, Read, Write).
    Key IDs and application IDs—name and access rights (Owner, Read, Write).
    Child ACRs—ACR and AGP name of a direct child ACR.
    IDOs and Secure Data Objects (described below)—name and access rights (Owner, Read, Write).

Because the number of objects connected with an ACR may vary and the information might be more then 512 bytes—one sector. Without knowing in advance the number of objects, the user has no way of knowing how many sectors are needed to be read from the SSA system in the device in order to get the full list. So each object list provided by the SSA system is divided into Index groups, similar to the case of system queries described above. An Index group is the number of objects that fit into on sector i.e. how many objects can be sent in one sector from SSA system in the device to the host. This lets the SSA system in the device to send one sector of a requested Index group. The host/user will receive a buffer of the queried objects, the number of objects in the buffer. If the buffer is full then the user can query for the next object Index group.

Figure 38:
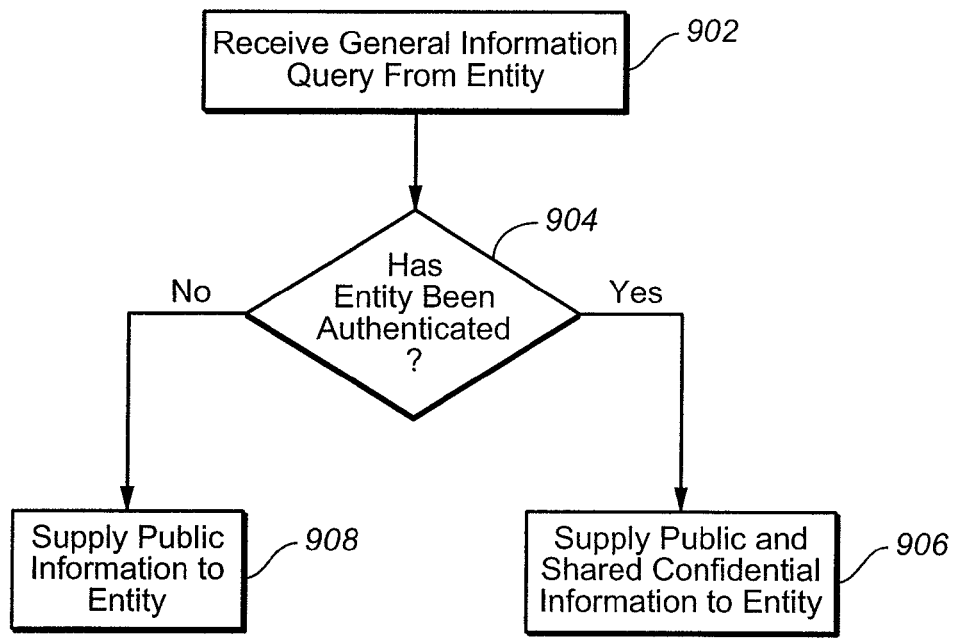
FIGS. 38 and 39 are flow charts illustrating processes respectively for the general information and discreet information queries.

FIG. 38 is a flow chart illustrating an operation involving a general information query. In reference to FIG. 38, when the SSA system receives a general information query from an entity (block 902), the system determines whether the entity has been authenticated (diamond 904). If it has been, then the system supplies the entity with public information and the shared portion of the confidential information (block 906). If it has not been, the system supplies the entity with only public information (block 908).

Figure 39:
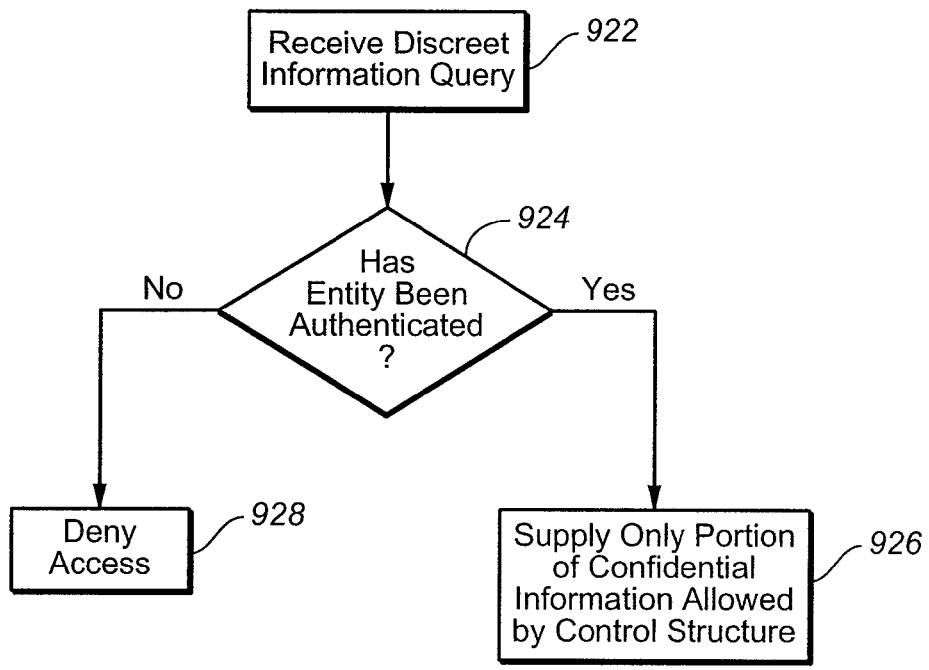

FIG. 39 is a flow chart illustrating an operation involving a discreet information query. In reference to FIG. 39, when the SSA system receives a discreet information query from an entity (block 922), the system determines whether the entity has been authenticated (diamond 924). If it has been, then the system supplies the entity with confidential information (block 926). If it has not been, the system denies access of the entity to confidential information (block 928).

Feature Set Extension (FSE)

In many cases it is very advantageous to run data processing activities (e.g. DRM license object validation) inside the SSA on the card. The resulting system will be more secure, more efficient, and less host dependent relative to an alternative solution where all of the data processing tasks are executed on the host.

The SSA security system comprises a set of authentication algorithms and authorization policies designed to control the access to, and usage of, a collection of objects stored, managed, and protected by the memory card. Once a host gains access, the host will then carry out processes on the data stored in the memory device, where the access to the memory device is controlled by the SSA. It is assumed, however, that data is, by nature, very application specific and, therefore, neither the data format, nor data processing is defined in the SSA, which does not deal with the data stored on the devices.

One embodiment of the invention is based on the recognition that the SSA system can be enhanced to permit hosts to execute some of the functions normally performed by the hosts in the memory card. Hence some of the software functions of the hosts may be split into two parts: with one part still performed by the hosts and another part now performed by the card. This enhances the security and efficiency of the data processing for many applications. For this purpose, a mechanism known as FSE may be added to enhance the capabilities of the SSA. The host applications in FSE executed by the card in this manner are also referred herein as internal applications, or device internal applications.

The enhanced SSA system provides a mechanism to extend the basic SSA command set, which provides authentication and access control, of the card via introduction of the card application. A card application is assumed to implement services (e.g. DRM schemes, eCommerce transactions) in addition to those of the SSA. The SSA feature set extension (FSE) is a mechanism designed to enhance the standard SSA security system with data processing software/hardware modules, which can be proprietary. The services defined by the SSA FSE system enable host devices to query the card for available application, select and communicate with a specific application, in addition to the information that can be obtained using the queries described above. The general and discreet queries described above may be used for this purpose.

Two methods to extend the card feature set in SSA FSE are utilized:

providing services—This feature is enabled through allowing authorized entities to communicate directly with the internal application using a command channel known as communication pipe, which can be proprietary.

extensions of the SSA standard access control policies—This feature is enabled through associating internal protected data objects (e.g. CEKs, secure data objects or SDOs described below) with internal card applications. Whenever such an object is accessed, if the standard SSA policies defined are satisfied, the associated application is invoked to thereby impose at least one condition in addition to the standard SSA policies. This condition preferably will not conflict with the standard SSA policies. Access is granted only if this additional condition is satisfied as well. Before the capabilities of the FSE are further elaborated, the architectural aspects of FSE as well as the communication pipe and SDO will now be addressed.

The SSM Module and Related Modules

Figure 40A:
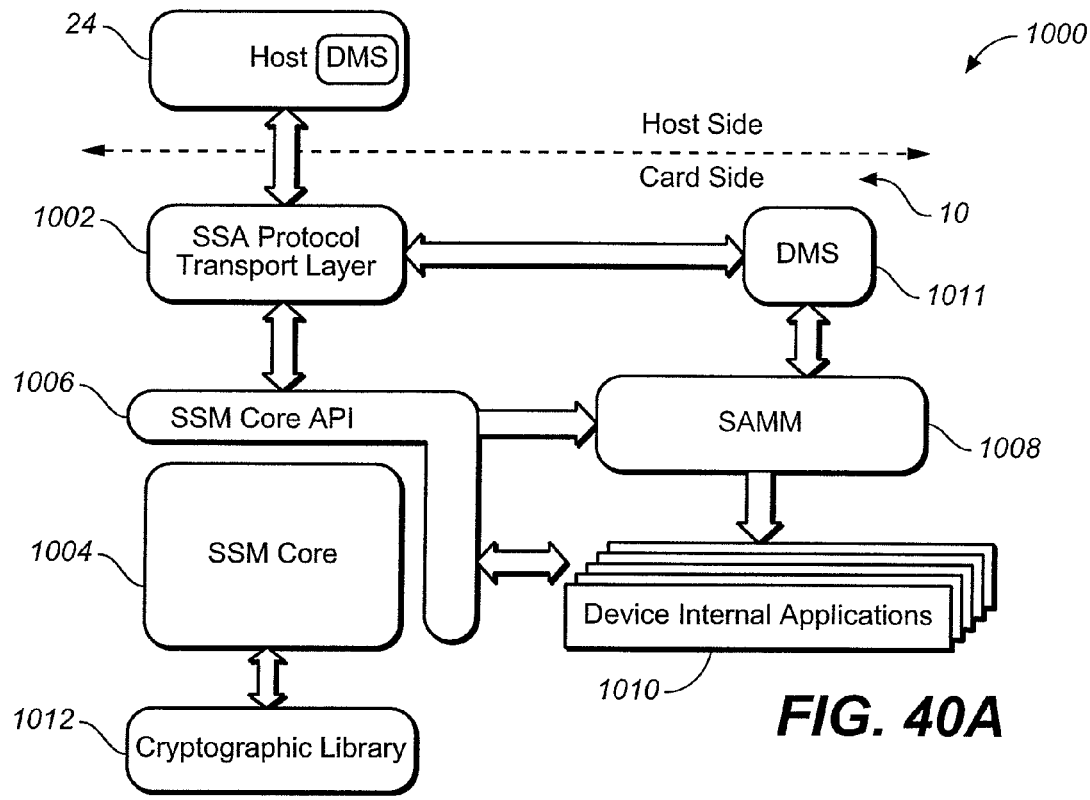
FIG. 40A is a functional block diagram of the system architecture in a memory device (such as a flash memory card) connected to a host device to illustrate an embodiment of the invention.

FIG. 40A is a functional block diagram of the system architecture 1000 in a memory device 10 (such as a flash memory card) connected to a host device 24 to illustrate an embodiment of the invention. The main components of the software modules in memory device of card 20 are as follows:
SSA Transport Layer 1002

The SSA transport layer is card protocol dependent. It handles the host side SSA requests (commands) on the protocol layer of the card 10 and then relays them to the SSM API. All host-card synchronization and SSA command identification is done at this module. The transport layer is also responsible for all SSA data transfer between host 24 and card 10.

Secure Services Module Core (SSM Core) 1004

This module is an important part of the SSA implementation. The SSM core implements the SSA architecture. More specifically the SSM Core implements the SSA Tree and ACR system and all of the corresponding rules described above that make up the system. The SSM core module uses a cryptographic library 1012 to support the SSA security and cryptographic features, such as encryption, decryption and hashing.

SSM Core API 1006

This is the layer in which host and internal applications will interface with the SSM core to carryout SSA operations. As shown in FIG. 40A, both host 24 and internal device applications 1010 will use the same API.

Secure Application Manager Module (SAMM) 1008

SAMM is not part of the SSA system but it is an important module in the card that controls internal device applications interfacing with the SSA system.

The SAMM manages all internal device running applications which include:
1. Application lifecycle monitor and control.
2. Application initialization.
3. Application/Host/SSM interface.

Device Internal Applications 1010

These are applications approved for running on the card side. They are managed by SAMM and may have access to the SSA system. The SSM Core also provides a communication pipe between the host side applications and the internal applications. Examples for such internal running applications are DRM applications and one time password (OTP) applications as explained further below.

Device Management System (DMS) 1011

This is a module that contains the processes and protocols needed to update the card's system and application firmware as well as add/remove services, in a post shipment (commonly referred to as post issuance) mode.

Figure 40B:
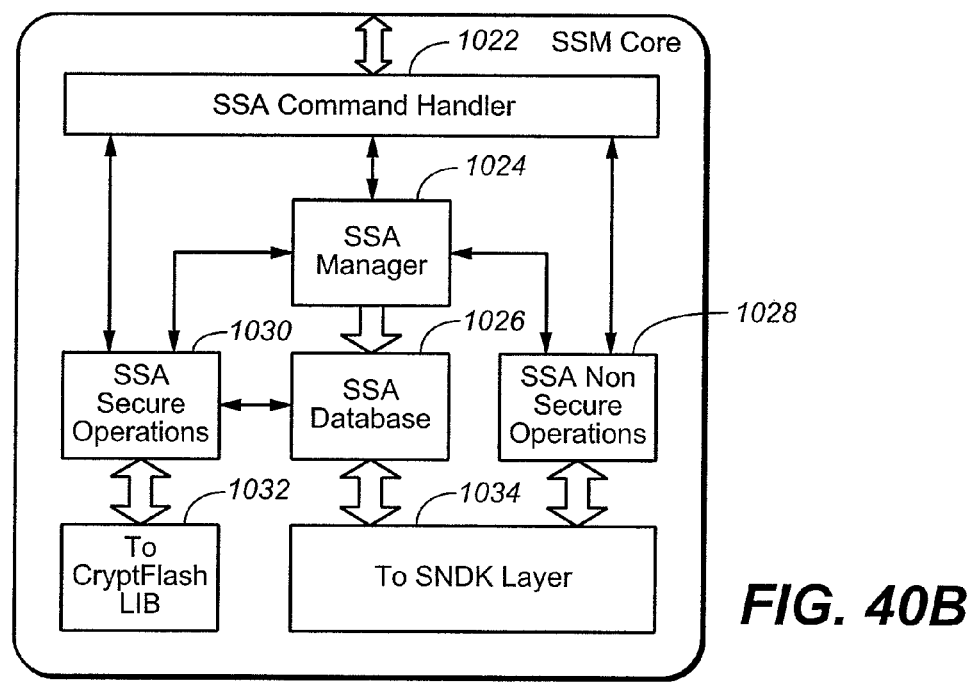
FIG. 40B is a functional block diagram of the internal software modules of the SSM core of FIG. 40A.

FIG. 40B is a functional block diagram of the internal software modules of the SSM core 1004. As shown in FIG. 40B, core 1004 includes a SSA command handler 1022. Handler 1022 parses the SSA commands originating from the host or from the device internal applications 1010 before the commands are passed to the SSA manager 1024. All of the SSA security data structures such as AGPs and ACRs as well as all SSA rules and policies are stored in the SSA database 1026. SSA manager 1024 implements the control exerted by the ACRs and AGPs and other control structures stored in database 1026. Other objects such as IDOs, and secure data objects are also stored in the SSA database 1026. SSA manager 1024 implements the control exerted by the ACRs and AGPs and other control structures stored in database 1026. Non-secure operations that do not involve SSA are handled by the SSA non-secure operations module 1028. Secure operations under the SSA architecture are handled by the SSA secure operations module 1030. Module 1032 is an interface that connects module 1030 to the cryptographic library 1012. 1034 is a layer that connects modules 1026 and 1028 to the flash memory 20 in FIG. 1.

Communication (or Pass-Through) Pipe

The Pass-Through Pipe objects enable authorized host side entities to communicate with the internal applications, as controlled by the SSM core and SAMM. Data transfer between the host and the internal application is carried over the SEND and RECEIVE commands (defined below). The actual commands are application specific. The entity (ACR) creating the Pipe will need to provide the Pipe name and the ID of the application it will open a channel to. As with all other protected objects, the ACR becomes its owner and is allowed to delegate usage rights, as well as ownership, to other ACR according to the standard delegation rules and restrictions.

An authenticated entity will be allowed to create Pipe objects if the CREATE_PIPE Permissions is set in its ACAM. Communication with the internal application will be allowed only if the Write or Read Pipe Permissions are set in its PCR. Ownership and Access rights delegation is allowed only if the entity is the Pipe owner or Delegate access rights is set in its PCR. As with all other Permissions when delegating ownership rights to another ACR, the original owner will preferably be stripped from all its permissions to this device application.

Preferably only one communication pipe is created for a specific application. An attempt to create a second Pipe and connect it to an application which is already connected will preferably be rejected by the SSM system 1000. Thus, preferably there is a one-to-one relationship between one of the device internal applications 1010 and a communication pipe. However, multiple ACRs may communicate with one device internal application (via the delegation mechanism). A single ACR may communicate with several device applications (either via delegation or ownership of multiple Pipes connected to different applications). The ACRs controlling different pipes are preferably located in nodes of trees that are entirely separate, so that there is no crosstalk between the communication pipes.

Transferring data between the host and a specific application is done using the following Commands:
WRITE PASS THROUGH—Will transfer an unformatted data buffer from the host to the device internal application.
READ PASS THROUGH—Will transfer an unformatted data buffer from the host to the device internal application and, once the internal processing is done, will output an unformatted data buffer back to the host.

Write and read pass through commands provide as parameter the ID of the device internal application 1008 the hosts wish to communicate with. The entities permission will be validated and if the requesting entity (i.e. the ACR hosting the session this entity is using) has the Permission to use the Pipe connected to the requested application the data buffer will be interpreted and the command executed.

This communication method allows the host application to pass vendor/proprietary specific commands to an internal device application through the SSA ACR session channel.

Secure Data Object (SDO)

A useful object that can be employed in conjunction with FSE is the SDO.

The SDO serves as a general purpose container for secure storage of sensitive information. Similar to CEK objects, it is owned by an ACR, and access rights and ownership can be delegated between ACRs. It contains data which is protected and used according to predefined policy restrictions and, optionally, has a link to a device internal application 1008. The sensitive data is preferably not used, nor interpreted, by the SSA system, but rather, by the object's owner and users. In other words, the SSA system does not discern information in the data handled by it. In this manner, owners and users of the data in the object can be less concerned about loss of sensitive information due to the interface with the SSA system, when data is passed between hosts and the data objects. Hence, SDO objects are created by the host system (or internal applications), and assigned a string ID, similar to the way CEKs are created. Upon creation the host provides, in addition to the name, an application ID for the application linked to the SDO and a data block which will be stored, integrity verified, and retrieved by the SSA.

Similar to CEKs, SDO(s) are preferably only created within a SSA session. The ACR used to open the session becomes the owner of the SDO and has the rights to delete it, write and read the sensitive data, as well as, delegate the ownership and the permission to access the SDO to another ACR (either its child or within the same AGP).

The Write and Read operations are reserved exclusively for the owner of the SDO. A Write operation overwrites the existing SDO object data with the provided data buffer. A Read operation will retrieve the complete data record of the SDO.

The SDO access operations are allowed to non-owner ACRs which have the proper access permissions. The following operations are defined:
SDO Set, application ID is defined: The data will be processed by the internal SSA application with the application ID. The application is invoked by the association with the SDO. As an optional result, the application will write the SDO object.
SDO Set, application ID is null: This option is not valid and will prompt an illegal command error. The Set command needs an internal application running in the card.
SDO Get, application ID is defined: The request will be processed by the device internal application with the application ID. The application is invoked by the association with the SDO. The output, although not defined, will be sent back to the requester. The application will optionally read the SDO object.
SDO Get, application ID is null: This option is not valid and will prompt an illegal command error. The Get command needs an internal application running in the card.
SDO related permissions: An ACR can be an SDO owner or just have access permissions (Set, Get or both). In addition, an ACR can be permitted to transfer his access rights, to an SDO it does not own, to another ACR. An ACR may be explicitly permitted to create SDO(s) and to delegate access rights if it has ACAM permission.

Internal ACR

The internal ACR is similar to any ACR with a PCR, except that external entities to the device 10 cannot log in to this ACR. Instead, the SSA manager 1024 of FIG. 40B automatically logs in to the internal ACR when the objects under its control or applications associated with it are invoked. Since the entity trying to gain access is an entity internal to the card or memory device, there is no need for authentication. The SSA manager 1024 will simply pass a session key to the internal ACR to enable internal communication.

The capabilities of FSE will be illustrated using two examples: one time password generation and digital rights management. Before the one time password generation example is described, the issue of dual factor authentication will first be addressed.

OTP Embodiment

Dual Factor Authentication (DFA)

DFA is an authentication protocol designed to enhance the security of personal logins into, as an example, a web services server by adding to the standard user credentials (namely user name and password) an additional secret, a "second factor." The second secret is typically something stored in a physical secure token that the user has in his possession. During the process of login the user needs to provide proof of possession as part of the login credential. A commonly used way to prove possession is using a One Time Password (OTP), a password good for a single login only, which is generated by, and outputted from, the secure Token. If the user is able to provide the correct OTP it is considered as a sufficient proof of possession of the token since it is cryptographically infeasible to calculate the OTP without the Token. Sine the OTP is good for one login only, the user should have the Token at the time of login, since usage of an old password captured from a previous login will not do any good any more.

Figure 41:
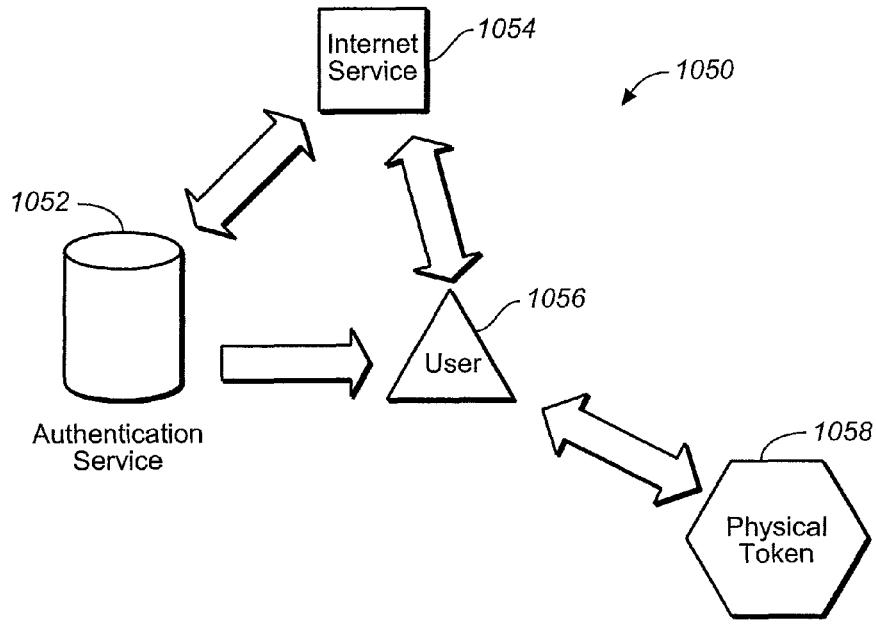
FIG. 41 is a block diagram of a system for generating a one time password.

The product described in the following sections is making use of the SSA security data structure, plus one FSE design to calculate the next password in the OTP series, to implement a flash memory card with multiple "virtual" secure Tokens, each one is generating a different series of passwords (which can be used to login into different web sites). A block diagram of this system is depicted in FIG. 41.

The complete system 1050 comprises an authentication server 1052, an Internet server 1054 and a user 1056 with token 1058. The first step is to agree on a shared secret between the authentication server and the user (also referred to as seed provisioning). The user 1056 will request a secret or seed to be issued and will store it in the secure token 1058. The next step is to bind the issued secret or seed with a specific web services server. Once this is done, the authentication can take place. The user will instruct the Token to generate an OTP. The OTP with the user name and password are sent to Internet server 1054. The Internet server 1054 forwards the OTP to the authentication server 1052 asking it to verify the user identity. The authentication server will generate an OTP as well, and since it is generated from a shared secret with the Token, it should match the OTP generated from the Token. If a match is found the user identity is verified and the authentication server will return a positive acknowledgement to the Internet server 1054 which will complete the user login process.

The FSE implementation for the OTP generation has the following characteristics:
  The OTP seed is securely stored (encrypted) in the card.
  The password generation algorithm is executed inside the card.
  The device 10 can emulate multiple Virtual Tokens each of them stores a different seed and may use different password generation algorithms.
  The device 10 is providing a secure protocol to transport the seed from the authentication server into the device.

Figure 42:
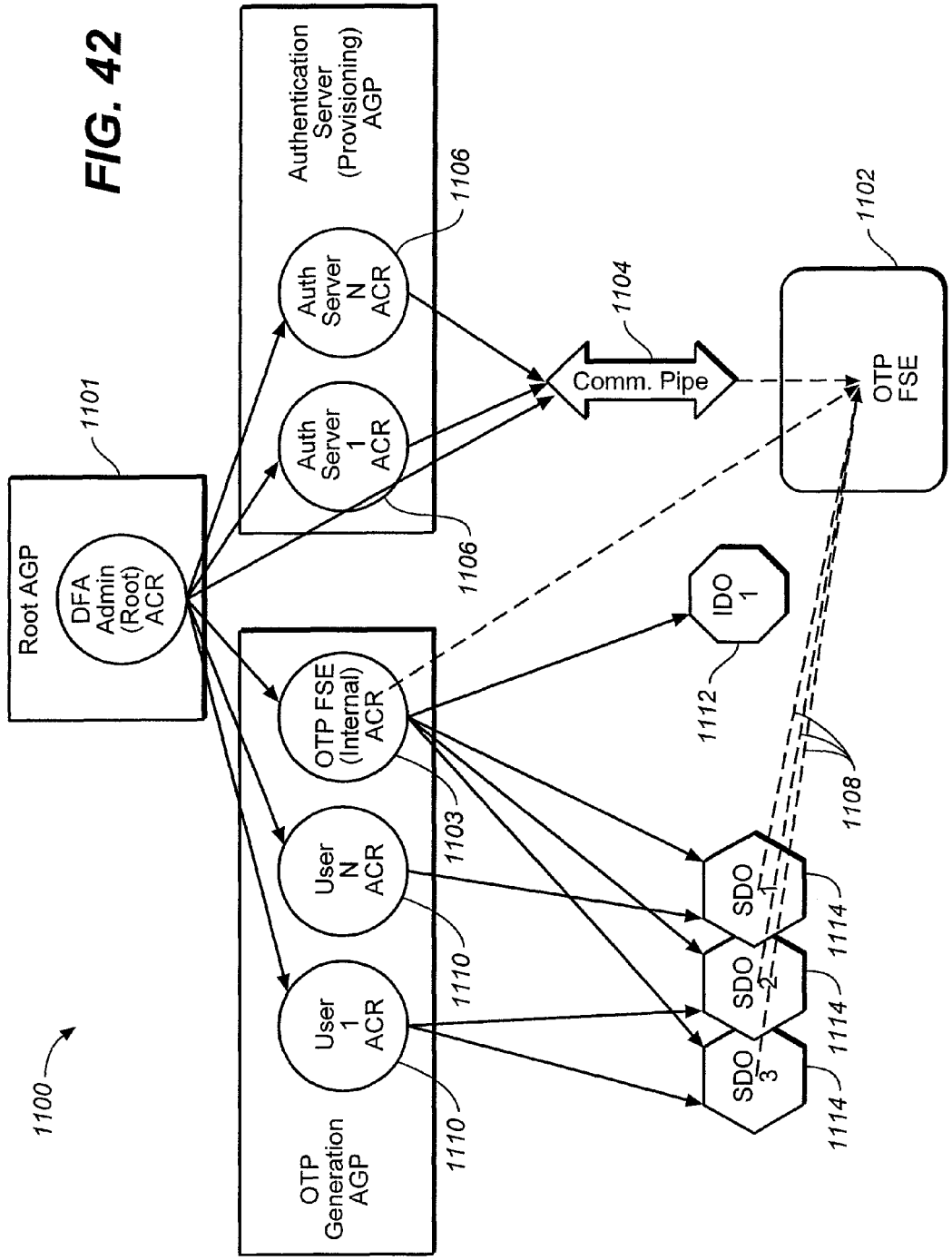
FIG. 42 is a functional block diagram illustrating one time password (OTP) seed provisioning and OTP generation.

The SSA features for OTP seed provisioning and OTP generation are illustrated in FIG. 42, where solid line arrows illustrate ownership or access rights, and broken line arrows illustrate associations or links. As shown in FIG. 42, in the SSA FSE system 1100, software program code FSE 1102 may be accessed through one or more communication pipes 1104 which is controlled by each of N application ACRs 1106. In the embodiments described below, only one FSE software application is illustrated, and for each FSE application, there is only one communication pipe. It will be understood, however, that more than one FSE application may be utilized. While only one communication pipe is illustrated in FIG. 42, it will be understood that a plurality of communication pipes may be used. All such variations are possible. In reference to FIGS. 40A, 40B and 42, the FSE 1102 may be an application used for OTP provisioning and form a subset of the device internal applications 1010 of FIG. 40A. The control structures (ACRs 1101, 1103, 1106, 1110) are part of the security data structures in SSA and are stored in the SSA database 1026. Data structures such as IDO 1120, SDO objects 1122, and communication pipe 1104 are also stored in the SSA database 1026.

In reference to FIGS. 40A and 40B, security related operations (e.g. data transfer in sessions, and operations such as encryption, decryption and hashing) involving the ACRs and data structures are handled by module 1030, with the assistance of interface 1032 and cryptographic library 1012. SSM Core API 1006 does not distinguish between operations involving ACRs that interact with hosts (external ACRs) and the internal ACRs that do not, and thus does not distinguish between operations involving the hosts versus the device internal applications 1010. In this manner, the same control mechanism is used for controlling access by host side entities and access by device internal applications 1010. This lends flexibility for dividing data processing between host side applications and device internal applications 1010. The internal applications 1010 (e.g. FSE 1102 in FIG. 42) are associated with and are invoked through the control of the internal ACRs (e.g. ACR 1103 in FIG. 42).

Furthermore, the security data structures such as ACRs and AGPs with the associated SSA rules and policies preferably control access to important information such as the content in or information that can be derived from the content in SDOs, so that outside or internal applications can only access this content or information in accordance with the SSA rules and policies. For example, if two different users can invoke an individual one of the device internal applications 1010 to process data, internal ACRs located in separate hierarchical trees are used to control access by the two users, so that there is no crosstalk between them. In this manner, both users can access a common set of device internal applications 1010 for processing data without fear on the part of owners of the content or information in the SDOs of losing control of the content or information. For example, access to the SDOs storing data accessed by the device internal applications 1010 can be controlled by ACRs located in separate hierarchical trees, so that there is no crosstalk between them. This manner of control is similar to the manner by which SSA controls access to data described above. This provides security of data stored in the data objects to content owners and users.

In reference to FIG. 42, it is possible for a portion of the software application code needed for the OTP related host application to be stored (e.g. pre-stored prior to or loaded after memory card issuance) in the memory device 10 as the application in FSE 1102. To execute such code, the host will need to first authenticate through one of the N authentication ACRs 1106, N being a positive integer, in order to gain access to pipe 1104. The host will also need to provide an application ID for identifying the OTP related application it wishes to invoke. After a successful authentication, such code can be accessed for execution through pipe 1104 associated with the OTP related application. As noted above, there is preferably a one-to-one relationship between a pipe 1104 and a specific application, such as an OTP related internal application. As shown in FIG. 42, multiple ACRs 1106 may share control of a common pipe 1104. An ACR can also control more than one pipe.

Secure data objects SDO 1, SDO 2 and SDO 3 referred to collectively as objects 1114 are illustrated in FIG. 42, each containing data, such as a seed for OTP generation, which seed is valuable and preferably encrypted. The links or association 1108 between the three data objects and FSE 1102 illustrate an attribute of the objects, in that, when any one of the objects is accessed, the application in FSE 1102 with an application ID in the SDO's attribute will be invoked, and the application will be executed by the memory device's CPU 12 without requiring receipt of any further host commands (FIG. 1).

In reference to FIG. 42, before a user is in a position to start the OTP process, the security data structures (ACRs 1101, 1103, 1106 and 1110) are already created with their PCRs for controlling the OTP process. The user will need to have access rights to invoke an OTP device internal application 1102 through one of the authentication server ACRs 1106. The user will also need to have access rights to the OTP that will be generated, through one of the N user ACRs 1110. The SDOs 1114 may be created during the OTP seed provisioning process. The IDO 1116 is preferably already created and controlled by the internal ACR 1103. The internal ACR 1103 also controls the SDOs 1114 after they are created. When the SDOs 1114 are accessed, the SSA manager 1024 in FIG. 40B automatically logs in to the ACR 1103. The internal ACR 1103 is associated with FSE 1102. The SDOs 1114 can become associated with the FSE during the OTP seed provisioning process as shown by the broken lines 1108. After the association is in place, when the SDOs are accessed by the host, the association 1108 will cause the FSE 1102 to be invoked without a further request from the host. The SSA manager 1024 in FIG. 40B will also automatically logs in to the ACR 1103, when communication pipe 1104 is accessed through one of the N ACRs 1106. In both cases (accessing SDO 1114 and pipe 1104), the SSA manager will pass a session number to the FSE 1102, which session number will identify the channel to the internal ACR 1103.

Figure 44:
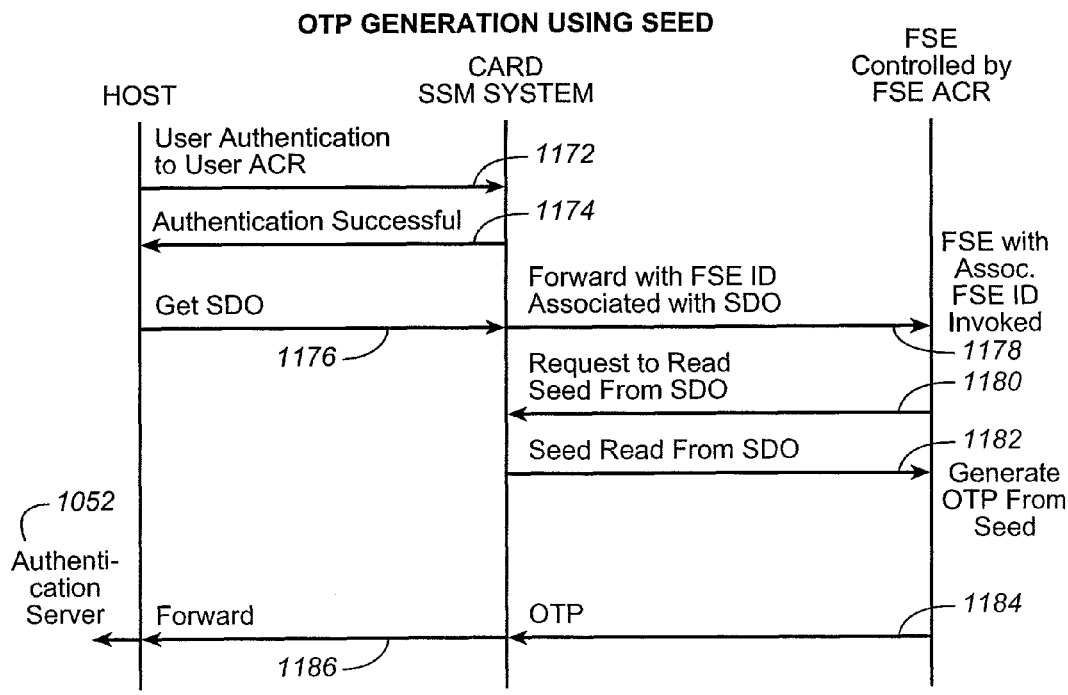
FIG. 44 is a protocol diagram illustrating a one time password generation phase.
Figure 43:
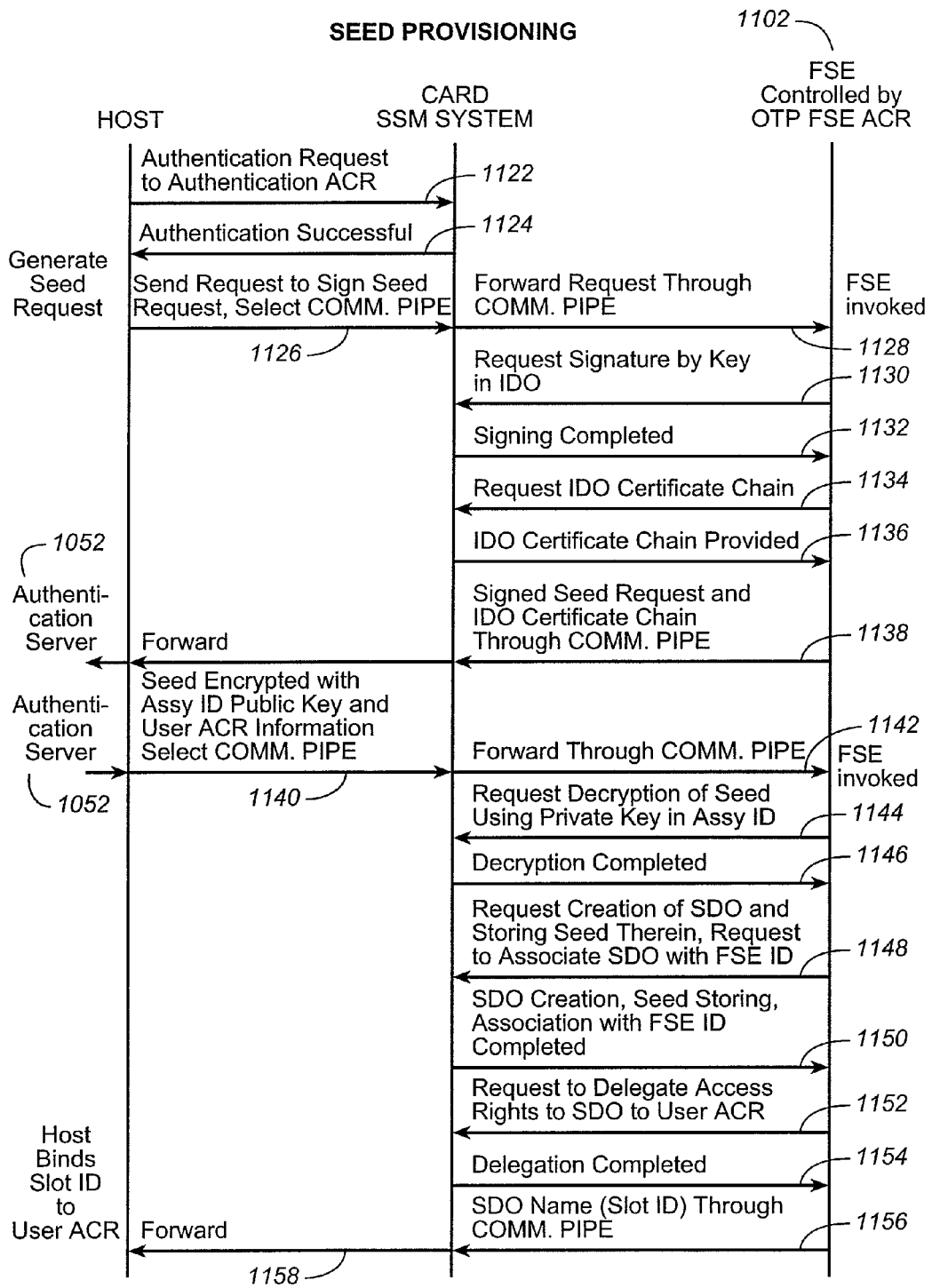
FIG. 43 is a protocol diagram illustrating a seed provisioning phase.

The OTP operation involves two phases: a seed provisioning phase illustrated in FIG. 43 and an OTP generation phase illustrated in FIG. 44. Reference to FIGS. 40-42 will also be made where it aids the description. FIG. 43 is a protocol diagram illustrating the seed provisioning process. As shown in FIG. 43, various actions are taken by the host such as host 24 as well as by the card. One entity on the card taking various actions is the SSM system of FIGS. 40A and 40B, including the SSM core 1004. Another entity on the card taking various actions is the FSE 1102 shown in FIG. 42.

In dual factor authentication, the user requests a seed to be issued and once the seed is issued, the seed is to be stored in a secure token. In this example, the secure token is the memory device or card. The user authenticates to one of the authentication ACRs 1106 in FIG. 42 to gain access to the SSM system (arrow 1122). Assuming that authentication is successful (arrow 1124), the user then requests for a seed (arrow 1126). The host sends the request to sign the seed request to the card by selecting a particular application 1102 for signing the seed request. If the user is not aware of the particular application I.D. that needs to be invoked, this information can be obtained from device 10, for example, through a discreet query to the device. The user then inputs the application I.D. of the application that should be invoked, thereby also selecting a communication pipe corresponding to the application. The user command is then forwarded in a pass through command to the application specified by the application I.D. from the user (arrow 1128) through the corresponding communication pipe. The application that is invoked requests a signature by means of the public key in the specified IDO, such as IDO 1112 in FIG. 42.

The SSM system signs the seed request using the public key of the IDO and notifies the application that the signing is completed (arrow 1132). The invoked application then requests the certificate chain of the IDO (arrow 1134). In response, the SSM system provides the certificate chain of the IDO as controlled by the ACR 1103 (arrow 1136). The invoked application then provides the signed seed request and the certificate chain of the IDO through the communication pipe to the SSM system which forwards the same to the host (arrow 1138). The sending of the signed seed request and IDO certificate chain through the communication pipe is through a callback function that is established between the SAMM 1008 and the SSM core 1004 of FIG. 40A, where the callback function will be elaborated below.

The signed seed request and IDO certificate chain received by the host are then sent to the authentication server 1052 shown in FIG. 41. The certificate chain provided by the card certified that the signed seed request originates from the trusted token so that the authentication server 1052 is willing to provide the card with the secret seed. The authentication server 1052 therefore sends the seed encrypted with the public key of the IDO together with the user ACR information to the host. The user information indicates which one of the N user ACRs under which the user has rights for accessing the OTP to be generated. The host invokes an OTP application in FSE 1102 by supplying the application I.D., thereby also selecting the communication pipe corresponding to the application, and forward the user ACR information to the SSM system (arrow 1140). The encrypted seed and the user ACR information are then forwarded through the communication pipe to the application selected (arrow 1142). The invoked application sends a request to the SSM system for decryption of the seed using the private key of the IDO (arrow 1144). The SSM system decrypts the seed and sends a notice to the application that decryption has been completed (arrow 1146). The invoked application then requests a creation of a secured data object and the storing of the seed in the secured data object. It also requests that the SDO be associated with ID of the OTP application (which can be the same application that is doing the requesting) for generating the one time password (arrow 1148). The SSM system creates one of the SDOs 1114 and stores the seed inside the SDO and associates the SDO with the ID of the OTP application, and sends notice to the application when completed (arrow 1150). The application then requests the SSM system to delegate access rights by the internal ACR 1103 for accessing the SDO 1114 to the appropriate user ACR based on user information supplied by the host (arrow 1152). After delegation has been completed, the SSM system notifies the application (arrow 1154). The application then sends the name of the SDO (slot ID) through the communication pipe to the SSM system through a call back function (arrow 1156). SSM system then forwards the same to the host (arrow 1158). The host then binds the name of the SDO to the user ACR, so that the user can now access the SDO.

The process of OTP generation will now be described in reference to the protocol diagram in FIG. 44. To obtain the one time password, the user will log in the user ACR to which it has access rights (arrow 1172). Assuming that the authentication is successful, the SSM system notifies the host and the host sends a "get SDO" command to the SSM (arrows 1174, 1176). As noted above, the SDO that stores the seed has been associated with an application for generating the OTP. Therefore instead of selecting an application through the communication pipe as before, the OTP generation application is invoked by means of the association between the SDO that is accessed by the command in arrow 1176 and the OTP generation application (arrow 1178). The OTP generation application then requests the SSM system to read the content (i.e. the seed) from the SDO (arrow 1180). Preferably, the SSM is not aware of the information that is contained in the content of the SDO, and will simply process the data in the SDO as instructed by the FSE. If the seed is encrypted, this may involve decrypting the seed before reading as commanded by the FSE. The SSM system reads the seed from the SDO and provides the seed to the OTP generation application (arrow 1182). The OTP generation application then generates the OTP and provides it to the SSM system (arrow 1184). The OTP is then forwarded by the SSM to the host (arrow 1186) which in turn forwards the OTP to the authentication server 1052 to complete the dual factor authentication process.

Callback Function

A generic callback function is established between the SSM core 1004 and SAMM 1008 of FIG. 40A. Different device internal applications and communication pipes may be registered with such function. Thus when a device internal application is invoked, the application can use this callback function to pass data after processing to the SSM system through he same communication pipe that was used to pass a host command to the application.

DRM System Embodiment

Figure 45:
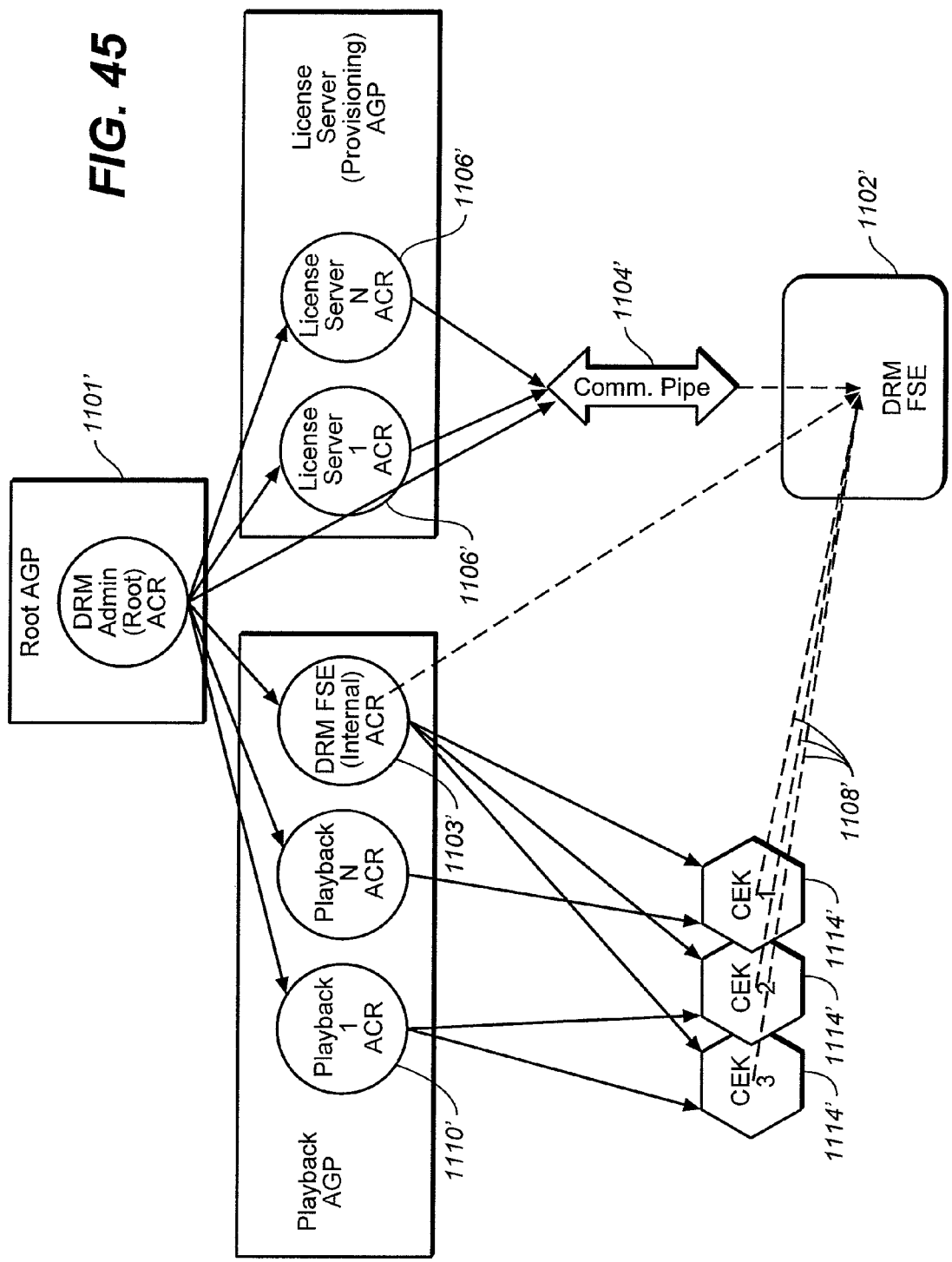
FIG. 45 is a functional block diagram illustrating a DRM system.
Figure 46:
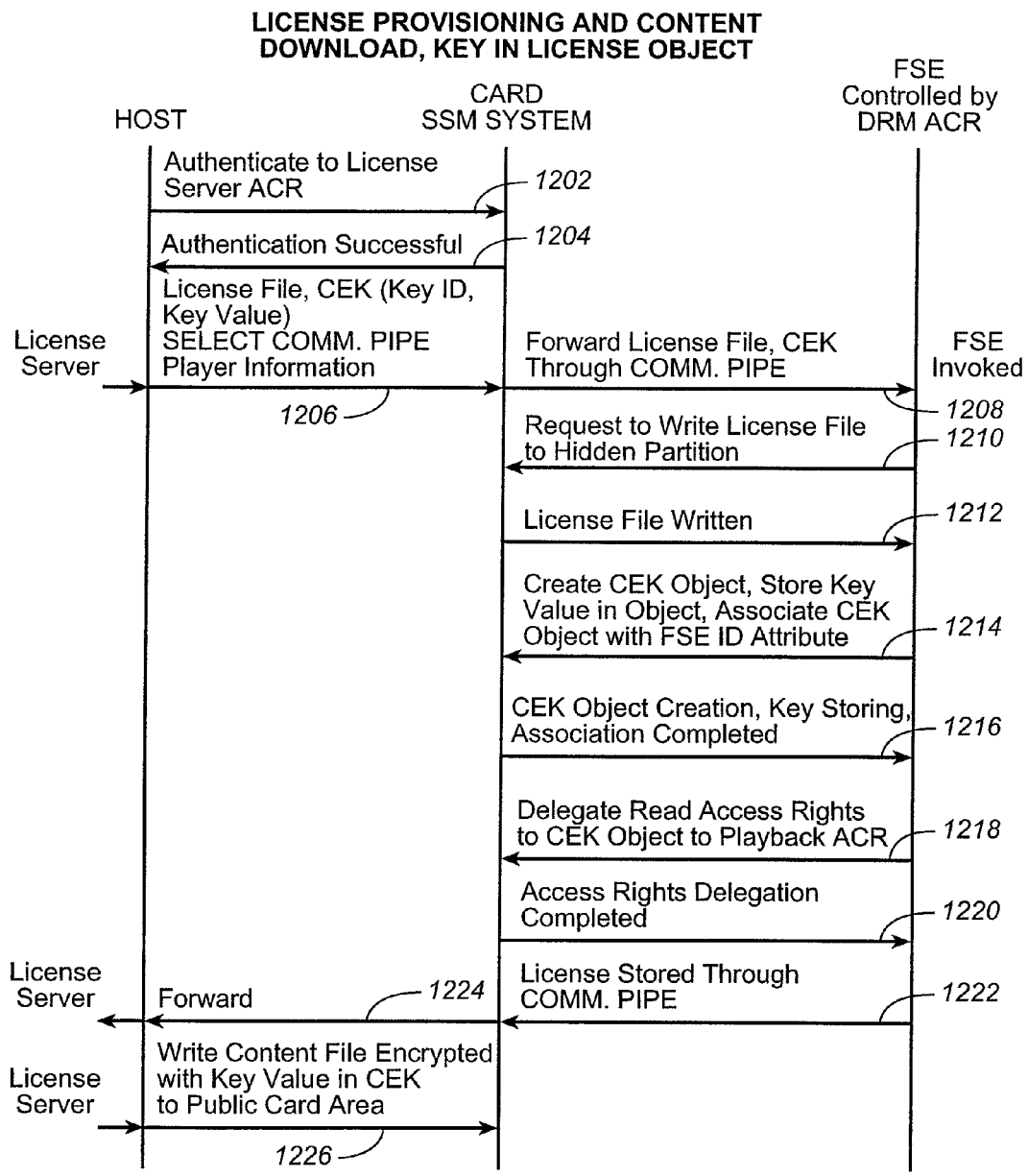
FIG. 46 is a protocol diagram illustrating a process for license provisioning and content download where the key is provided in the license object.

FIG. 45 is a functional block diagram illustrating a DRM system employing communication pipe 1104', CEKs 1114' with links 1108' to FSE applications 1102' and control structures 1101', 1103', 1106' for controlling the functions to implement DRM functions. As will be noted, the architecture in FIG. 45 is quite similar to that of FIG. 42, except that the security data structure now includes license server ACRs 1106' and playback ACRs 1110', instead of authentication server ACRs and user ACRs, and CEKs 1114' instead of SDOs. In addition, the IDO is not involved and is thus omitted in FIG. 45. The CEKs 1114' may be created in the license provisioning process. Protocol diagram FIG. 46 illustrates a process for license provisioning and content download where the key is provided in the license object. As in the OTP embodiment, a user wishing to acquire a license will first need to acquire access rights under one of the N ACRs 1106' and one of the N ACRs 1110' so that content can be rendered by means of a media player such as a media player software application.

As shown in FIG. 46, the host authenticates to a license server ACR 1106' (arrow 1202). Assuming that authentication is successful (arrow 1204) the license server provides a license file together with a CEK (key ID and key value), to the host. The host also selects the application to be invoked by supplying the application ID to the SSM system on the card. The host also sends player information (e.g. information on a media player software application). (arrow 1206). The player information will indicate which one of the N playback ACRs 1110' under which the player has access rights. The SSM system forwards to the DRM application the license file and the CEK through the communication pipe corresponding to the application selected (arrow 1208). The application invoked then requests the SSM system to write the license file to the hidden partition (arrow 1210). When the license file has been so written, the SSM system notifies the application (arrow 1212). The DRM application then requests a CEK object 1114' be created and stores in it the key value from the license file. The DRM application also requests that the CEK object be associated with ID of a DRM application that checks licenses associated with the key provided (arrow 1214). The SSM system completes these tasks and so notifies the application (arrow 1216). The application then requests that read access rights to the CEK 1114' be delegated to a playback ACR to which the player has permission to access content based on player information sent by host (arrow 1218). The SSM system performs the delegation and so notifies the application (arrow 1220). A message that the storage of the license has been completed is sent by the application through the communication pipe to the SSM system and the SSM system forwards it to the license server (arrows 1222 and 1224). A call back function is used for this action through the communication pipe. Upon receiving this notice, the license server then provides the content file encrypted with the key value in the CEK provided to the card. The encrypted content is stored by the host in the public card area. The storing of the encrypted content file does not involve security functions so that the SSM system is not involved in the storing.

Figure 47:
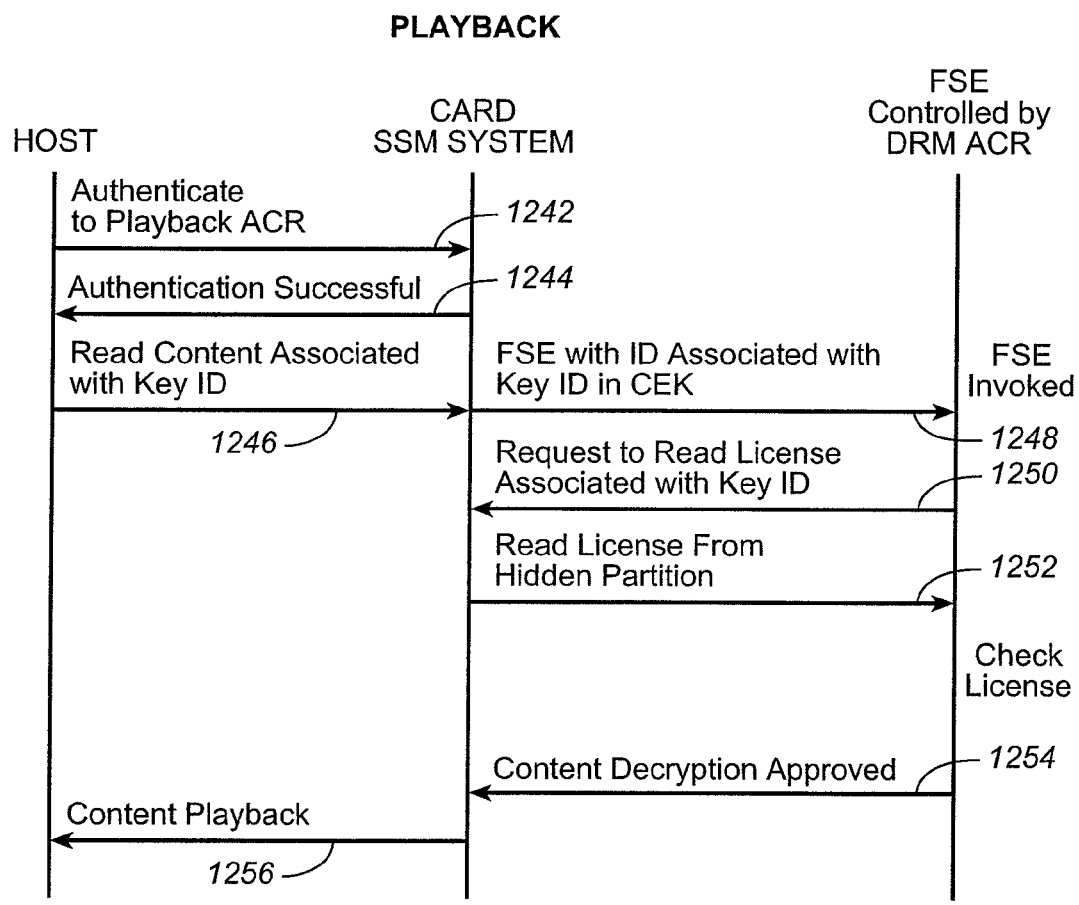
FIG. 47 is a protocol diagram illustrating a process for playback operation.

The playback operation is illustrated in FIG. 47. The user authenticates to the appropriate playback ACR (i.e. the playback ACR to which read rights has been delegated above in arrows 1152 and 1154) through the host (arrow 1242). Assuming that authentication is successful (arrow 1244) the user then sends a request to read the content associated with the key ID (arrow 1246). Upon receiving the request, the SSM system will discover that a DRM application ID is associated with the CEK object being accessed and so will cause the identified DRM application to be invoked (arrow 1248). The DRM application requests the SSM system to read data (i.e. the license) associated with the key ID (arrow 1250). The SSM is not aware of the information in the data it is requested to read, and simply processes the request from the FSE to perform the data reading process. The SSM system reads the data (i.e. license) from the hidden partition and provides the data to the DRM application (arrow 1252). The DRM application then interprets the data and checks the license information in the data to see if the license is valid. If the license is still valid, the DRM application will so inform the SSM system that content decryption is approved (arrow 1254). The SSM system then decrypts the content requested using the key value in the CEK object and supplies the decrypted content to the host for playback (arrow 1256). If the license is no longer valid, the request for content access is denied.

Figure 48:
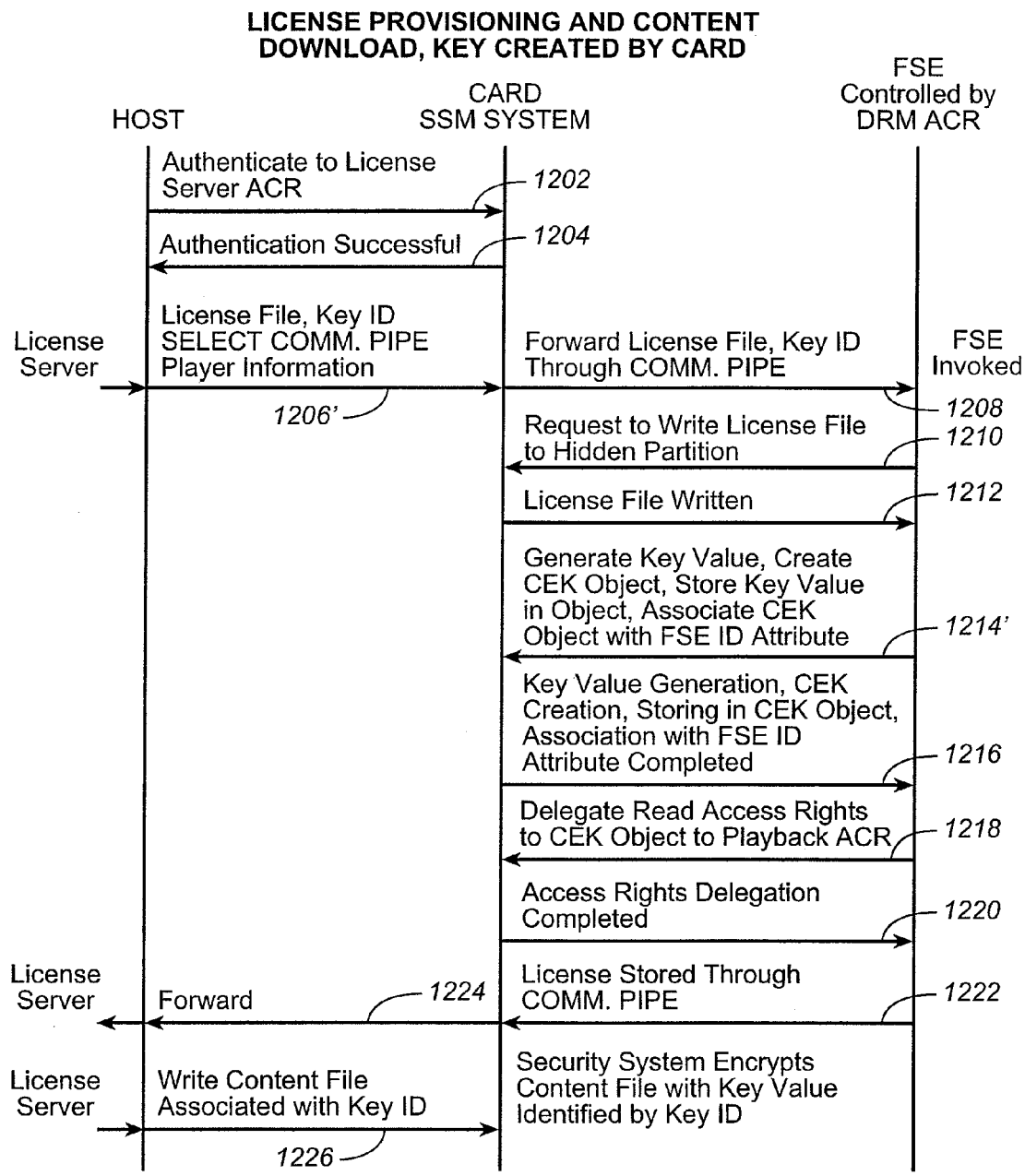
FIG. 48 is a protocol diagram illustrating a process for license provisioning and content download where the key is not provided in the license object.

In the event that no key is provided in the license file from the license server, the license provisioning and content download will be somewhat different from that illustrated in FIG. 46. Such a different scheme is illustrated in the protocol diagram of FIG. 48. The identical steps between FIGS. 46 and 48 are identified by the same numerals. Thus the host and the SSM system first engage in authentication (arrows 1202, 1204). The license server provides the license file and the key ID but without the key value to the host, and the host will forward the same together with the application ID of the DRM application it wishes to invoke to the SSM system. The host also sends along player information (arrow 1206'). The SSM system then forwards the license file and key ID through the communication pipe corresponding to the selected application, to the selected DRM application (arrow 1208). The DRM application requests that the license file be written to the hidden partition (arrow 1210). When the license file has been so written, the SSM system notifies the DRM application (arrow 1212). The DRM application then requests that the SSM system generate a key value, create a CEK object, store the key value therein and associate the CEK object with the ID of a DRM application (arrow 1214'). After the request has been complied with, the SSM system sends a notice to the DRM application (arrow 1216). The DRM application will then request the SSM system to delegate read access rights to the CEK object to the playback ACR based on the player information from the host (arrow 1218). When this is completed, the SSM system so notifies the DRM application (arrow 1220). The DRM application then notifies the SSM system that the license has been stored where the notice is sent through the communication pipe by means of a callback function (arrow 1222). This notice is forwarded by the SSM system to the license server (arrow 1224). The license server then sends the content file associated with a key ID to the SSM system (arrow 1226). The SSM system encrypts the content file with the key value identified by the key ID, without involving any applications. The content so encrypted and stored on the card may be played back using the protocol of FIG. 47.

In the OTP and the DRM embodiments above, the FSE 1102 and 1102' can contain many different OTP and DRM applications for selection by host devices. Users have the choice of selecting and invoking the desired device internal application. Nonetheless, the overall relationship between the SSM module and the FSE remains the same, so that users and data providers can use standard set of protocols for interacting with the SSM module and for invoking the FSE. Users and providers do not have to become involved in the particularities of the many different device internal applications, some of which may be proprietary.

Furthermore, the provisioning protocols can be somewhat different, as is the case in FIGS. 46 and 48. The license object contains a key value in the case of FIG. 46, but no key value in the case of FIG. 48. This difference calls for slightly different protocols as illustrated above. However, the playback in FIG. 47 is the same irrespective of how the license was provisioned. Hence, this difference will only matter to content providers and distributors, but not typically to consumers, who typically are only involved in the playback phase. This architecture thus provides great flexibility to content providers and distributors to customize protocols, while remaining easy to use by consumers. Obviously information derived from the data provisioned by more than two sets of provisioning protocols may still be accessible using the second protocol.

Another advantage provided by the embodiments above is that while outside entities such as users and the device internal applications can share the usage of data controlled by the security data structure, the user is able only to access the results derived by the device internal applications from the store data. Thus, in the OTP embodiment, the user through the host devices is able only to obtain the OTP, but not the seed value. In the DRM embodiment, the user through the host devices is able only to obtain the rendered content, but not access to either the license file or the cryptographic key. This feature permits convenience to consumers without compromising security.

In one DRM embodiment, neither the device internal applications nor hosts have access to the cryptographic keys; only the security data structure has such access. In other embodiments, entities other than the security data structure can also access the cryptographic keys. The keys can also be generated by means of the device internal applications, and then controlled by the security data structure.

Access to the device internal applications and to information (e.g. OTP and rendered content) is controlled by the same security data structure. This reduces complexity in the control systems and costs.

By providing the ability to delegate access rights from the internal ACR controlling access to the device internal applications to an ACR controlling the access by hosts to the information obtained from invoking the device internal applications, this feature makes it possible to achieve the features and functions above.

Application Specific Revocation Scheme

The access control protocol of the security data structure can also be modified when a device internal application is invoked. For example, The Certificate Revocation protocol may be either a standard one using CRL or a proprietary protocol. Thus, by invoking a FSE, the standard CRL revocation protocol can be replaced by an FSE proprietary protocol.

In addition to supporting the CRL revocation scheme, SSA enables a specific internal-application residing in the device to revoke hosts through a private communication channel between the device internal application and the CA or any other Revocation Authority. The internal application proprietary revocation scheme is bounded in the relationship of the host-application.

When application-specific revocation scheme is configured, the SSA system will REJECT the CRL (if provided) ELSE will use the Certificate and the proprietary application data (previously provided through an application specific corn pipe) to decide whether the given certification revoked or not.

As noted above, an ACR specifies which of three revocation schemes (no revocation scheme, the standard CRL scheme, and application-specific revocation scheme) is adopted by specifying a revocation value. When the application-specific revocation scheme option is chosen, the ACR will also specify an ID for the internal application ID in charge of the revocation scheme, and the value in the CET/APP_ID field will correspond to the internal application ID in charge of the revocation scheme. When authenticating the device, SSA system will then adhere to the proprietary scheme of the internal application.

Instead of replacing one set of protocols by another, the invocation of a device internal application may impose additional access conditions to the access control already exerted by the SSA. For example, the right to access a key value in CEK can be further scrutinized by an FSE. After the SSA system determines that an ACR has access rights to a key value, the FSE will be consulted before the access is granted. This feature allows great flexibility to the content owner to control access to the content.

While the invention has been described above by reference to various embodiments, it will be understood that changes and modifications may be made without departing from the scope of the invention, which is to be defined only by the appended claims and their equivalent.

What is claimed is:

1. A method for determining if a certificate is revoked using a certificate revocation list, the method comprising:
    performing by a storage device which is in communication with a host:
        receiving a certificate from the host;
        receiving a plurality of portions of a certificate revocation list from the host, wherein the plurality of portions of the certificate revocation list amount to the complete certificate revocation list;
        processing the portions of the certificate revocation list in the order in which they are received and searching for a reference to the certificate in each of the portions as they are being processed, wherein the plurality of portions are received one after the other, and wherein the processing is performed on the fly as the plurality of portions are received; and
        after the plurality of portions have been processed,
            verifying the certification revocation list from the processed plurality of portions, and
            determining that the certificate is revoked if the reference to it was found and the certificate revocation list was verified.

2. The method of claim 1, wherein the processing discards portions of the certificate revocation list after they have been processed.

3. The method of claim 1, wherein the processing includes hashing the portions of the certificate revocation list as they are received using a hashing algorithm to obtain a hashed certificate revocation list.

4. The method of claim 1, wherein the received plurality of portions of the certificate revocation list are associated with a first hash of all the portions of the certificate revocation list, the first hash being signed with a signature, wherein the processing includes calculating a second hash of all the portions of the certificate revocation list, and wherein the method further comprises, after the plurality of portions have been processed, verifying the signature of the first hash and comparing the first hash with the second hash.

5. The method of claim 1, wherein the plurality of portions include serial numbers of revoked certificates.

6. The method of claim 1, wherein the certificate and the plurality of portions of the certificate revocation list are received in response to a request to authenticate the host, and wherein the method further comprises:
   determining that the certificate is revoked because the reference to it was found in the certification revocation list and then rejecting an attempt to authenticate the host.

7. The method of claim 1 further comprising:
   receiving a second certificate from the host;
   receiving a second plurality of portions of a second certificate revocation list from the host;
   processing the portions of the second certificate revocation list in the order in which they are received and searching for a reference to the second certificate in each of the portions as they are being processed; and
   after the plurality of portions of the second certificate revocation list have been processed,
   verifying the second certification revocation list, and
   determining that the second certificate is revoked if the reference to the second certificate was found and the second certificate revocation list was verified.

8. The method of claim 1, wherein the plurality of portions of the certificate revocation list received from the host were previously read by the host from a memory in the storage device.

9. A storage device comprising:
   a memory; and
   a controller in communication with the memory and operative to:
   receive a certificate from an entity;
   receive a plurality of portions of a certificate revocation list from the entity, wherein the plurality of portions of the certificate revocation list amount to the complete certificate revocation list;
   process the portions of the certificate revocation list in the order in which they are received and search for a reference to the certificate in each of the portions as they are being processed, wherein the plurality of portions are received one after the other, and wherein the processing is performed on the fly as the plurality of portions are received; and
   after the plurality of portions have been processed,
   verify the certification revocation list from the processed plurality of portions, and
   determine that the certificate is revoked if the reference to it was found and the certificate revocation list was verified.

10. The storage device of claim 9, wherein the processing discards portions of the certificate revocation list after they have been processed.

11. The storage device of claim 9, wherein the processing includes hashing the portions of the certificate revocation list as they are received using a hashing algorithm to obtain a hashed certificate revocation list.

12. The storage device of claim 9, wherein the received plurality of portions of the certificate revocation list are associated with a first hash of all the portions of the certificate revocation list, the first hash being signed with a signature, wherein the controller processes the portions by calculating a second hash of all the portions of the certificate revocation list, and wherein the controller is further operative to, after the plurality of portions have been processed, verify the signature of the first hash and comparing the first hash with the second hash.

13. The storage device of claim 9, wherein the plurality of portions include serial numbers of revoked certificates.

14. The storage device of claim 9, wherein the certificate and the plurality of portions of the certificate revocation list are received in response to a request to authenticate the entity, and wherein the controller is further operative to determine that the certificate is revoked because the reference to it was found in the certification revocation list and then rejecting an attempt to authenticate the entity.

15. The storage device of claim 9, wherein the controller is further operative to:
   receive a second certificate from the entity;
   receive a second plurality of portions of a second certificate revocation list from the entity;
   process the portions of the second certificate revocation list in the order in which they are received and search for a reference to the second certificate in each of the portions as they are being processed; and
   after the plurality of portions of the second certificate revocation list have been processed,
   verify the second certification revocation list, and
   determine that the second certificate is revoked if the reference to the second certificate was found and the second certificate revocation list was verified.

16. The storage device of claim 9, wherein the plurality of portions of the certificate revocation list received from the entity were previously read by the entity from the memory.

* * * * *